US011903368B2

(12) United States Patent
Fedorak et al.

(10) Patent No.: US 11,903,368 B2
(45) Date of Patent: Feb. 20, 2024

(54) SYSTEM FOR FEEDING ANIMALS

(71) Applicant: XANANTEC TECHNOLOGIES INC., Edmonton (CA)

(72) Inventors: Mark Vernon Fedorak, Edmonton (CA); Liam Joseph Abrams, Edmonton (CA); Martin Jacob Zuidhof, Edmonton (CA); Jim Morris Kulyk, Edmonton (CA); Riley Cole Stuermer, St. Albert (CA); Edmond Hok Ming Lou, Edmonton (CA)

(73) Assignee: Xanantec Technologies Inc., Edmonton (CA)

( * ) Notice: Subject to any disclaimer, the term of this patent is extended or adjusted under 35 U.S.C. 154(b) by 286 days.

(21) Appl. No.: 17/204,536

(22) Filed: Mar. 17, 2021

(65) Prior Publication Data

US 2022/0295753 A1 Sep. 22, 2022

(51) Int. Cl.
*A01K 39/01* (2006.01)
*A01K 29/00* (2006.01)
*A01K 39/04* (2006.01)
*A01K 5/01* (2006.01)

(52) U.S. Cl.
CPC ................ *A01K 39/01* (2013.01); *A01K 5/01* (2013.01); *A01K 29/005* (2013.01); *A01K 39/04* (2013.01)

(58) Field of Classification Search
CPC ........ A01K 39/01; A01K 5/01; A01K 29/005; A01K 39/04
USPC ............. 108/54.1, 144.11; 248/125.8, 125.1, 248/188.2, 161
See application file for complete search history.

(56) References Cited

U.S. PATENT DOCUMENTS

| | | | | |
|---|---|---|---|---|
| 9,713,318 | B1 * | 7/2017 | Albawi | G08C 17/02 |
| 10,506,793 | B2 * | 12/2019 | Zuidhof | A01K 5/02 |
| 2016/0153607 | A1 * | 6/2016 | Stone | B66F 9/122 248/161 |

OTHER PUBLICATIONS

Van Der Klein, S.A.S., et al., "Early Photostimulation at the Recommended Body Weight Reduced Broiler Breeder Performance" Poult. Sci., vol. 97, pp. 3736-3745, http://dx.doi.org/10.3382/ps/pey215.

Van Der Klein, S.A.S., et al., "The Effect of Rearing Photoperiod on Broiler Breeder Reproductive Performance Depended on Body Weight", Poult. Sci., vol. 97, pp. 3286-3294, http:/dx.doi.org/10.3382/ps/pey199.

(Continued)

*Primary Examiner* — Joshua J Michener
*Assistant Examiner* — Nicole Paige Maccrate
(74) *Attorney, Agent, or Firm* — James A. Sheridan; Sheridan Law, LLC

(57) ABSTRACT

An improved feeding system is provided to permit sequential entry to animals, one at a time, into a feeding station that weighs the animal, and then provides or prevents access to a single feed or feed blend based on body weight or other criteria. It exits each animal if no feed is to be provided, or after feeding for a specified period of time. The system accommodates animals housed in groups and allows individual animals to be fed precisely with minimal labour input. Feed consumption by individual animals is limited by the amount of time they remain in the feeding area of the station and the amount of feed provided to them. The system provides for the ongoing collection of data about the animals' growth, and controls and monitors feed intake and body weight.

30 Claims, 38 Drawing Sheets

(56) References Cited

OTHER PUBLICATIONS

Zuidhof, Martin J., "Lifetime Productivity of Conventionally and Precision-Fed Broiler Breeders", Poult. Sci., vol. 97, pp. 3921-3937, http://dx.doi.org/10.3382/ps/pey252.
Zuidhof, Martin J., et al., "Precision Feeding: Innovative Management of Broiler Breeder Feed Intake and Flock Uniformity", Poult. Sci., vol. 96, pp. 2254-2263, http://dx.doi.org/10.3382/ps/pex013.
Robinson, F.E., et al., "Effects of Photostimulatory Lighting and Feed Allocation in Female Broiler Breeders 2. Egg and Chick Production Characteristics", Can. J. Anim. Sci., vol. 78, pp. 615-623.

* cited by examiner

LOWERED POSITION

SYSTEM FOR FEEDING ANIMALS

TECHNICAL FIELD

The present disclosure is related to the field of feeder systems for providing the right quantity of the right feed to individual animals, in particular, meat-type poultry breeding stock that are intended to follow a predetermined target body weight profile, or for pets to prevent or treat obesity.

BACKGROUND

Meat-type chicken breeding stocks (broiler breeders, grandparents, and great grandparents) have been maintained using strict feed rationing to control body weight because even moderate overfeeding reduces reproductive performance (Robinson et al., 1998). This feed restriction causes competition for feed, and inconsistent feed intake, which leads to poor flock body weight uniformity. Each year, the challenge becomes greater due to increasing incongruity between the body weight required for reproductive success and the genetic potential of their offspring. A precision feeding station was developed that allowed control of feed intake through monitoring of feed intake and body weight, for free run poultry (Zuidhof et al., 2019) as disclosed in U.S. Pat. No. 10,506,793B2 issued Dec. 17, 2019, which is incorporated by reference into this application in its entirety. The system successfully allowed users to grow broiler breeders with body weight coefficients of variation of 2% or less at 20 to 24 weeks of age, at the time when broiler breeders were photo-stimulated (Zuidhof et al., 2017; van der Klein et al., 2018b; van der Klein et al., 2018a; Zuidhof, 2018). Low variation is desirable so that broiler breeders respond similarly to changes in flock management as they come into lay.

When training birds to use the precision feeding system, it is very important to have sufficient access to feed. This was an issue that the prior art design did not fully address.

First, the prior art feeder was too small to allow simultaneous access to feed, and as a result, birds had to compete too aggressively to access feed. This led to stunting of growth in some birds, and poor early uniformity. Young chicks are social, and learn from each other. Having multiple adjacent feeder access points allows birds to see each other eating. Having adjacent feeder access points allows birds to learn the location of feed from others in their cohort where they can eat. A larger feeder with a guard to allow several chicks to access feed simultaneously while preventing them from jumping into the feeder addresses these challenges.

Second, getting birds to eat immediately when they are placed into any rearing facility is a very high priority. This was difficult in the first version of the feeding system because the station was elevated above the ground. This grade separation between the barn or production facility floor and the chambers inside the feeding station ensured that the exit door could not be held open by birds after they exit. However, the young chicks had to climb a ramp approximately 20 cm vertically, and 60 cm horizontally. A station lifting mechanism would, therefore, be desirable to allow the user to optimize the height of feeding station as animals grow.

It is, therefore, desirable to provide a method and system for feeding animals, such as poultry, that overcomes the shortcomings of the prior art.

SUMMARY

In some embodiments, an improved system and method can be provided for precisely providing the correct quantity of feed to individual animals. The animals do not need to be housed individually, thus the scope extends to free run and free range housing. The invention can be particularly suited to meat-type poultry breeding stock that are intended to follow a predetermined body weight profile, or pets to prevent or treat obesity. The system can collect high volumes of information of value for managing feed intake and body weight, for research, and for characterizing traits important for research or genetic selection programs. The system can operate with the aid of at least one feeding station equipped with an integrated scale.

In some embodiments, the system and method presented herein can provide a sequential feeding system, meaning that one animal at a time can enter at least one station. Each feeding station can weigh the animal that enters, and can either prevent or allow access to feed based on its body weight relative to a desired body weight at a certain age. Age is normally calculated from the birth or hatch date of an individual or group of individuals. In some embodiments, a computer can calculate the target body weight for each individual from any starting date. Multiple body weight target profiles can be entered by a user. In some embodiments, each feeding station can protect individual animals from interference from other animals while eating. Each station can gently eject the animal from the feeding station immediately if the animal should not be fed, or after the user-specified duration of access to feed expires. Time stamped data pertinent to each visit to the station, as well as the decision made (to feed or not to feed), can be written to a data file.

In some embodiments, the system can comprise the ability to start training with a much lower grade separation from the ground (approximately 5 cm). The system can now be automatically raised as the birds grow, retaining the ability to keep birds from holding open the exit door after exiting. In combination with increased feeder space, a more efficient training process with a higher adoption rate is anticipated.

In some embodiments, the system can comprise audio speakers and the ability to play audio recordings such as the sounds of chicks eating or hens scratching and brooding their chicks that will entice chicks to the proximity of the feeder inside the feeding stations. Chickens are social animals and having natural cues to draw them to the feeder is expected to be beneficial.

In some embodiments the system can comprise additional features that can reduce cost, improve reliability, ease servicing and maintenance, and to provide mixing of multiple feedstuffs, supplements, or whole feeds for advanced precision feeding applications.

Broadly stated, in some embodiments, an improved system for feeding an animal can be provided, the improved system comprising: at least one feeder station configured for providing feed to the animal, each of the at least one feeder station comprising: a sorting compartment, a feeding compartment, and at least one scale disposed in one or both of the sorting and feeding compartments; a lifting mechanism operatively coupled to the at least one feeder station, the lifting mechanism configured to move the at least one feeder station between a lowered position and a raised position during a growth cycle of the animal; a feed module, wherein the feed module is configured to dispense one or more types of feed to the animal in the feeding compartment, the feed module comprising a feed pan into which the feed is dispensed; and a main controller operatively coupled to the at least one scale, to the lifting mechanism and to the feed module, wherein the main controller is configured to operatively control the lifting mechanism to move the at least one feeder station between the lowered and raised positions.

Broadly stated, in some embodiments, the lifting mechanism can comprise one of a group consisting of: a plurality of lifting legs disposed around a perimeter of the at least one feeder station; a scissor lift mechanism disposed underneath the at least one feeder station; a pulley mechanism disposed above the at least one feeder station, the pulley mechanism configured to raise one or more of the at least one feeder station individually or as a group thereof; and a spacer disposed beneath the at least one feeder station.

Broadly stated, in some embodiments, the lifting legs can comprise one or more of screw jacks, hydraulic cylinders, pneumatic cylinders and ratcheting jacks.

Broadly stated, in some embodiments, the improved system can comprise a barrier disposed at least partially around the at least one feeder station, the barrier configured to prevent ingress of the animal underneath the at least one feeder station.

Broadly stated, in some embodiments, the improved system can comprise a ramp configured to provide access for the animal to enter the sorting compartment when the at least one feeder station is in the raised position. This ramp also can facilitate features that can prevent bird slipping and hold feed between the rungs in order to assist with training as well as to accommodate the up and down movement of the station.

Broadly stated, in some embodiments, the feed module can comprise at least one feed hopper configured to dispense the feed into the feed pan.

Broadly stated, in some embodiments, the feed module can be configured to dispense at least two types of the feed.

Broadly stated, in some embodiments, the feed module can be configured to provide the feed to at least two of the at least one feeder station.

Broadly stated, in some embodiments, the feed module can be configured to do one or both of clearing the feed pan of the feed and returning the feed to the at least one feed hopper.

Broadly stated, in some embodiments, the main controller can comprise: a microprocessor; a computer readable memory operatively coupled to the microprocessor; and a human-machine interface control panel operatively coupled to the microprocessor.

Broadly stated, in some embodiments, the computer readable memory can comprise first executable machine code stored thereon that when executed by the microprocessor, the main controller performs or carries out steps of a level checking algorithm to check if the at least one feeder station is level to the surface of the earth.

Broadly stated, in some embodiments, the computer readable memory can comprise second executable machine code stored thereon that when executed by the microprocessor, the main controller performs or carries out steps of a station leveling algorithm to level the at least one feeder station.

Broadly stated, in some embodiments, the computer readable memory can comprise third executable machine code stored thereon that when executed by the microprocessor, the main controller performs or carries out steps of a station height setting algorithm to raise or lower the at least one feeder station.

Broadly stated, in some embodiments, the main controller can further comprise: an audio codec operatively coupled to the microprocessor; a digital to analog converter operatively coupled to the audio codec; an audio amplifier operatively coupled to the digital to analog converter; and an audio speaker operatively coupled to the audio amplifier.

Broadly stated, in some embodiments, the computer readable memory can comprise fourth executable machine code stored thereon that when executed by the microprocessor, the main controller plays digitally recorded audio files stored on the computer readable memory over the audio speaker.

Broadly stated, in some embodiments, the computer readable memory can comprise fifth executable machine code stored thereon that when executed by the microprocessor, the main controller performs or carries out steps of a feed decision algorithm to dispense the one or more types of feed into the feed pan.

Broadly stated, in some embodiments, the feeder station can further comprise at least one radio frequency identification ("RFID") antenna disposed in one or both of the sorting and feeding compartments, wherein the at least one RFID antenna is configured to read an RFID tag disposed on at least one of the animal, and wherein the main controller is operatively coupled to the at least one RFID antenna.

Broadly stated, in some embodiments, the RFID antenna can comprise a coil antenna.

Broadly stated, in some embodiments, the coil antenna can comprise a shielded coil antenna segment.

Broadly stated, in some embodiments, the feed module can comprise a feed door configured to impede access to the feed pan by the poultry.

Broadly stated, in some embodiments, the feed door can comprise a plurality of door panels configured to open and close in a stacked arrangement.

Broadly stated, in some embodiments, at least one of the at least one feeder station can be configured as a dependent feeder station wherein the dependent feeder station is operatively coupled to the main controller of the at least one feeder station.

Broadly stated, in some embodiments, the main controller can be operatively coupled to environmental sensors.

Broadly stated, in some embodiments, the environmental sensors can detect one or more of ambient temperature, exhaust and/or inlet air temperature, humidity, air pressure, air flow, light intensity, light colour, particulate, smoke, and gas concentration.

Broadly stated, in some embodiments, the main controller can be operatively coupled to one or more of actuators, sensors and building automation components.

Broadly stated, in some embodiments, the actuators, sensors and building automation components can comprise one or more of lighting controllers, vents, windows, fan controllers, heating, ventilation, air conditioning, water and feed distribution systems.

Broadly stated, in some embodiments, at least one feeder station can be operatively coupled to one or more of a SCADA server and a data warehouse via one or more of a local area network and a worldwide telecommunications network.

Broadly stated, in some embodiments, the system can be configured to determine a sex of the animal based on the weight of the animal or on a change of a magnetic field by the animal.

Broadly stated, in some embodiments, the animal can comprise poultry.

Broadly stated, in some embodiments, the animal can comprise one or both of an individual animal and a group of animals.

DETAILED DESCRIPTION OF EMBODIMENTS

Figure 1:
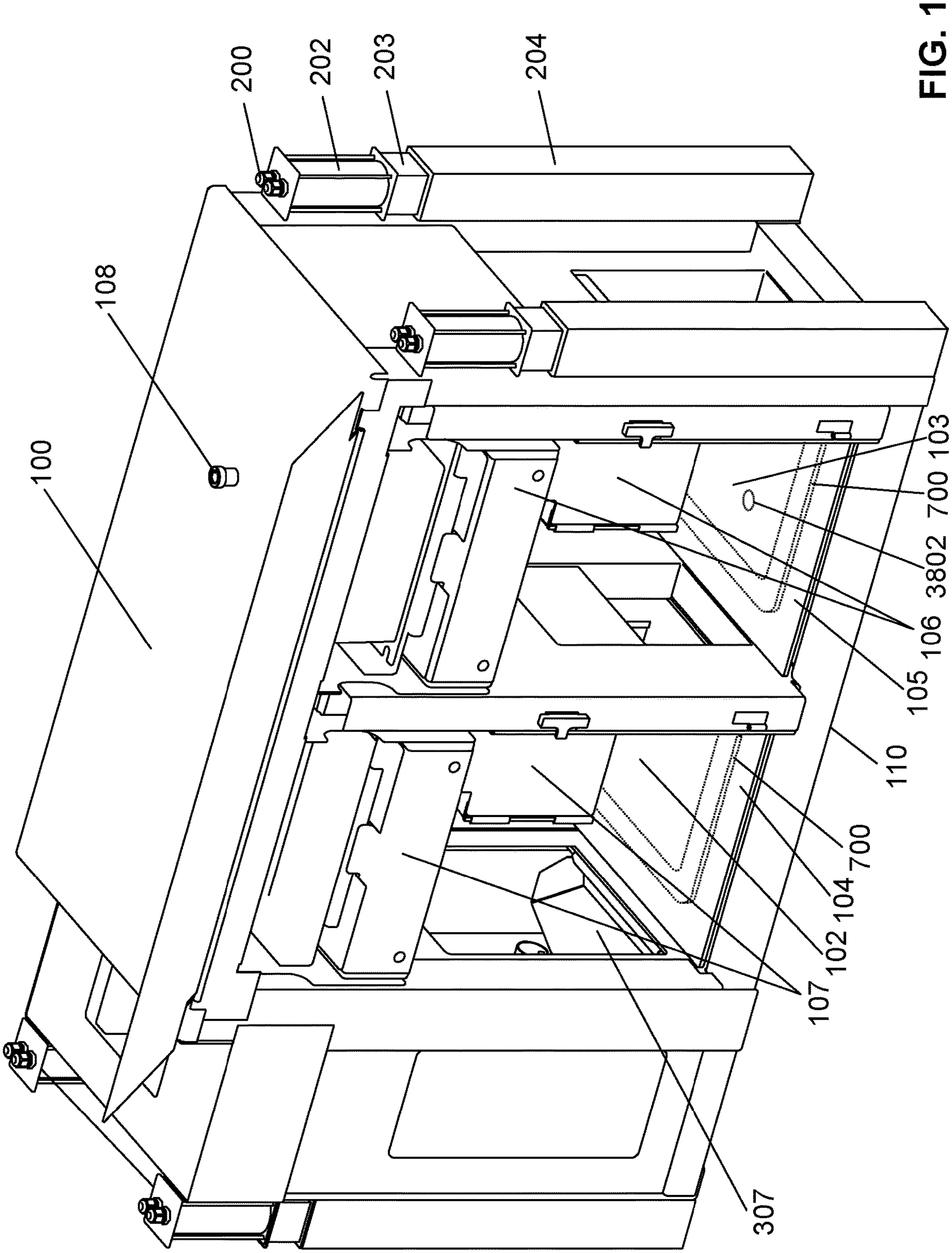
FIG. 1 is a perspective view depicting an improved feeding station.
Figure 2:
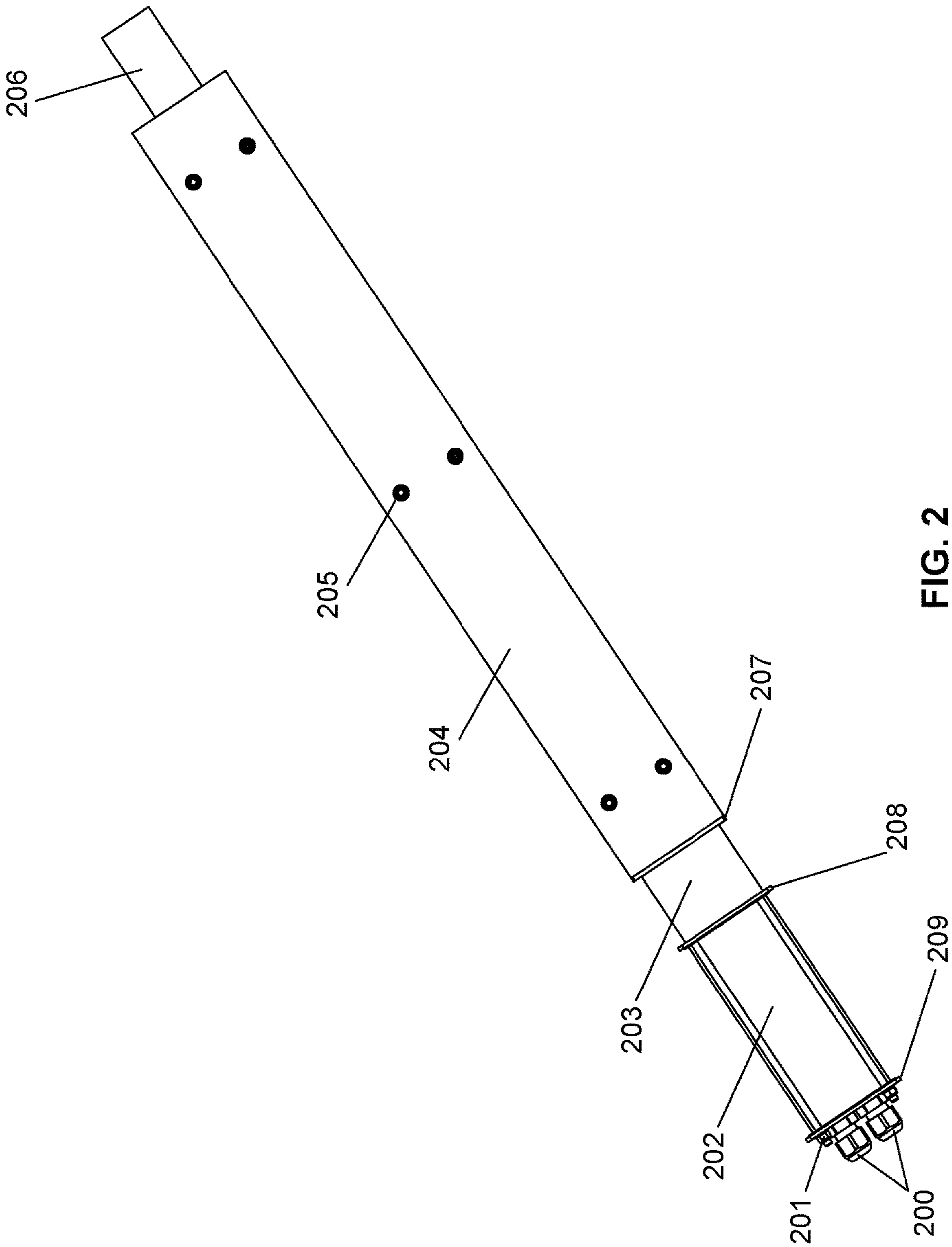
FIG. 2 is a side view depicting a screw jack-based lifting mechanism for the improved feeding station of FIG. 1.
Figure 3:
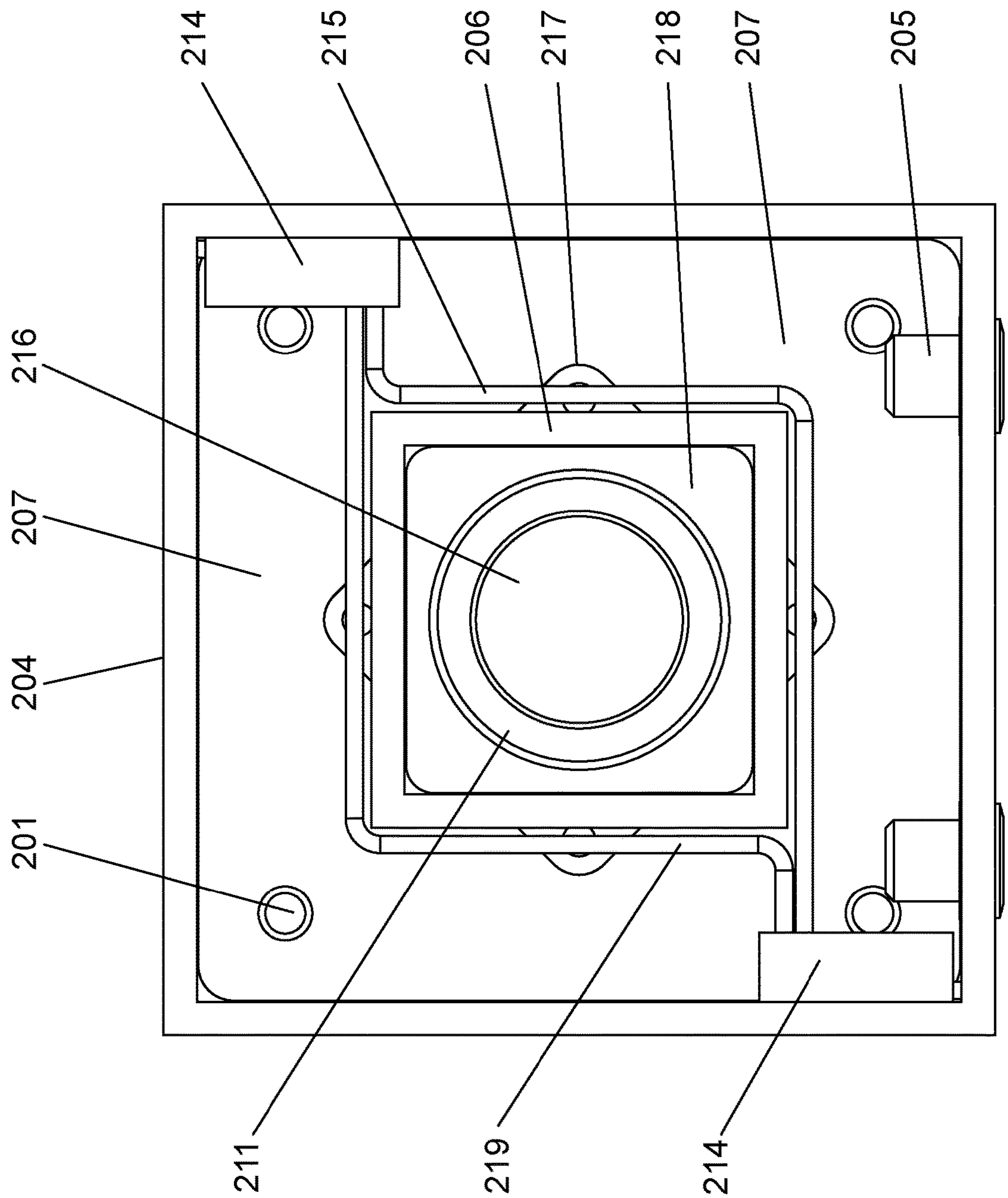
FIG. 3 is a bottom plan view depicting the screw jack-based lifting mechanism of FIG. 2.
Figure 4:
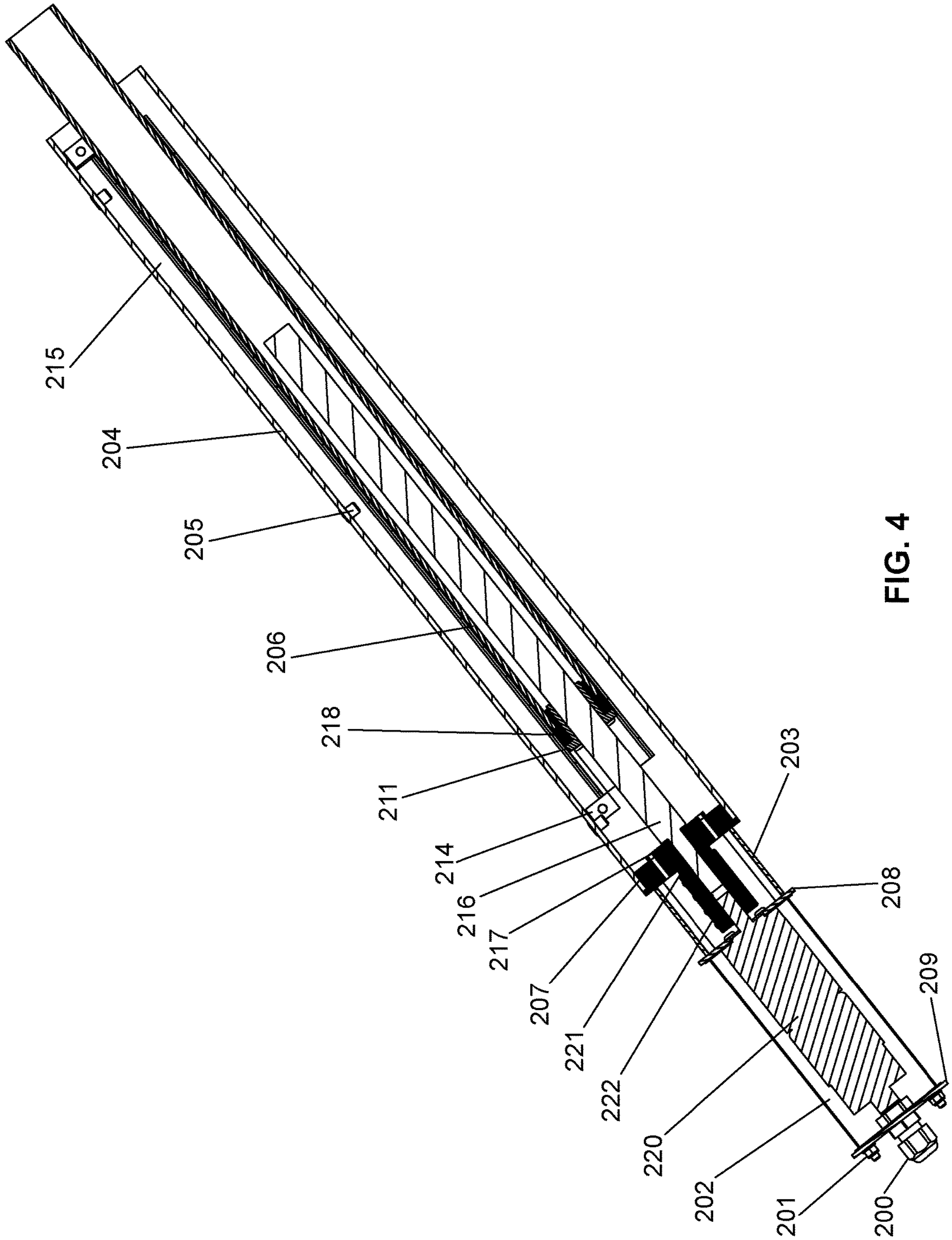
FIG. 4 is side cutaway view depicting the screw jack-based lifting mechanism of FIG. 2.
Figure 5:
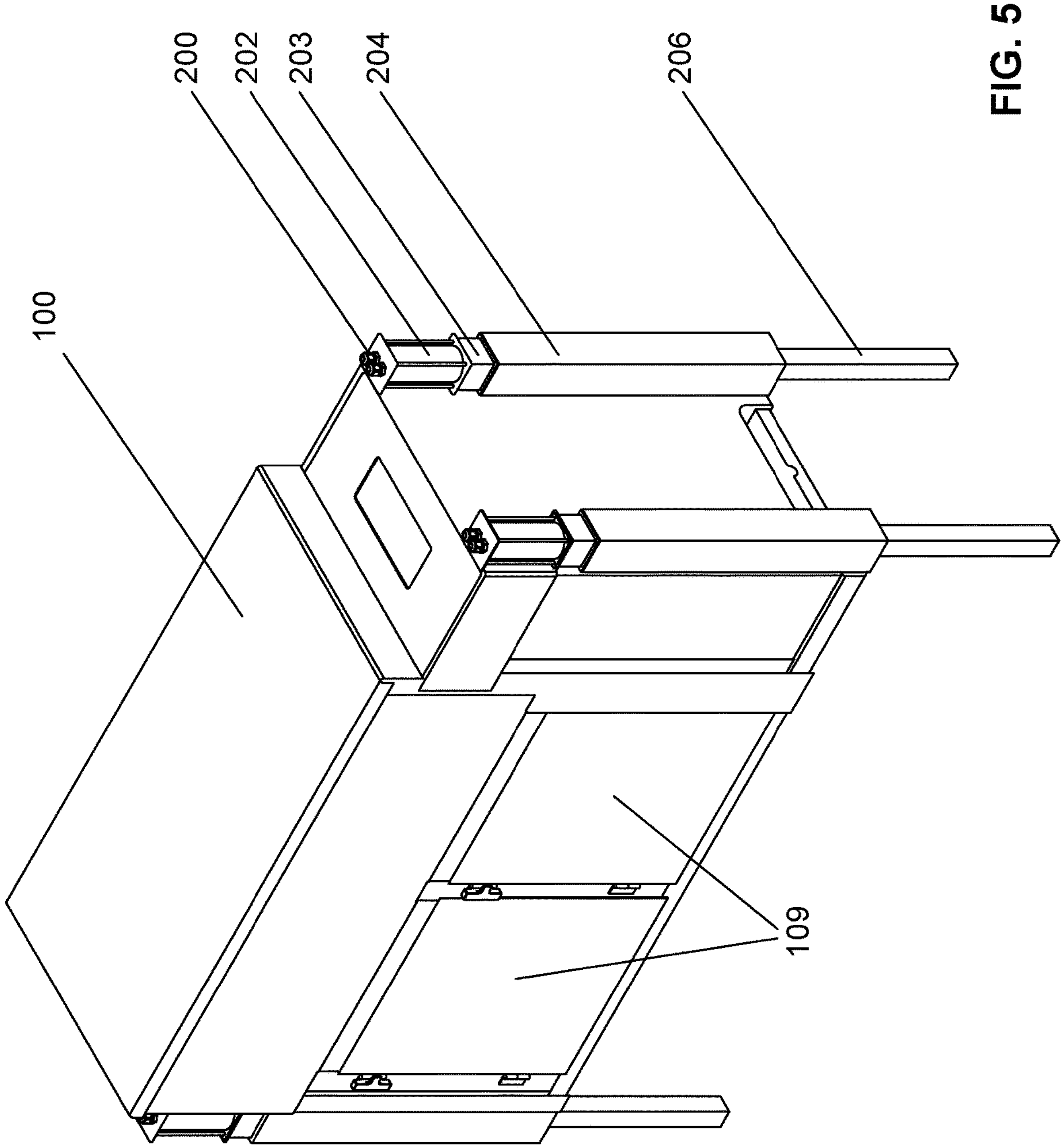
FIG. 5 is a perspective view depicting the improved feeding station of FIG. 1 with the screw jack-based lifting mechanism of FIG. 2 in an extended position.

An improved system and method for feeding animals is provided. Referring to FIG. 1, the system can comprise of feeder station 100, which can comprise of sorting compartment 103 and feeding compartment 102. In some embodiments, feeder station 100 can comprise of the feeding station as disclosed in U.S. Pat. No. 10,506,793B2 issued Dec. 17, 2019, which is incorporated by reference into this application in its entirety.

Station Lifting Mechanism

To accommodate the large disparity in the size of birds from hatch on through to lay it can be advantageous in some embodiments to provide the ability to raise and lower a feeding station 100, as shown in the attached figures, so that young birds do not have to struggle to get into station 100 whilst preventing larger birds from remaining in or entering a station through side exit doors 109 thus disrupting the natural flow of the birds and in turn the operation of station 100. In some embodiments, raising and lowering station 100 as the birds grow can provide accommodations for the safety and comfort a chick requires by having station 100 low to ground 261 where the chick only falls a few inches, to when the chick becomes a fully grown bird that requires more displacement above ground 261 to prevent re-entry into station 100 and at an age when the bird can comfortably descend from a higher height.

In some embodiments, the height of station 100 above ground 261 can change proportionally due to bird growth to ensure the ideal vertical displacement between the body weight scales and ground 261 is observed. This vertical displacement can be provided in a plurality of different embodiments, as described below.

In some embodiments, a key requirement of raising and lowering station 100 is to ensure that station 100 is kept level and parallel to the surface of the earth. This requirement of being level to the surface of the earth is driven by several requirements including, but not limited to, having scales 104,105,344 parallel to the surface of the earth for accurate measurement, and also to ensure that station 100 is safe and properly balanced without stressing frame structure 110 of station 100 by having uneven loading. Determining the level of station 100 can be done with several different technologies including optical laser sensors, mercury filled switches, gyros, and accelerometers. With current MEMS technology semiconductor accelerometers or inclinometers as known to those skilled in the art can provide the easiest and most cost-effective way of determining the level of something to the earth's surface.

In some embodiments, the use of an electronic semiconductor accelerometer to level station 100 via three axes of measurement (X, Y, Z) can provide the ability to detect the orientation of station 100 in a complete sphere although in other embodiments, configurations with 2-axis accelerometers can work as well. In some embodiments, each station 100 can comprise at least one accelerometer and, although not required, that accelerometer can be configured such that 2 axes are as parallel as possible to body weight scales 104,105 to simplify the calculation of the angles of inclination and, therefore, the tilt of station 100 to the surface of the earth.

Figure 14:
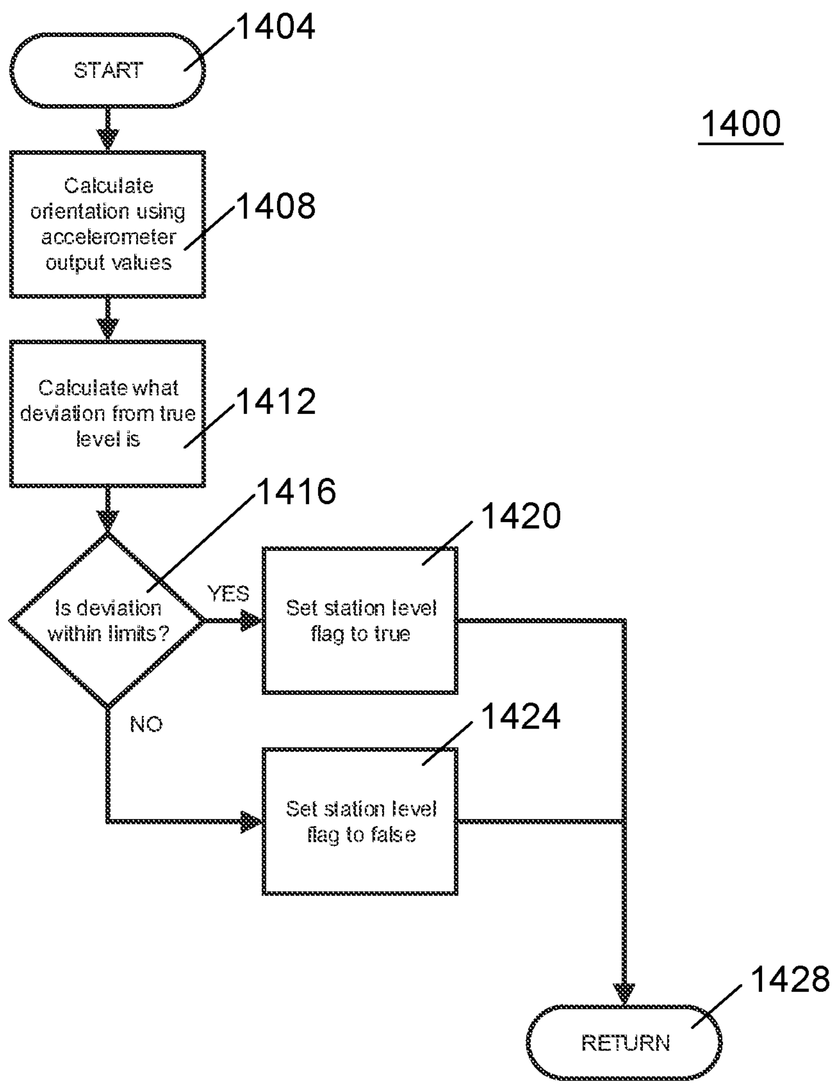
FIG. 14 is a flowchart depicting the implementation of how to check for station level for the improved feeding station of FIG. 1.
Figure 28:
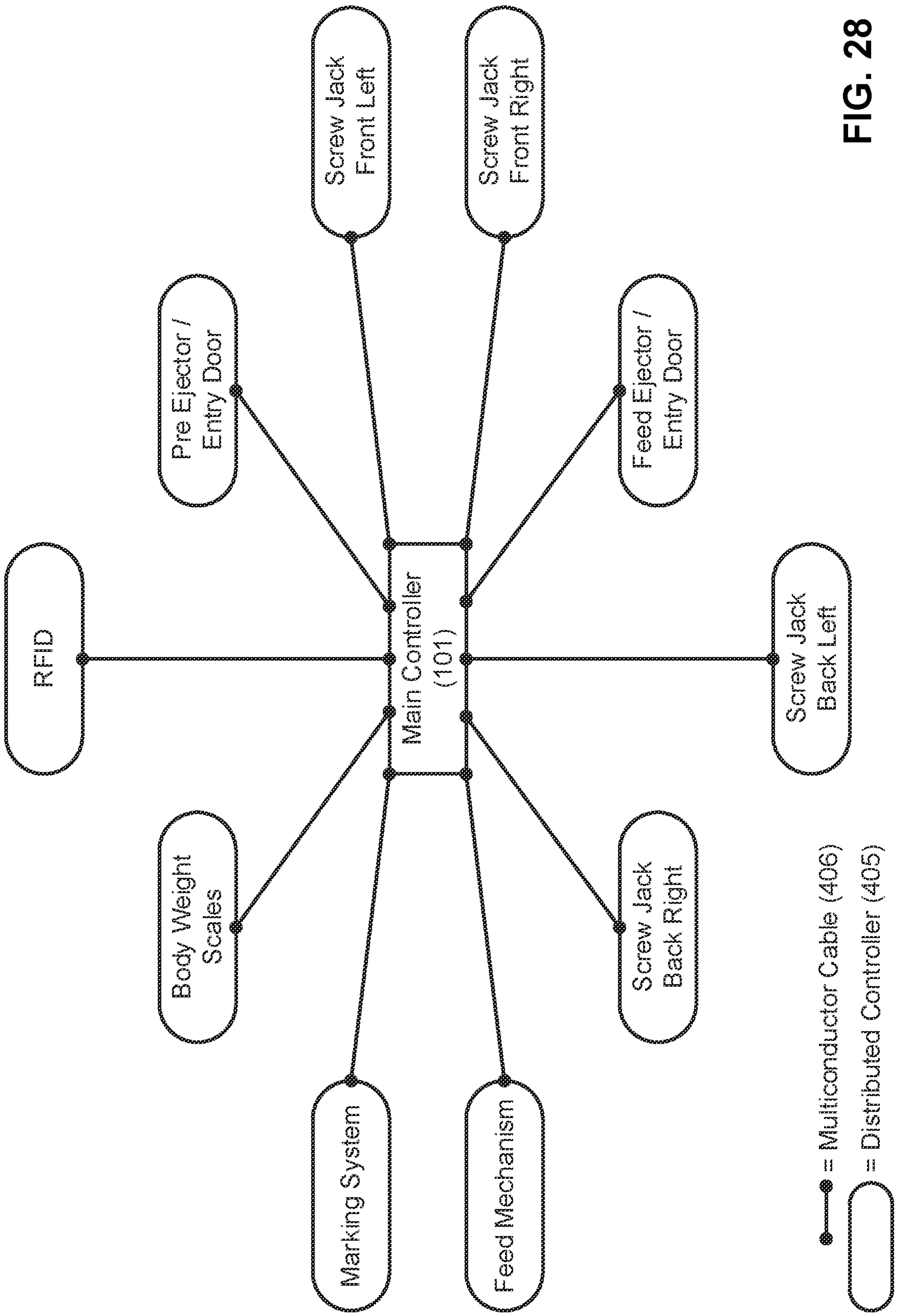
FIG. 28 is a block diagram depicting distributed controllers for a main feeding station using a star bus topology.

The use and calculation of accelerometers to determine level and orientation is well defined in the art. What is important is that the height increase and decrease of station 100 needs to include checking the angle of inclination of station 100 while it is moving to ensure that station 100 is moving up and down parallel to the surface of the earth. In some embodiments, main controller 101 (as shown in FIG. 28) can operate an algorithm to check the current level of station 100. Referring to FIG. 14, one embodiment of level checking algorithm 1400 is shown in the flowchart thereon that can be carried out by main controller 101 to check how level station 100 is. In some embodiments, level checking algorithm 1400 can comprise the following steps. Starting at step 1404, the orientation of station 100 can be calculated by using accelerometer output values at step 1408. At step 1412, how deviated station 100 is from level can be calculated. At decision step 1416, if the deviation from level is within predetermined limits, the station level flag can be set to "true" at step 1420, wherein algorithm 1400 proceeds to return step 1428. If the deviation from level is not within predetermined limits, then the station level flag can be set to "false" at step 1424, wherein algorithm 1400 proceeds to return step 1428.

Figure 15:
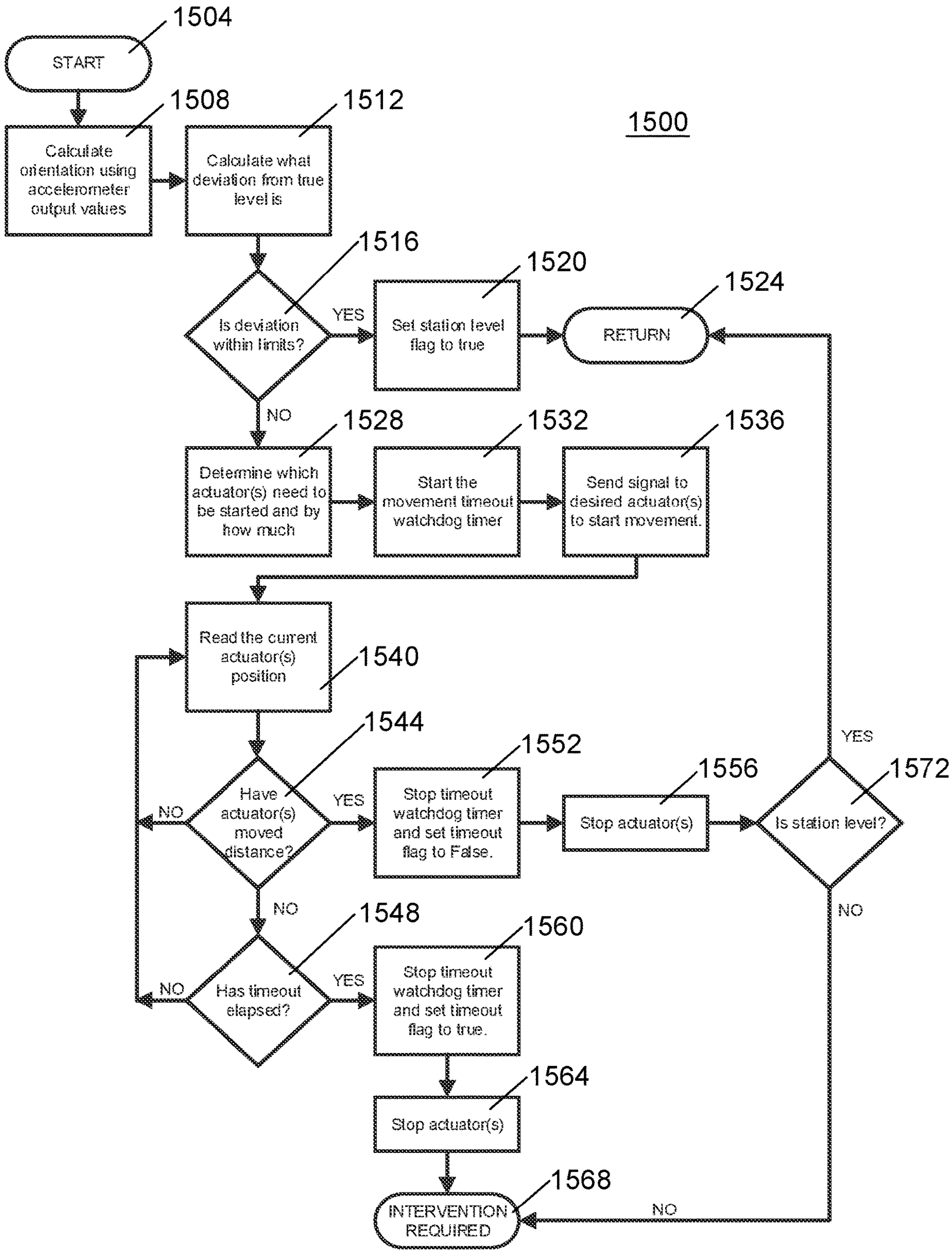
FIG. 15 is a flowchart depicting the implementation of an auto level algorithm for the improved feeding station of FIG. 1.

Referring to FIG. 15, one embodiment of station leveling algorithm 1500 is shown in the flowchart thereon that can be carried out by main controller 101 to level station 100. In some embodiments, station leveling algorithm 1500 can comprise the following steps. Starting at step 1504, the orientation of station 100 can then be calculated using accelerometer output values at step 1508, followed by calculating the deviation from level of station 100 at step 1512. Then, at decision step 1516, a determination can be made whether the deviation from level is within predetermined limits. If the deviation is within predetermined limits, then the station level flag is set to "true" at step 1520, wherein algorithm 1500 proceeds to return step 1524. If the deviation is not within predetermined limits, then a determination is made at step 1528 of which actuator(s) need to be started and by how much, followed by starting a movement timeout watchdog timer at step 1532. A signal can then be sent to the desired actuator(s) to start movement at step 1536, followed by reading the current actuator(s) position at step 1540. At decision step 1544, if the actuator(s) have moved the required distance, then the timeout watchdog timer is stopped and timeout flag set to "false" at step 1552, and then the actuator(s) are stopped at step 1556, whereupon algorithm 1500 proceeds to decision step 1572 to determine if station 100 is level. If station 100 is level, then algorithm 1500 proceeds to return step 1524. If station 100 is not level, then algorithm 1500 proceeds to step 1568 where intervention is required. If the actuator(s) have not moved the required distance at step 1544, a further decision is made at step 1548 to determine if the timeout watchdog timer has elapsed. If not, then the process can return to step 1540 to read the current actuator(s) position. If the timeout watchdog timer has elapsed at step 1548, then the process proceeds to step 1560 to stop the timeout watchdog timer and to set the timeout flag to "true", whereupon the actuator(s) are stopped at step 1564 and then algorithm 1500 proceeds to step 1568 where intervention is required.

In some embodiments, the accelerometer can output an analog signal for each axis which will require conversion using a standard analog to digital converter to provide numerical values for the calculation of orientation of the sensor to the surface of the earth. In other embodiments, the accelerometer can do those conversions internally and present already converted digital numeric values to main controller 101 for calculation of the orientation of the sensor to the surface of the earth. It is important to note that while station 100 is in motion, the accelerometers can detect the vibration of station 100 movement from the lifting mechanism. To deal with this vibration, the algorithm can either stop movement, wait a settling time, and then take a reading, or incorporate some kind of filtering or smoothing algorithm which removes the effect of the vibration. Generally, the movements of stations 100 can be small and regular and, as such, the filtering and smoothing will not be required as the fine level adjustments can be made after primary motion has stopped.

It is important to note that due to many reasons including vibration, electrical noise, calibration issues and numerical rounding, it is very unlikely that the accelerometer will be able to reach absolute true level to the surface of the earth.

As such, the calculation for the current orientation of station 100 will need to be compared to true level with an accommodated deviation from true level in which station 100 may not be completely true level but close enough to allow proper and safe operation of feeding station 100.

Figure 13:
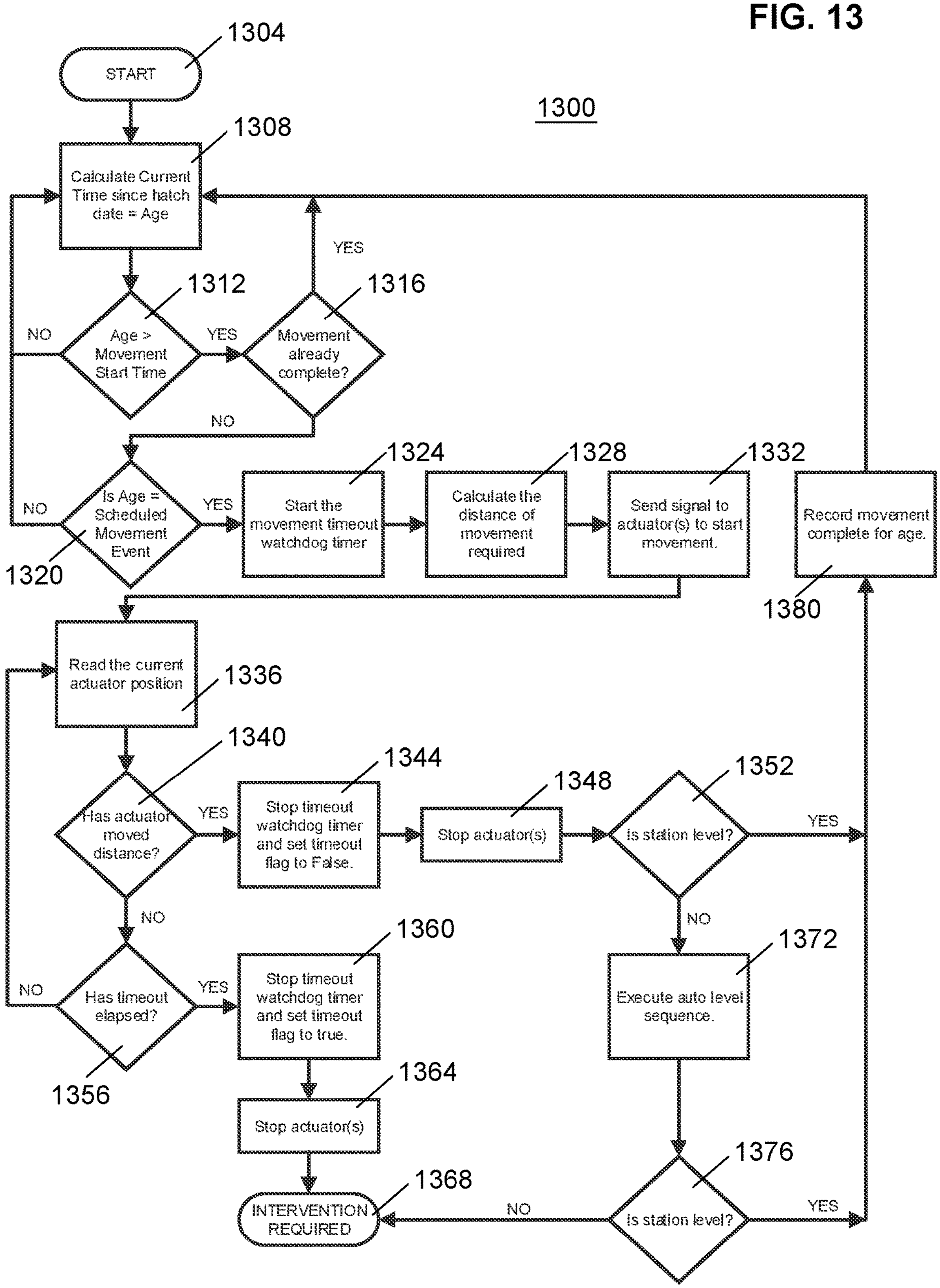
FIG. 13 is a flowchart depicting the implementation details of aged-based height adjustment for the improved feeding station of FIG. 1.

The decision to raise or lower station 100 can come from a plurality of algorithms of differing complexity. Some algorithms can require real time analysis of actual bird growth which will require the complex calculation of the average bird size from all of the bird weight data in the flock. Other algorithms can use a time interval system that can be based on the hatch date of the birds or can be triggered off expected target bird body weights. In some embodiments, the producer can manually increase or decrease station 100 height on their own as determined by experience or the facilities standard operating procedures. Whatever algorithm is implemented, a schedule of movement events can be formulated and as those events come due, main controller 101 can keep track of which movements have been done. The algorithms can be implemented as executable machine code that can be disposed in a physical computer readable memory disposed on or in main controller 101 disposed on station 100, or as executable machine code that can be disposed in a physical computer readable memory disposed on a fieldbus, or a distributed controller 405 as part of station 100 control executable machine code. In some embodiments, the algorithms can be implemented as executable machine code that can be disposed in a physical computer readable memory disposed on or in a system control and data acquisition ("SCADA") server 3614 that can control and collect the data from many feeding stations 100 at once. In some embodiments, SCADA server 3614 can then send the desired position to main controller 101 that can then activate the appropriate lifting mechanism accordingly. FIG. 13 depicts a flowchart of one embodiment of station height setting algorithm 1300 that can operate station 100 based on the age of the birds where station 100 can start at or near floor level when the birds have just hatched, and then increasing the height of station 100 to maximum height when the birds have reached 22 weeks of age whereupon the height can remain constant.

In some embodiments, station height setting algorithm 1300 can comprise the following steps. Starting at step 1304, the difference between the current time and the hatch date of the birds can be calculated to determine the age of the birds at step 1308. At decision step 1312, if the bird's age is not greater than the movement start time, then algorithm 1300 returns to step 1308. If the bird's age is greater than the movement start time, then algorithm 1300 proceeds to decision step 1316 to determine if the movement has been completed. If "yes", then algorithm 1300 returns to step 1308. If "no", then algorithm 1300 proceeds to decision step 1320, whereupon if the bird's age does not equal the scheduled movement event, then algorithm 1300 returns to step 1308. If the bird's age does equal the scheduled movement event, then the movement timeout watchdog timer is started at step 1324, the distance of movement required is calculated at step 1328, signals are sent to the actuator(s) to start movement at step 1332 and then the current position of the actuator(s) are read at step 1336. At decision step 1340, a query can be made if the actuator(s) have moved the required distance. If "no", then a query can be made at decision step 1356 if the movement timeout watchdog timer has elapsed. If "no", then the process returns to step 1336. If "yes", then the process stops the movement timeout watchdog timer and sets the timeout flag to "true" at step 1360, followed by stopping the actuator(s) at step 1364 and then proceeding to step 1368 where intervention is required. If the actuator(s) have moved the required distance at step 1340, the algorithm 1300 can then stop the movement timeout watchdog timer and set the timeout flag to "false" at step 1344 followed by stopping the actuator(s) at step 1348. Then, at decision step 1352, a query can be made if station 100 is level. If "yes", then algorithm 1300 can proceed to step 1380 where the movement for age and thus the height can be recorded as complete before proceeding back to step 1308. If "no", then the auto level sequence, as described in algorithm 1500, can be carried out at step 1372. Then, at decision step 1376, a query can be made if station 100 is level. If "no", then algorithm 1300 can proceed to intervention required step 1368. If "yes", then algorithm 1300 can proceed to step 1380 described above.

Most embodiments of lifting mechanisms with electromechanical actuators can have a home position of the station at the lowest point that can be confirmed by a limit switch, as well known to those skilled in the art. This limit switch can comprise one or more of a capacitive type proximity sensor, a magnetic read switch, mechanical switch or any other device suitable for this purpose as well known to those skilled in the art. In some embodiments, an upper limit switch can be implemented that can detect when the device is at its highest point. These limit switches can provide safety to prevent main controller 101 from moving the device past its limits and causing potential damage or binding conditions. In addition to the limit switches, the devices can also include hard stops that are stronger than the motor torque and can cause the motor to stop operating when the motor contacts the hard stop. In some embodiments, hard stops are not necessarily desirable as, depending on the lifting mechanism used, they can cause excessive wear on bearings, drive components, and motors, or require user intervention to restore operation. For those systems with limit switches, the limit switches can be wired to main controller 101 or a distributed controller 405 to sense the position as well as to the moving mechanisms themselves to electrically cut off movement when triggered thus preventing any undesirable movement past the limit switch. Other embodiments can rely on main controller 101 to stop the movement programmatically when triggered.

Detecting the current position of station 100 above the floor can be achieved in a plurality of ways depending on the implementation of the lifting mechanism and, in some embodiments, can be completely decoupled from the lifting mechanism itself. In some embodiments, the current position of station 100 can be relative to a limit switch or an actual measurement of the distance to the floor using a fixed known point. In some embodiments, this can comprise a linear potentiometer coupled to the lifting device that can change the resistance at the output as the position of the device changes. In some embodiments, this can comprise an encoder connected to a motor shaft with a formula which can be used to count encoder pulses to actual movement of the actuator through a connected gear box and lifting mechanism, or it could be some other configuration that can allow the measurement of the position. In some embodiments, an ultrasonic, capacitive, or laser based measurement system can be affixed to station 100 that can measure the actual height of the point of connection to the floor or ceiling of the building.

In some embodiments, the lowering of station(s) 100 back to its/their lowest level at the end of a flock growth cycle, or for maintenance and a repair can likely be done in a single movement motion. This can be done by starting the motion of the actuator or actuators in the downward motion and then waiting until the current position sensor detects that it is at the bottom, or, even simpler, it can just move until the lower limit is triggered. The request to move down can be initiated through main controller 101 from central SCADA server 3614, by control panel 325 disposed on station 100 using a button or a lever, or through wireless controller 3602 near station 100 itself or through a distributed controller 405. Other embodiments can provide a down button on main controller 101 that the user will need to hold down to move station 100 to its lowest point. This embodiment can provide the ability for the operator to make sure nothing is blocking the descent of station 100. In some embodiments, sensors can be added to the undersection of feeding station 100 to ensure that there are no obstructions such as birds or other equipment under station 100 before lowering stations 100 back from a raised position.

In some embodiments, a plurality of lifting legs 206 can be disposed around a perimeter of station 100 (as shown in FIGS. 2 to 5) as a means to raise and lower station 100 between a lowered position and a raised position. In some embodiments, one or more lifting legs 206 can comprise a screw jack configured to raise or lower station 100, and can be comprised of metallic components and/or reinforced non-metallic components should metallic components interfere with onboard radio frequency identification ("RFID"), or can provide manufacturing or mechanical performance benefits such as corrosion resistance, cost, strength, etc.

In some embodiments, the screw jack can comprise of electric gear motor 220 coupled, shown as 222, to lead screw 216 that, when activated, can drive lead nut 211 rigidly fixed to lifting leg 206 by means of machined nut adapter plate 218. Rotating screw 216 forward or reverse pushes or pulls lifting leg 206 in or out of screw jack housing 204. To prevent free rotation of lifting leg 206, internal lifting leg guides 215,219 can be retained within housing 204, by retaining block 214 that can prevent loss of translation in lifting leg 206. The force acting through screw 216 that would press up towards motor 220 can be taken by trust bearing pad 217 fixed to mounting cap 207. Mounting cap 207 can secure jack housing 204 to the rest of the assembly, as well as providing a mounting location for thrust bearing pads 217,221. Main wear pad 217 can be mounted to the 'screw side' of mounting cap 207 and secondary wear pad 221 can be mounted to motor side 220. In this embodiment, motor coupler 222 can hold screw 216 captive between the two thrust wear surfaces 217,221. There may be a case where the direction of force is opposite that which is natural to a screw jack. In some embodiments, secondary bearing pad 221 can provide a surface for motor coupler 222 to press against while in this state. In this embodiment, electric gear motor 220 can be protected by motor can 202 sandwiched between two end plates, motor mounting plate 208 and motor back plate 209. The assembly can be clamped with threaded rods 201 that can screw into mounting cap 207 spaced off with spacer 203. Cable glands 200 disposed on motor back plate 209 can provide cable access for motor 220 and, potentially, encoders, proximity sensors and temperatures sensors that can be connected to a printed circuit board that can provide motor/motion control and position feedback to main controller 101. This internal printed circuit board can form a distributed controller 405 node on the communication bus. The screw jack can be mounted to frame structure 110 in a plurality of ways known to those skilled in the art. In the embodiment shown in FIGS. 2 through 5, this can be accomplished with a bolt through frame structure 110 and rivet nut 205 that can rigidly couple the screw jack to frame structure 110.

In some embodiments, lead nut 211 and nut adapter plate 218 can be combined into a single machined part. Other embodiments can comprise machined threads into a hollow bore motor and/or gearbox assembly, significantly reducing the number of parts.

In some embodiments, the electric gear motor can be removed to provide manual lifting of station 100 by employing the use of a wrench and machined hex, or by the incorporation of a wheel, or other manual means a person skilled in the art could devise.

In some embodiments, hydraulic or pneumatic motors can be employed to provide the rotational motion to raise or lower the screw jacks. In other embodiments, these hydraulic or pneumatic controls can, instead, be connected to a hydraulic cylinder or a pneumatic cylinder incorporating a piston with piston rod that can replace the screw jack as an alternate mechanism that can extend and retract lifting legs 206 to raise and lower feeder station 100.

In some embodiments, various direct or indirect couplings could be made. There are a multitude of rigid and flexible shaft couplers as well known to those skilled in the art. One example can include U-joints that can accommodate higher misalignments, or other direct couplings those skilled in the art could devise. Indirect couplings could be made by use of one or more of pulleys, gears, rack and pinion, and sprocket and chain. These could be used to drive singular or multiple screw jacks at one time, potentially providing more mechanical advantage through a reduction ratio.

In some embodiments, nut 211 can be driven and screw 216 can act as the reciprocating lifting leg. In other embodiments, the lifting leg can be sealed against particulate ingress which may lower reliability and cause issue with the mechanism.

Figure 6:
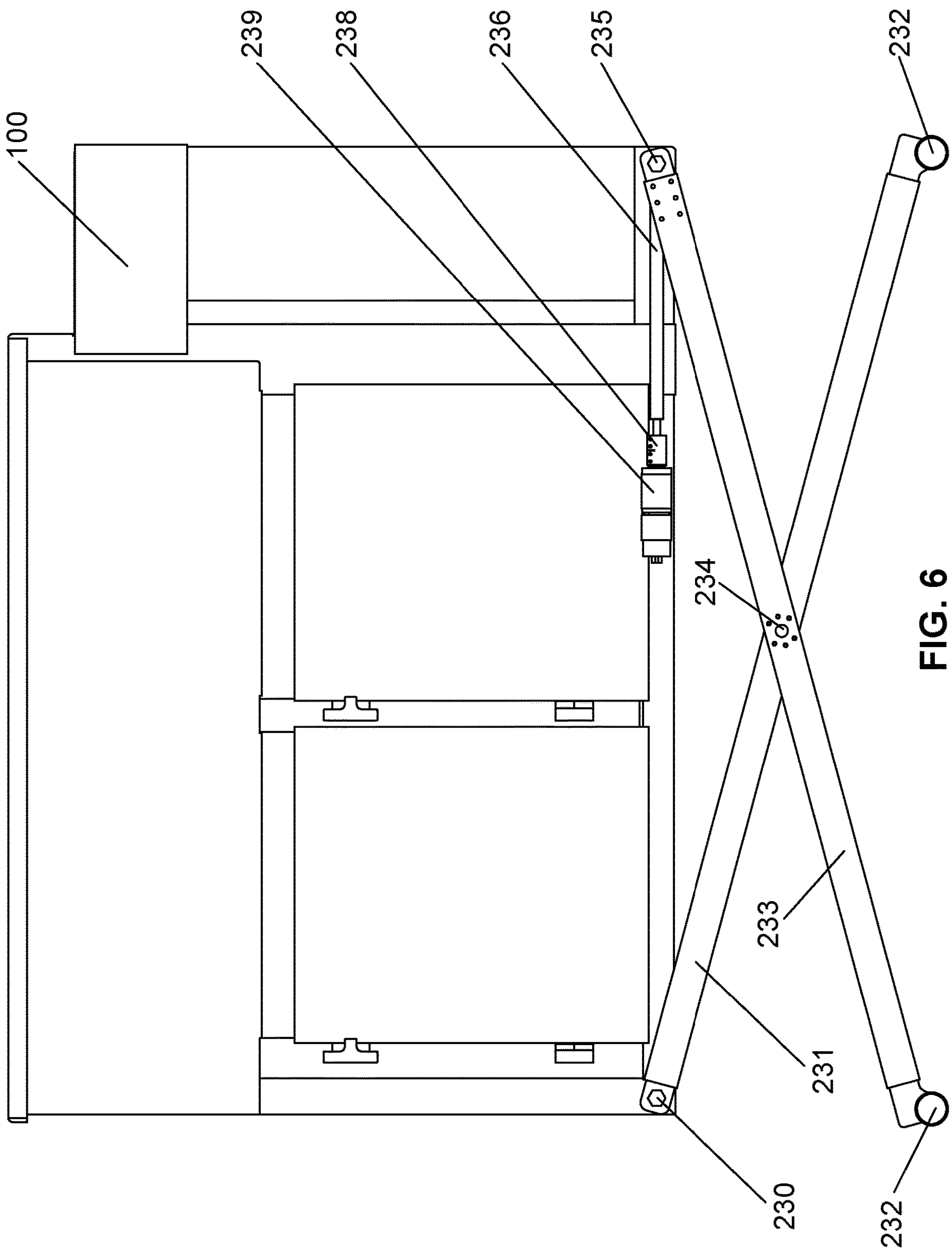
FIG. 6 is side elevation view depicting a scissor lift-based lifting mechanism for use with the improved feeding station of FIG. 1.

In some embodiments, a scissor lift mechanism (as shown in FIG. 6) can be configured to raise feeding station 100 and can be comprised of metallic components and/or non-metallic components should the metallic components interfere with onboard RFID. Other substitutions can provide manufacturing or mechanical performance benefits such as lower cost, ease of assembly, and enhanced corrosion resistance.

In one embodiment, the scissor lift mechanism can comprise of two lifting arms 231,233 fixed by two anchor points 230,235 such that one anchor point can provide a fixed pivot point 230 and the other anchor point can provide a floating pivot point 235. In some embodiments, floating pivot point 235 can be driven by a linear or rotary actuating mechanism 239. This can be achieved through the use of one or more of cam rollers, journal bearings/friction pads, or other means that anyone skilled in the art can devise. In some embodiments, lifting arms 231,233 can be joined by central pivot 234 such as a journal, roller, ball, or spherical bearing. The fixed, central, and floating pivots create a mechanical system and means to "open" and "close" a scissor mechanism. The locations of fixed pivot point 230 and floating pivot point 235 can be in orientations and locations other than what has been shown in FIG. 6. In some embodiments, a linear actuation mechanism can be used, driven by lead screw 236 with a lead nut, rigidly mounted to sliding pivot point 235. The linear actuation mechanism can be powered by electric gear motor 239 coupled to lead screw 236 with coupler 238 and when floating pivot point 235 is moved inwards closer to fixed point 230, station 100 can rise.

In some embodiments, motor 239 and the linear motion assembly can be attached to lifting arm 231 or 233 close to a castor 232. The drive can then be mounted directly above the castor anchor point and rigidly attached to the station 100. This can provide a mechanical advantage compared to the embodiment shown in FIG. 6 while also changing the direction of force along the axis of screw 236 from tension to compression in the action of lifting station 100. Other embodiments can use hydraulic or pneumatic actuation or other electro-mechanical means such as pulleys and cables. A locking or ratcheting mechanism or friction brake can be employed to prevent back driving of station 100 while not under power. In some embodiments, lowering station 100 may or may not require power to collapse the scissor lift mechanism. In some embodiments, position of the mechanism can be tracked via encoders, proximity sensors, timers, or other means as well known to those skilled in the art.

In some embodiments comprising a low profile scissor lift mechanism, both fixed anchor lifting arm 231 and sliding anchor lifting arm 233 can end up in a parallel orientation on the same plane. This position can create a 'no-start' condition where no amount of force is able to start the movement of the lift. In some embodiments, a helper mechanism can be employed, such as a counterweight or a gas cylinder. The helper mechanism can allow the initial 'no-start' orientation to be overcome until main driving mechanism 239, 238, 236 takes over.

In some embodiments, the driving mechanism is not anchored to lifting arms 231, 233 directly but through a mechanical lever, cam, or other equivalent mechanism. In such embodiments, the anchor position of drive mechanism 235 can be moved along any position of lifting arms 231, 233 for mechanical advantages.

To prevent injury to personnel or animals, some embodiments of station 100 can comprise guarding to prevent access to hazardous locations of the assemblies. Guarding can prevent access to pinch points around pivot points 230,234,235 or can prevent access to rotating machinery such as lead screw 236 or motor coupler 238. In some embodiments, full guarding can be placed around the unit to prevent bird access under station 100. In some embodiments, sensors can be used to detect birds under station 100 and intervene with the operators attempt to lower station 100 prematurely.

Figures 8A, 8B:
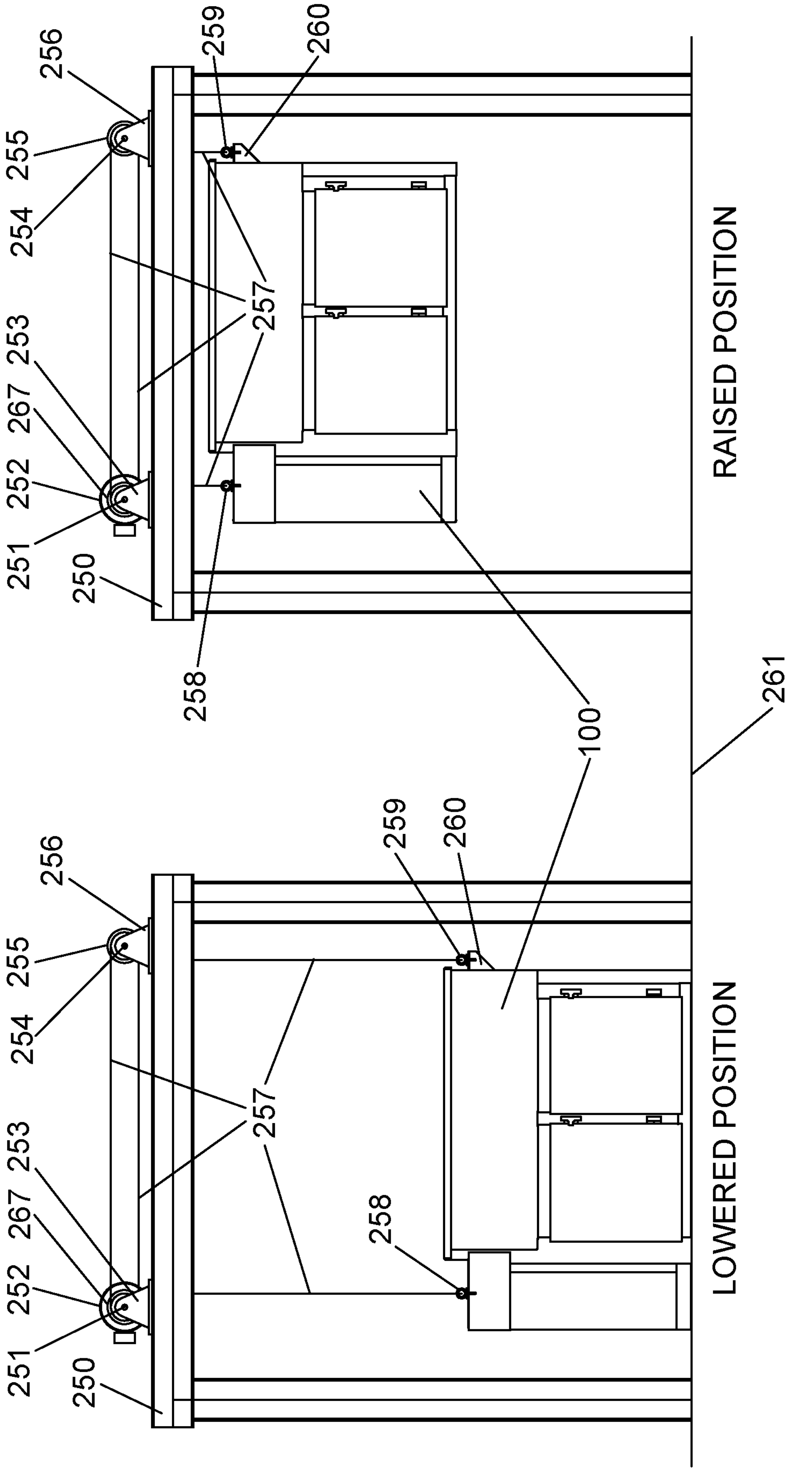
FIG. 8A is a side elevation view depicting a pulley frame-based lifting mechanism for a single improved feeding station of FIG. 1 in a lowered position.
FIG. 8B is a side elevation view depicting a pulley frame-based lifting mechanism for a single improved feeding station of FIG. 1 in a raised position.
Figure 9:
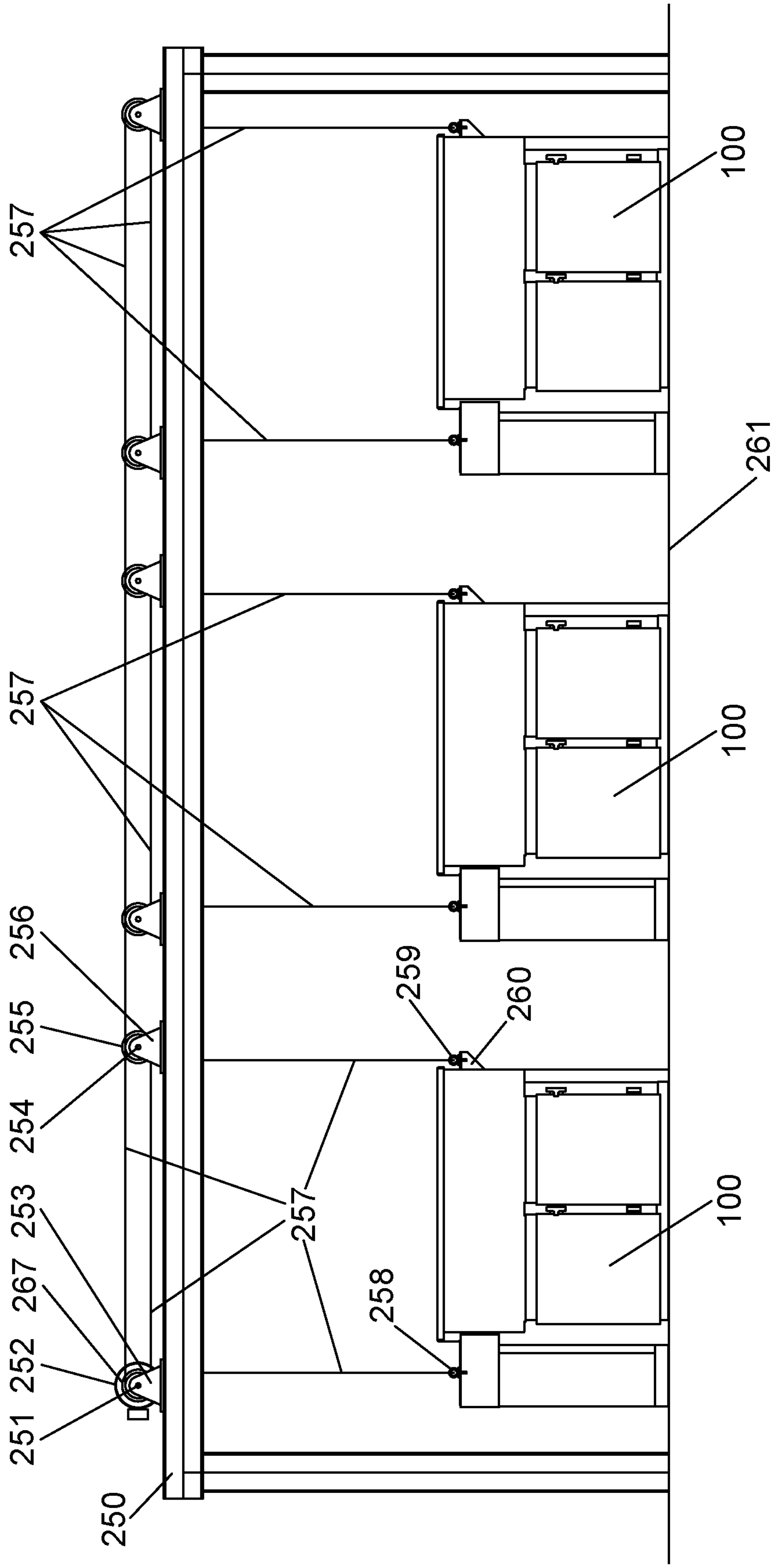
FIG. 9 is a side elevation view depicting the pulley frame-based lifting mechanism of FIGS. 8A and 8B with three stations in a lowered position coupled together through a single cable to a single motor.
Figure 10:
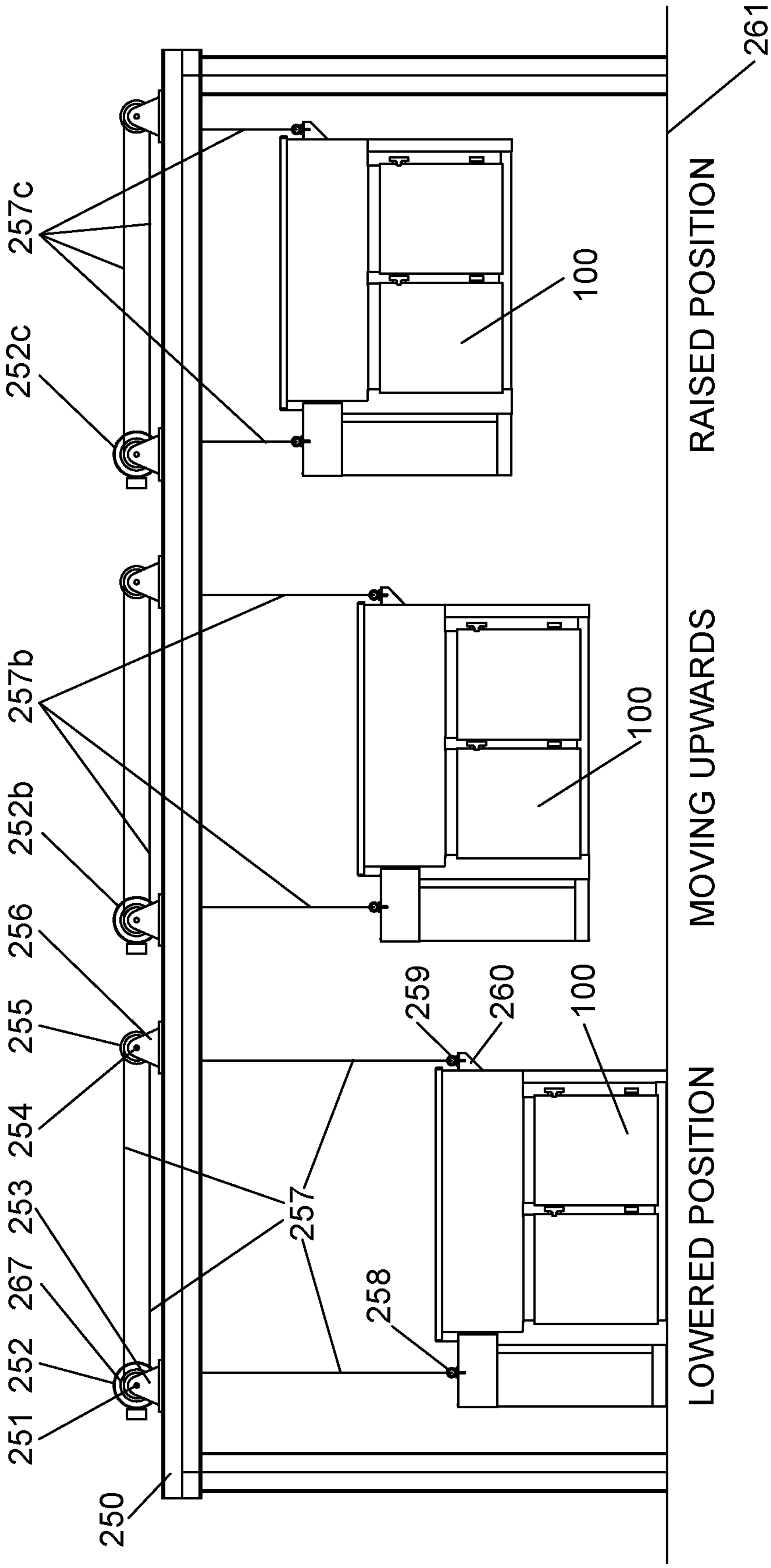
FIG. 10 is a side elevation view depicting the pulley frame-based lifting mechanism of FIGS. 8A and 8B with one station in a lowered position, one station in a mid position, and one station in a fully raised position.
Figure 11B:
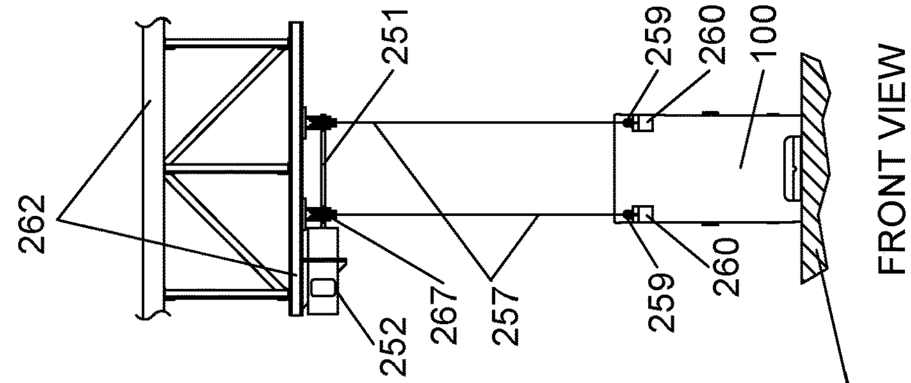
FIG. 11B is a front elevation view depicting the multiple improved feeding stations of FIG. 11A.
Figure 11A:
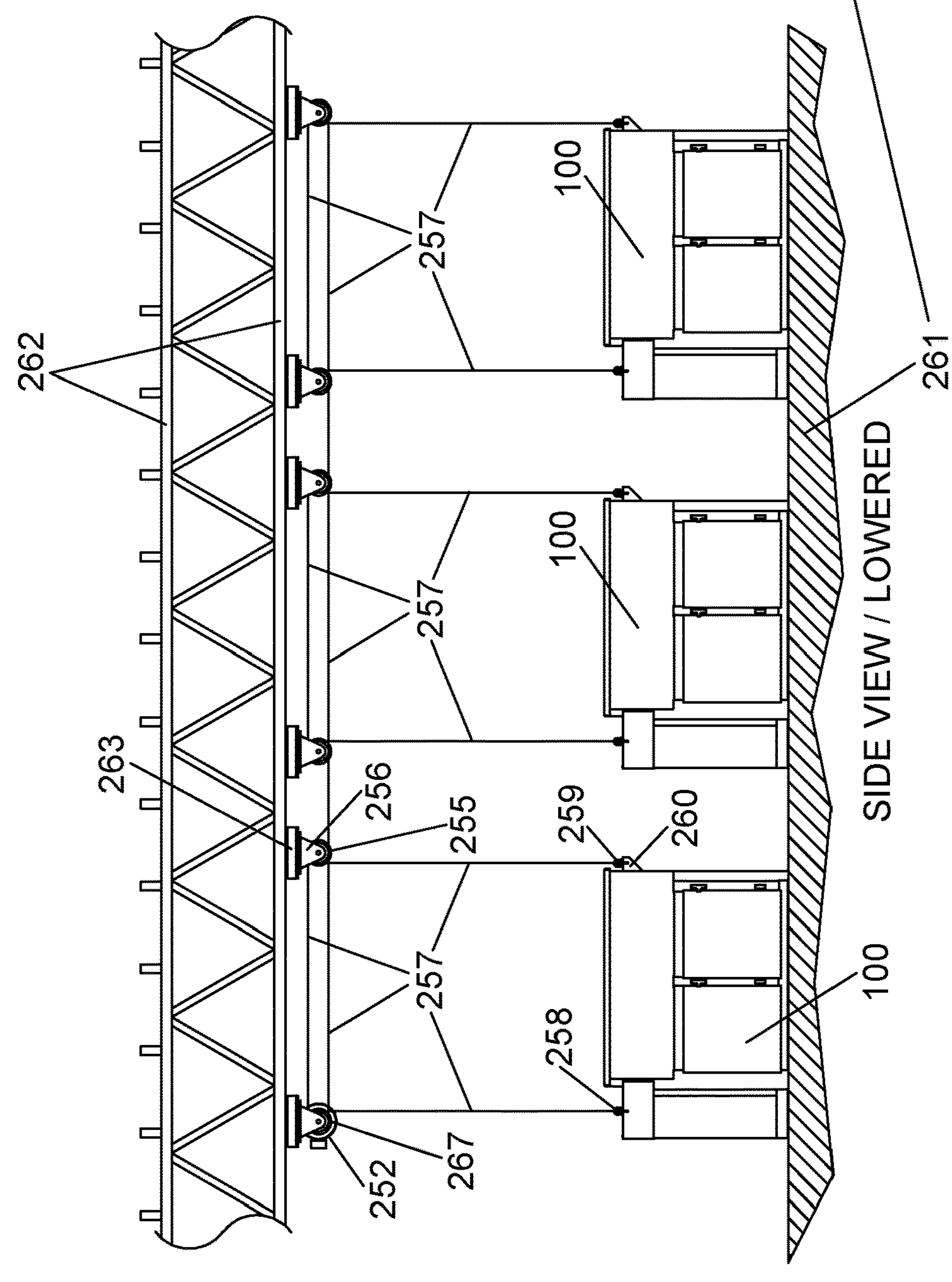
FIG. 11A is a side elevation view depicting a ceiling based-pulley lifting mechanism with multiple improved feeding stations in a lowered position coupled together through a single cable to a single motor.
Figures 12A, 12B:
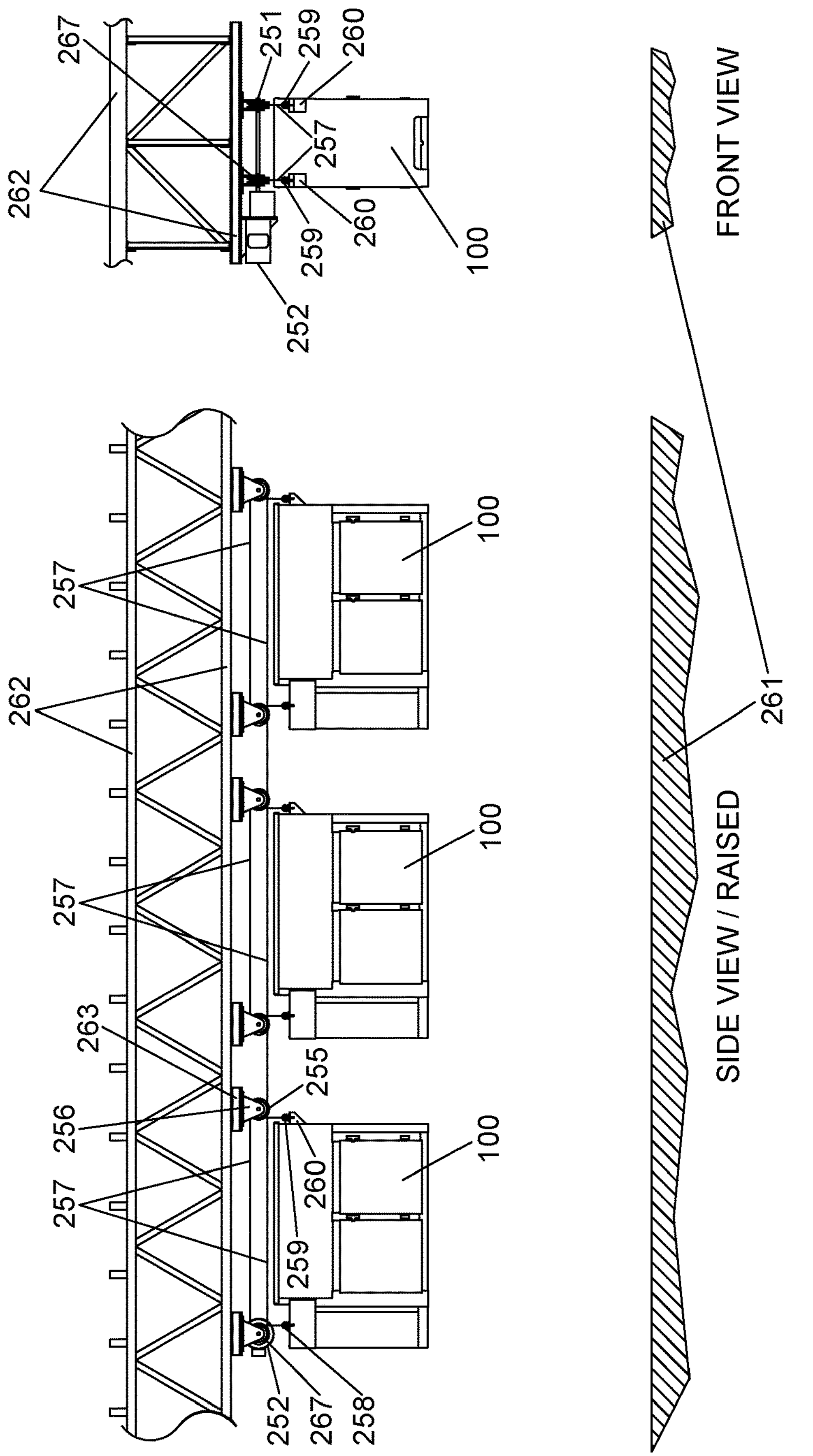
FIG. 12A is a side elevation view depicting the multiple improved feeding stations of FIG. 11A in a raised position.
FIG. 12B is a front elevation view depicting the multiple improved feeding stations of FIG. 12A.

In some embodiments, as shown in FIGS. 8A, 8B and 9, feeding station 100 can be suspended by built in anchor points to raise and lower feeding stations 100. Lifting anchors 258,259 can be comprised of various materials such that they provide enough strength to securely raise and lower station 100 for extended periods of time, these lifting anchors 258,259 can be directly coupled to frame structure 110 or coupled to frame structure 110 through bracket 260. In other embodiments, these lift anchors 258,259 can be replaced with a pulley mechanism. In some embodiments, tension members 257 of the pulley mechanism can comprise one or more of cables, chains, composite ropes and other equivalent mechanisms as known to those skilled in the art. A system for raising and lowering stations 100 can be provided to suit a multitude of differing tension members 257. In some embodiments, many stations 100 can be raised from a single frame 250 as shown in FIGS. 9 and 10, or have single unit frames as shown in FIGS. 8A and 8B. In some embodiments, there can be independent control over each station 100 utilizing individual drive units 252, or a means to divert power from a single motor 252 to various stations 100, which can be accomplished via means including one or more of clutches, mechanical switches, valves in a hydraulic or pneumatic system and other equivalent mechanisms as known to those skilled in the art.

In some embodiments, as shown in FIGS. 9 and 10, feeding station 100 can be hung from rigid frame 250 that can be built of common structural members such as hollow structural sections, structural angles, I, C or H beams, or other cross sections as known by those skilled in the art. In some embodiments, frame 250 can provide a support structure for a pulley mechanism comprised of motor 252, pulleys 255, bearing blocks 253, pulley shaft 254, pulley bearing block 256, and drive shafts 251. These components can be used to wind up cable 257 leading from motor cable drum 267 to suspended stations 100. As motor 252 winds tension member 257, stations 100 can be raised from ground 261. Stations 100 can be supported by a single anchor or by multiple anchor locations. In some embodiments, multiple anchor points can be desirable to provide stability and to prevent swaying of stations 100 unit when in use.

In some embodiments, as shown in FIGS. 11A, 11B, 12A and 12B, frame 250 can be removed with stations 100 being raised from the building's ceiling and roof structure 262. These embodiments can comprise a similar construction of motor 252, motor cable drum 267, pulleys 255, bearing blocks 253 and drive shafts 251. These components can be mounted to ceiling 262 with bracket 263 in accordance with best engineering practices as known to those skilled in the art. As motor 252 winds cable 257, stations 100 can be raised from the ground 261.

In other embodiments, tension members 257 and pulleys 255 can be exchanged for chains and sprockets, belts and toothed pulleys or other mechanisms equivalent in function to the pulley mechanism as known to those skilled in the art. In other embodiments, tension members can be used as cross bracing to further stabilize the unit while in use and prevent swinging.

Figure 7:
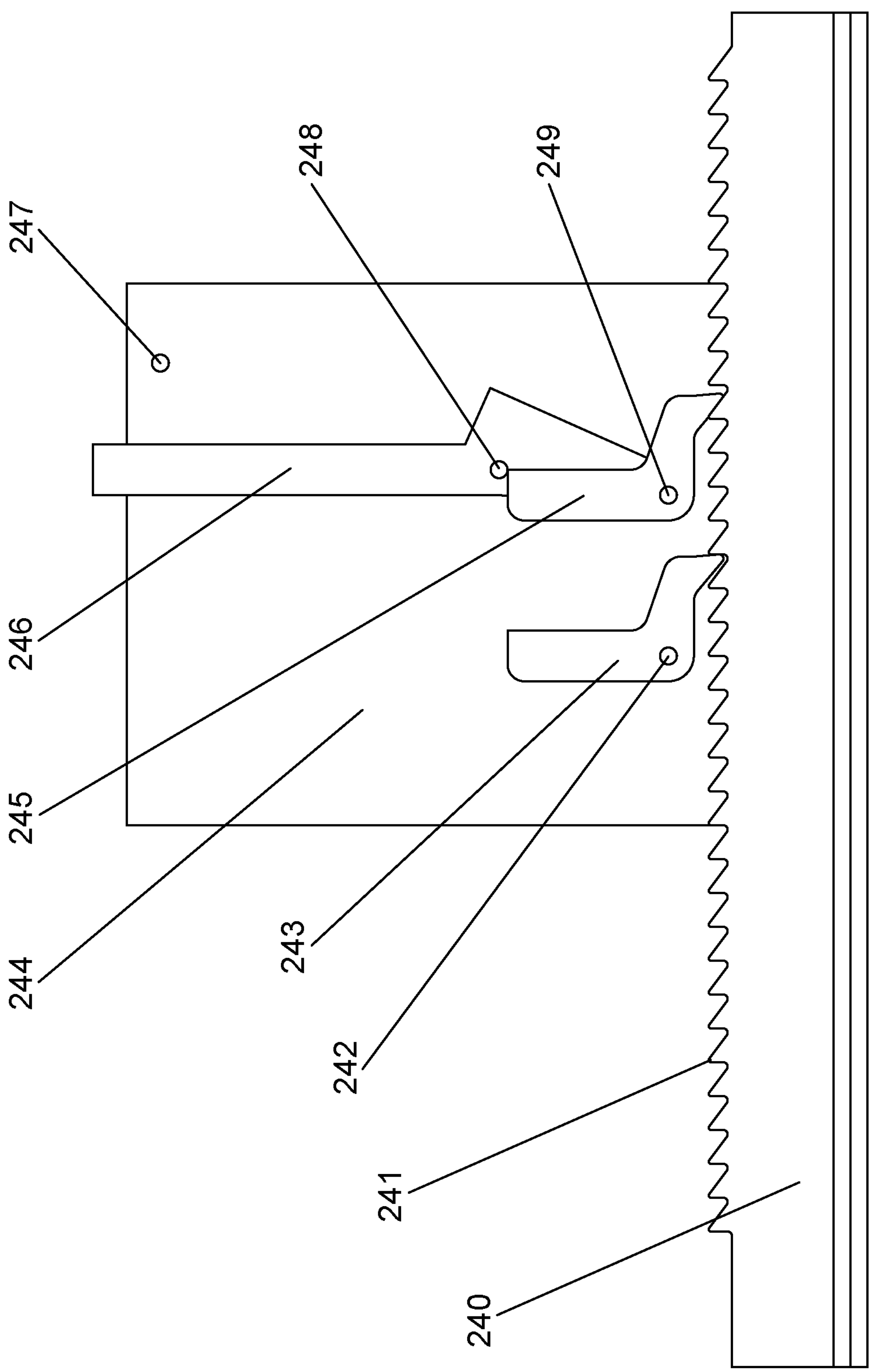
FIG. 7 is a side elevation view depicting a ratchet-based lifting mechanism with the improved feeding station of FIG. 1.

In some embodiments, feeding station 100 can be raised or lowered by use of a ratcheting jack mechanism as shown in FIG. 7. The ratcheting system can be incremented manually or by use of electric motor, hydraulic cylinder, pneumatic cylinder, etc. The ratcheting mechanism will be able to reverse and/or release to allow lowering of the station back to ground level 261. In some embodiments, the ratcheting jack mechanism can comprise of lifting leg 240 with a toothed edge profile that serves as ratchet rack 241. Ratchet rack 241 can interact with pawls 243,245 pivoting on shafts 242,249 mounted on structure 244 to hold the raised station 100 position. In some embodiments, upper pawl 243 holds the position of the leg while lower pawl 245 can be used for lifting station 100. In some embodiments, lower pawl 245 can be attached to lifting arm 246 which when rotated around pivot point 248 can push ratchet rack 241 through increment(s) on first pawl 245. In some embodiments, lifting arm 246 can be returned to its original position and in an embodiment where lower pawl 245 is attached to lifting arm 246, this will increment lower pawl 245. To ensure that lower pawl 245 does not hinder action of upper pawl 243 a stop 247 is attached to structure 244 preventing overtravel. The entire cycle can lift station 100 up at least one rack tooth 241 increment/pitch. Station 100 can have both pawls 243,245 released from rack 241 in order for leg 240 to be returned to the starting position. There are numerous prior art ratcheting mechanism designs as known to those skilled in the art, and many would also be suitable for inclusion into a lifting mechanism.

As a consequence of raising and lowering station 100, the angle of inclination of ramp 266 will change with the height of station 100. Ramp 266 will usually be located on bedding or litter, which is placed on ground 261 in order to provide a softer and adsorbent layer between the concrete or wooden floor of ground 261 and the birds. The consequence of this is that the litter can be disturbed by the movement of ramp 266 caused by the upward or downward motion of station

Figure 37A:
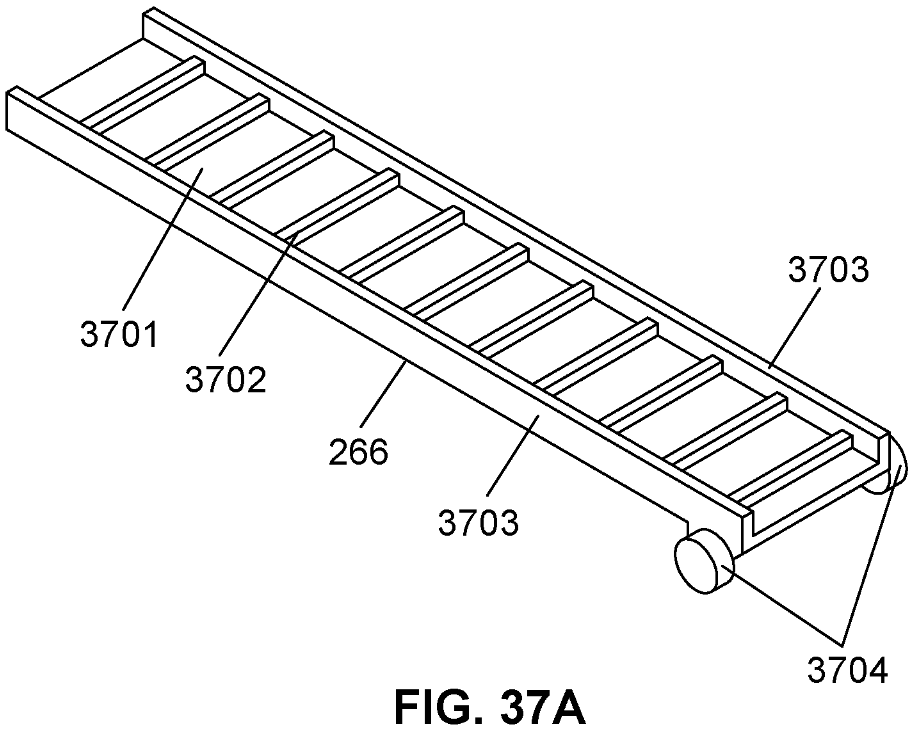
FIG. 37A is a perspective view depicting a ramp using a wheel based inclination adjustment system.
Figure 37B:
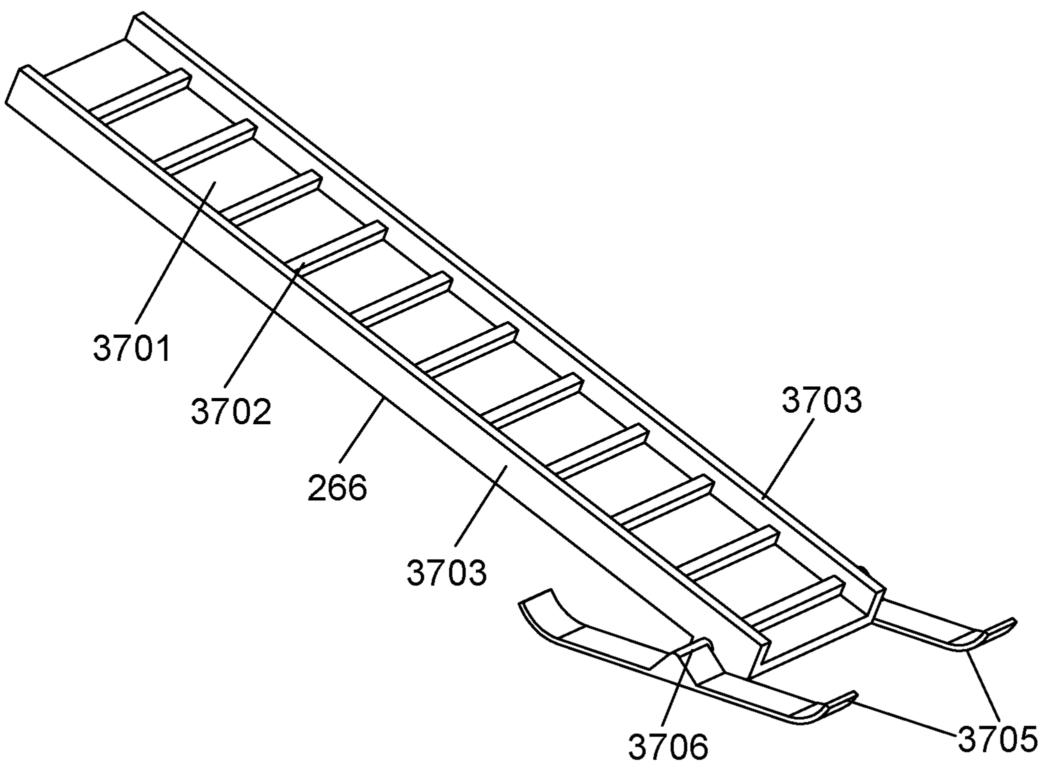
FIG. 37B is a perspective view depicting a ramp using a slide based inclination adjustment system.

100. In order to prevent too much disturbance of the litter, the floor end of ramp 266 can be equipment with wheels 3704, as shown in FIG. 37A, or with sleds 3705, as shown in FIG. 37B, which can be hinged at 3706. Both of these mechanisms can allow ramp 266 to ride on top of the soft litter without digging in and dragging the litter around. There are numerous combinations and variations of configurations of wheels, sleds and other mechanisms that can also be suitable for limiting the disturbance of the litter and are included herein.

One advantage of raising the stations is that depending on the lifting mechanism used it can open up significant increases in floor space underneath for the birds to use to move around and explore and, as such, some embodiments of the invention may include additional lighting for underneath station 100 to encourage the birds to use the space under station 100. The wavelength and intensity of this lighting can be coordinated with the lighting used in the facility to provide even lighting throughout. In addition, this under station lighting could be controlled by the central facility lighting control system to be synchronized with the lighting schedule of the facility and can prevent birds from nesting under the stations 100 and can prevent undesired photo stimulation of the birds.

Figure 16:
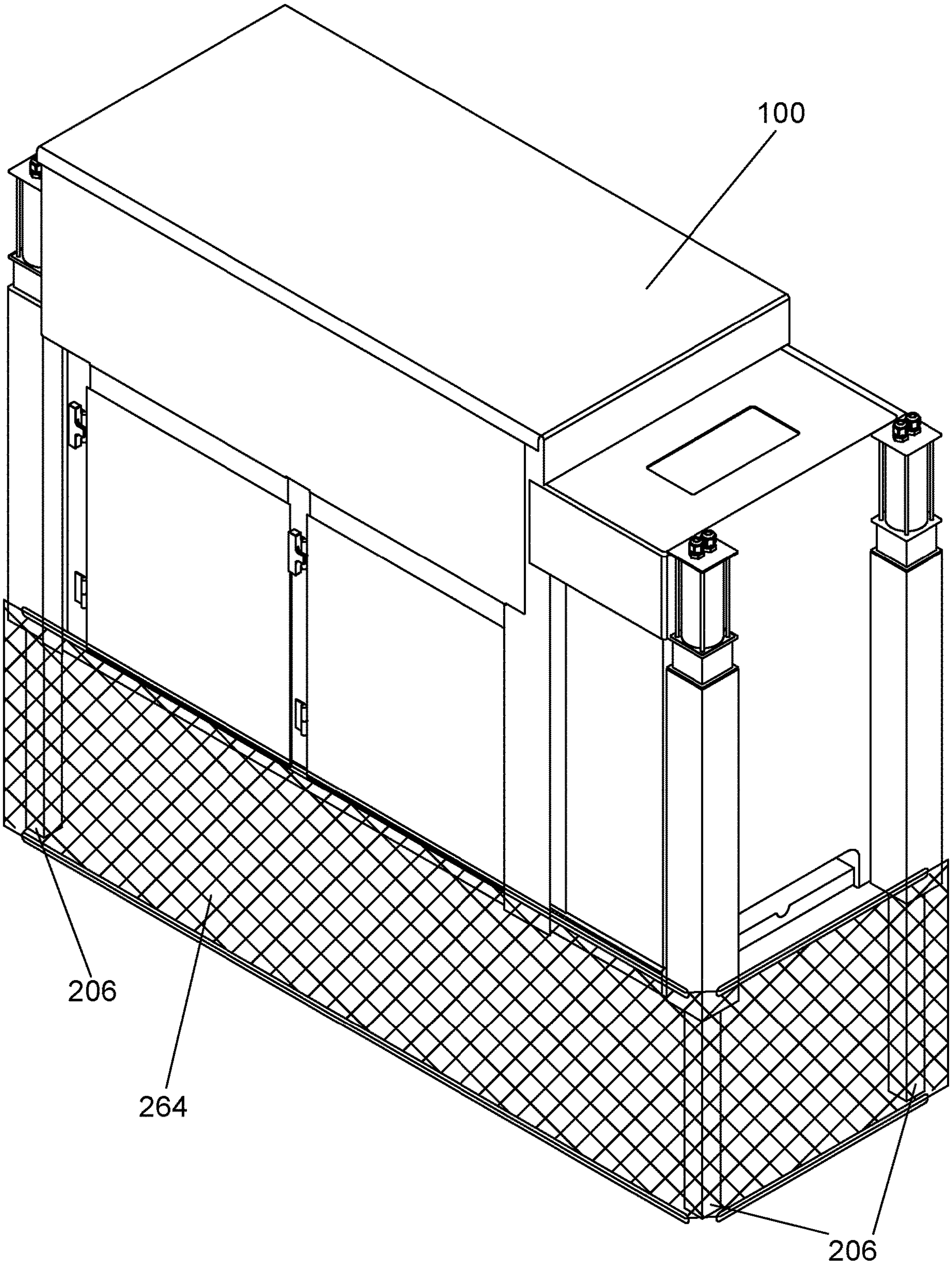
FIG. 16 is a perspective view depicting of the improved feeding station of FIG. 1 in a raised position with netting around the bottom to prevent entry thereunder.

In some embodiments of feeding stations 100, it can be desirable to add a solid or perforated netting, baffles, bellows, or guarding around the perimeter of feeding stations 100 to restrict the birds from accessing the space underneath the stations as station 100 rises. This is particularly important in the case of birds that are in lay as those hens may find the protected space under station 100 desirable for laying resulting in a floor egg problem. These restrictive devices may need to be expandable for those situations where you want to always restrict access to the space from hatch through to the end of the cycle, or they could be added prior to the onset of lay. The selected material for the restrictive devices should be made of a durable material that will withstand pecking and scratching by the birds, as well as the disinfectant cleaning without degrading in performance. In some embodiments, as shown in FIG. 16, the system can comprise the use of barrier 264 around feeding station 100. In some embodiments, barrier 264 can be comprised of netting that can go over station legs 206 to keep birds out of that mechanism as well. In other embodiments, barrier 264 can comprise other forms of a restrictive device, for example, one or more rigid plates of solid material that can be placed around a perimeter of feeder station 100. In such embodiments, the rigid plates may need to be removed prior to the lowering of station 100. In some embodiments, stations 100 can be equipped with a sensor to prevent the lowering thereof if the sensor detects that the restrictive device is still in place and can send an alert to the user to intervene accordingly.

Figure 17:
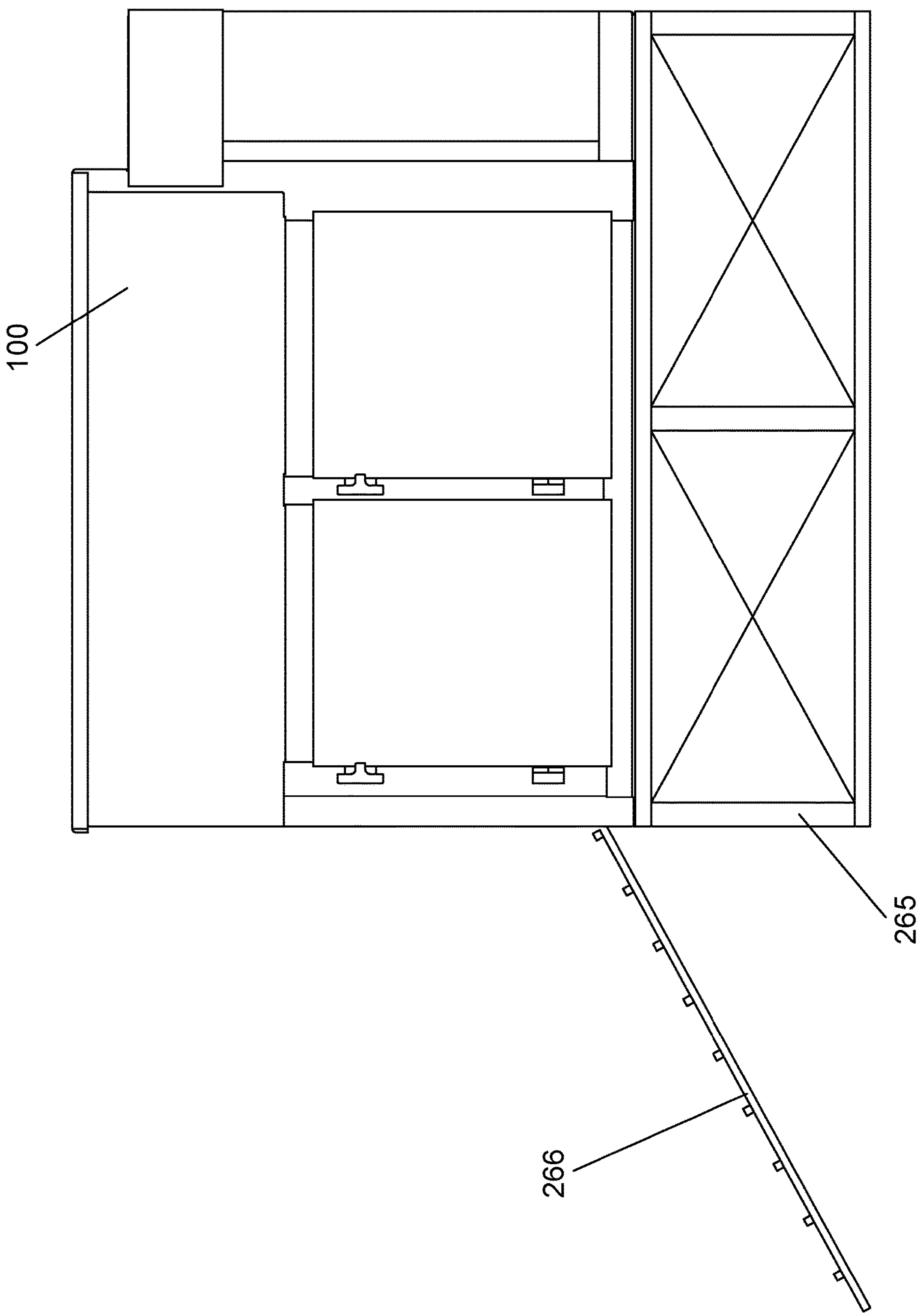
FIG. 17 is a side elevation view depicting an improved feeding station on a fixed size platform.

In some embodiments of the system, such as in a laying barn or production facility where the birds are nearly fully grown, of adequate size, and fully trained on the system, it can be desirable to remove the lifting mechanism altogether and instead include a fixed height spacer attached to the base of station 100. In some embodiments, station 100 can be disposed on top of spacer 265, as shown in FIG. 17, which can provide the required vertical displacement that a fully extended lifting mechanism can provide with only a fraction of the cost and complexity. Affixed to the bottom spacer can be leveling feet, casters, or casters with leveling feet at several locations to assist with maintaining station 100 level.

Training

Unfortunately, birds are not instinctually able to use a feeding system as described herein and, instead, need to be trained to use the system. The key aspect of training is that the birds need to learn that there is only a single source of food available to it and that is in feeding pan 307 in station 100, as shown in FIGS. 1, 18, 19, 20, 22 and 23. Ideally, training needs to start as soon as possible after hatch by placing the feed on ramp 266 into station 100 (as shown in FIGS. 17, 37A and 37B). The feed on ramp 266 can be located on ramp surface 3701 in the space formed between rungs 3702 and side walls 3703. Then additional feed can be placed in sorting scale platform 105 or move the feed after a period of time to sorting scale platform 105, and then additional feed is placed on feeding body weight scale platform 104 or move the feed after a period of time to feeding body weight scale platform 104, and then eventually the feed is available only in feed pan 307, which may or may not have had feed in it the entire time. This will entice the chicks up ramp 266, through sorting compartment 103, and toward feeding pan 307 in feeding compartment 102. This training of the birds to look only at feed pan 307 for food is one reason for having station 100 as low to ground 261 as possible at the beginning of a cycle of bird growth. The lower station 100 is to ground 261 at the beginning of the bird's growth cycle, the more likely the birds are to enter station 100 to feed, the faster the training will progress, and the sooner individual feed control can start.

Figure 18:
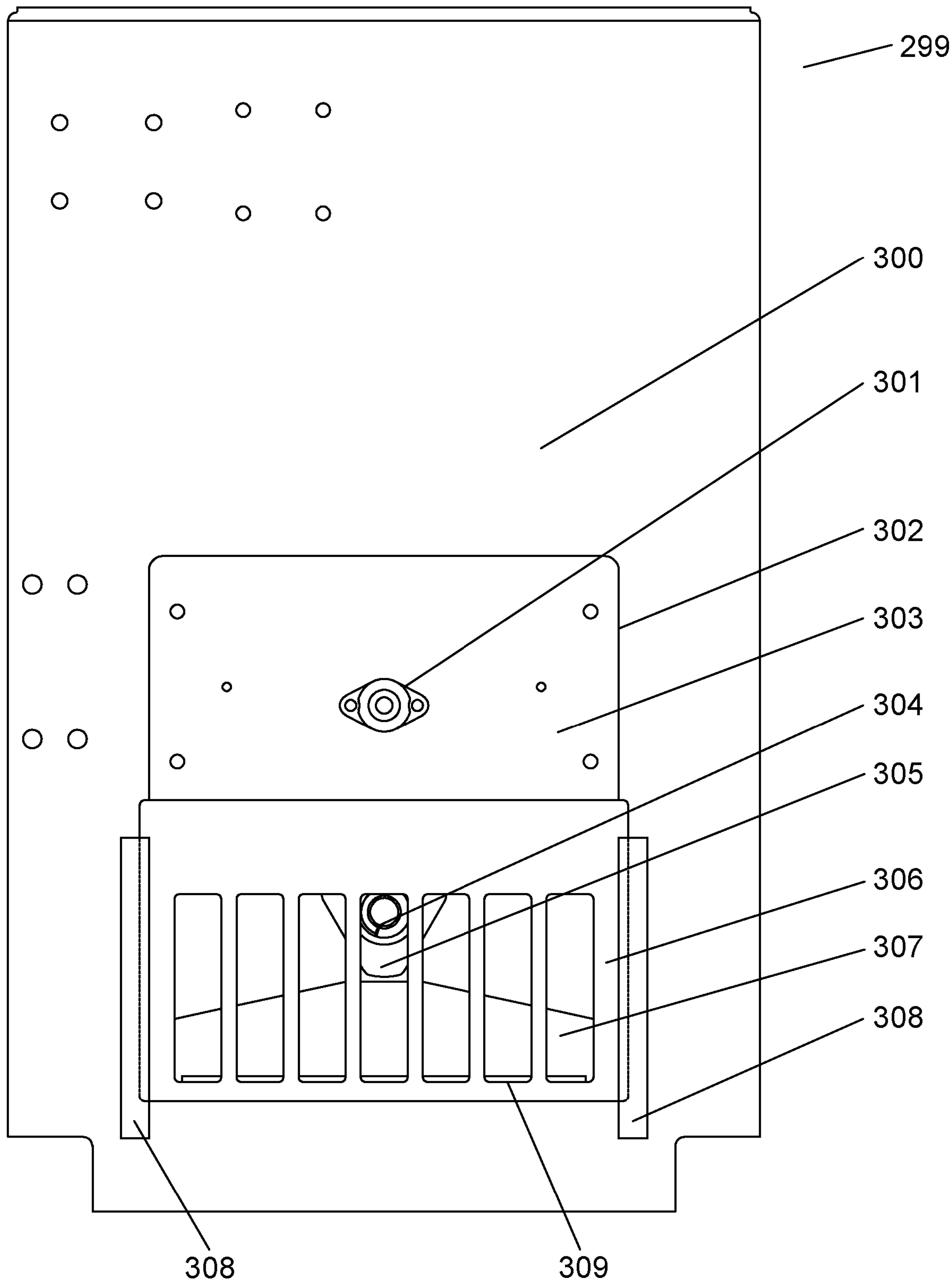
FIG. 18 is a front elevation view depicting one embodiment of a feeding module with multi opening plate installed for use with the improved feeding station of FIG. 1.
Figure 19:
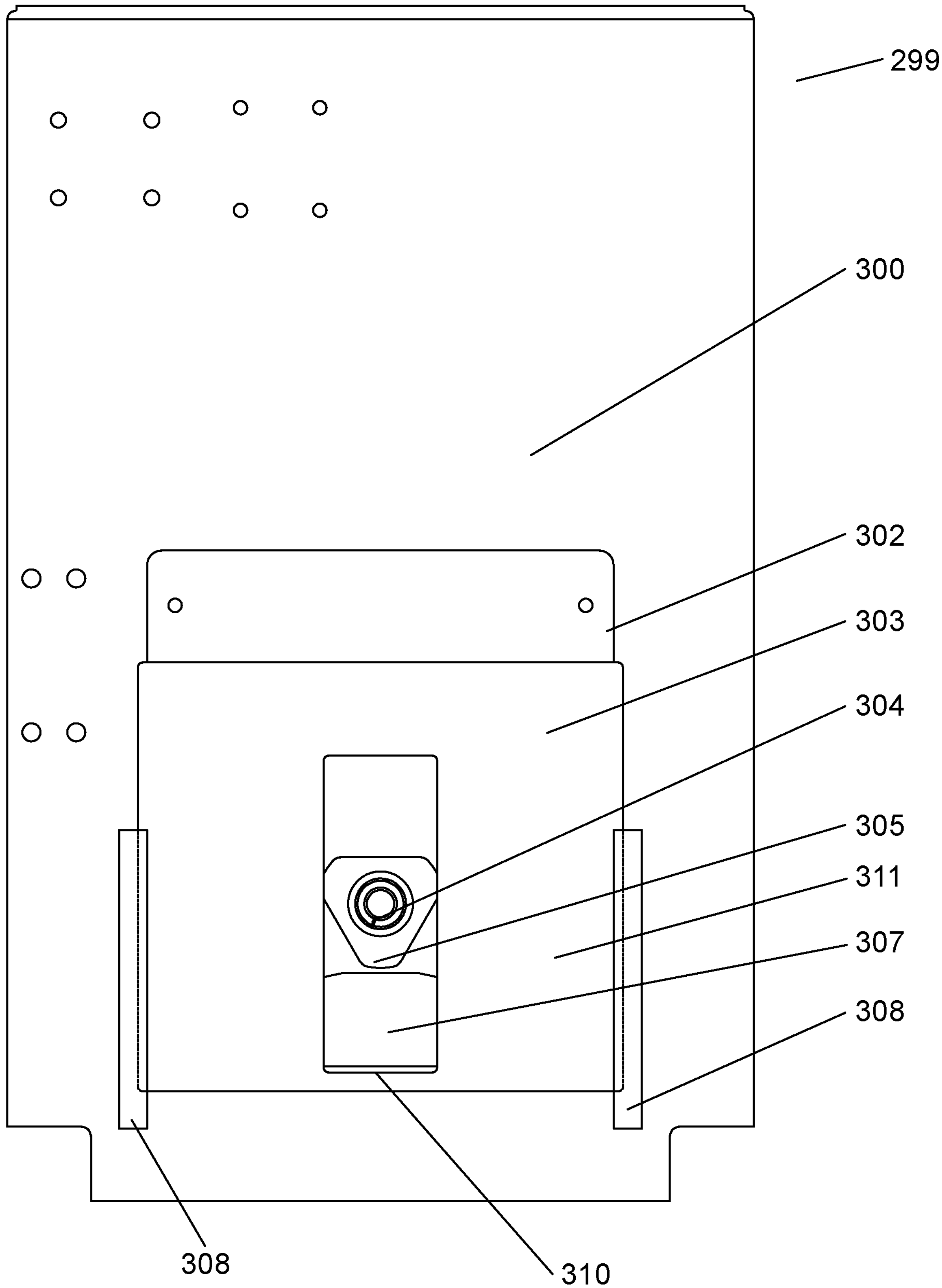
FIG. 19 is a front elevation view depicting an alternate embodiment of the feeding module of FIG. 18 with a single opening plate installed.

In some embodiments, mounting provisions 308 can provide means to add panel 306, 311 to front panel 300 of feed module 299 where feed opening 302 can be located, which can provide several openings 309,310 for access to feed pan 307 such that multiple birds can feed from feed pan 307 whilst also restricting them from being able to enter feed pan 307 itself. As shown in FIG. 18, panel 306 can have a plurality of openings 309 that can allow several birds to feed when the birds are young, and then this panel 306 can be replaced with another panel 311 that comprises only single opening 310 when feeding for individual birds start. In some embodiments, panels 306,311 can be slid into place and held against front panel 300 by brackets 308 such that they can be quickly replaced by sliding one out and replacing it with the other when the birds transition from training to individual feeding.

Figure 20:
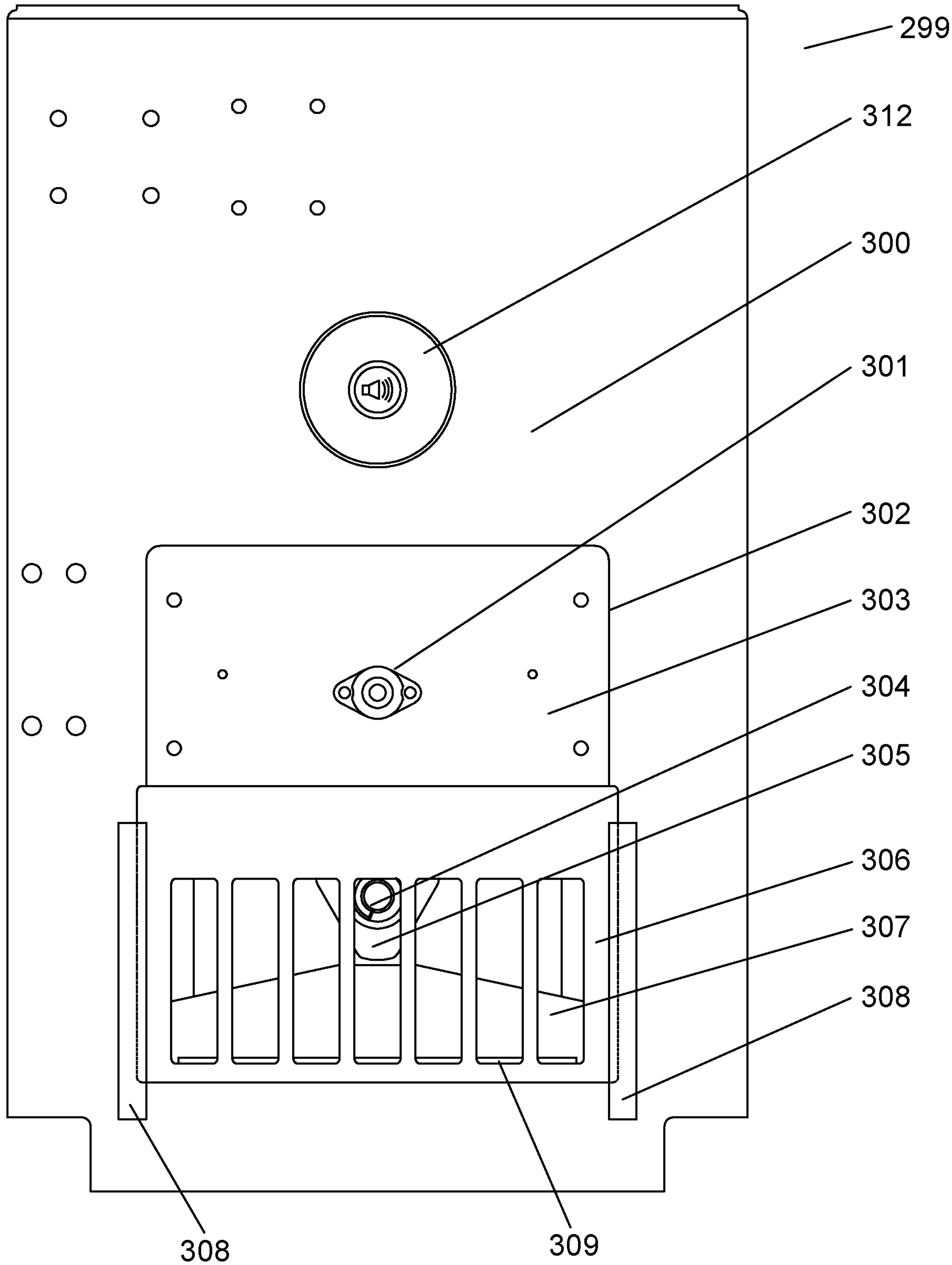
FIG. 20 is a front elevation view depicting the feeding module of FIG. 18 with a speaker installed.

An additional feature that can help with training is to use the fact that chicks will generally congregate to where other chicks gather or to where a mother hen is located. A congregation location can be facilitated visually or by sound. By lowering stations 100 as far as possible, a chick that is located outside of station 100 can more easily see other chicks inside of station 100 and will be drawn to its fellow chicks. In some embodiments, as shown in FIG. 20, to encourage newly hatched chicks to enter and use feeding station 100, each station near feed pan 307 area can be equipped with one or several speakers 312 that can play one of several different sounds which may provide birds with guidance on the location of the feed, and also simulate social interaction within feeding compartment 102. This sound can be of a hen clucking, a chick or chicks chirping, or some combination of both, and can be a short clip repeated continuously, on a schedule, randomly played, or a long clip with a multitude of combinations of different sounds. The mechanical sounds of an operating station 100 may be added during the training phase to acclimate the birds to the sounds of station 100 environment before individual feeding starts. In some embodiments, the placement of speaker or speakers 312 can be anywhere in or on station 100, and not just on front panel 300 of feed module 299.

Figure 21:
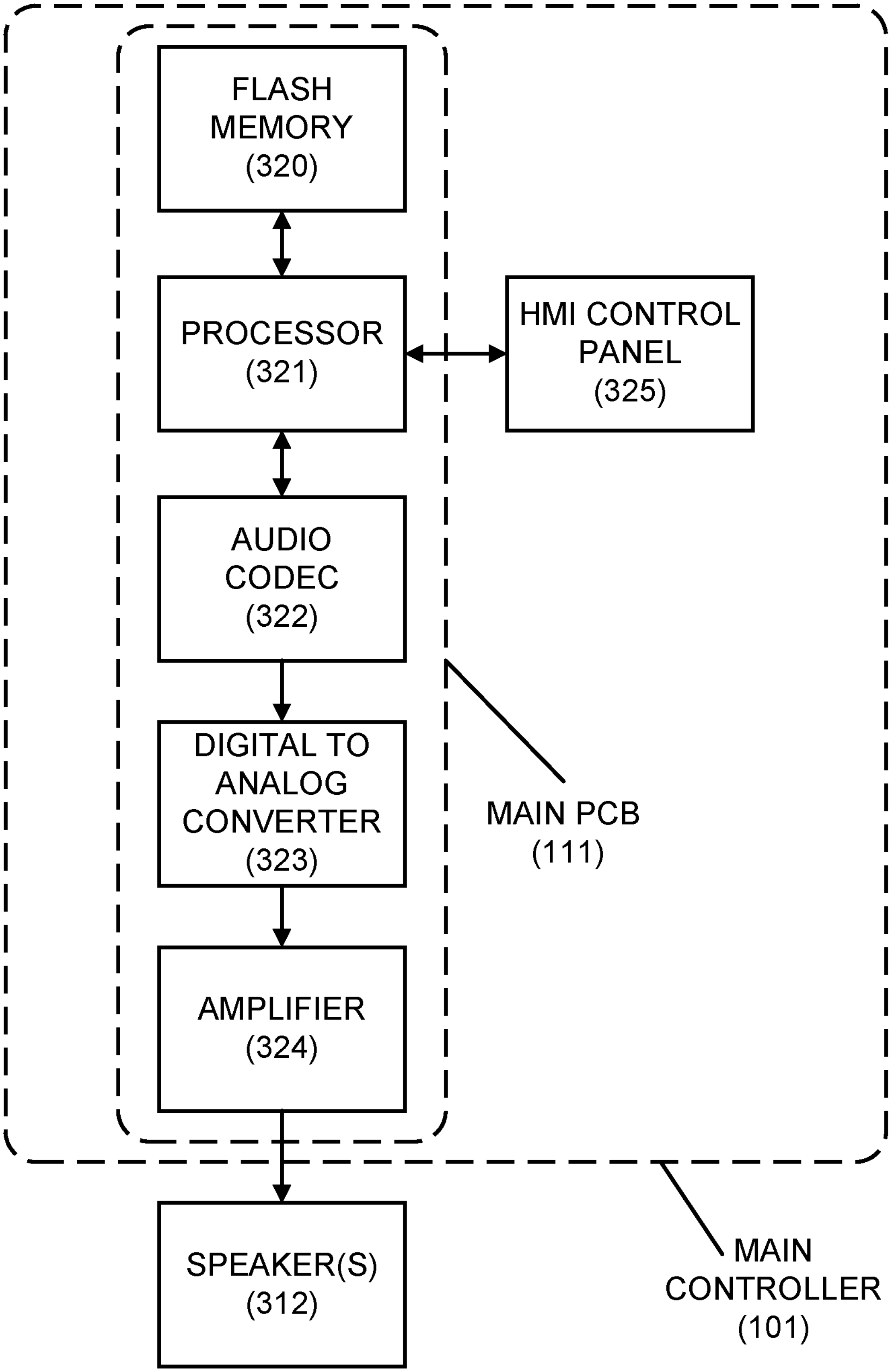
FIG. 21 is a block diagram depicting one embodiment of sound generation hardware for use with the improved feeding station of FIG. 1.

In some embodiments, speakers 312 for many stations 100 can be driven by an audio amplifier located off of station 100 that can feed audio signals to many stations 100. In other embodiments, speakers 312 can be driven by amplifier 324 that can be located in or on station 100. In some embodiments, one or more amplifier 324 can be disposed on main PCB 111 of main controller 101 and be directly coupled to microprocessor 321 disposed thereon, as shown in FIG. 21. For the purpose of this description and the claims that follow, the term microprocessor is defined as comprising one or more of microprocessors, microcontrollers, systems on chips, systems on platforms and any other functionally equivalent computing device as well known to those skilled in the art. In some embodiments, the audio signals can comprise sounds of digitally recorded sound files such as, but not limited to, .wav or .mp3 that can be played on repeat. For dependent stations 400, connected main controller 101 can either have two independent amplifiers 324 to feed the sounds to separate speakers 312, or multiple speakers 312 can be connected to a single amplifier 324. Speaker or speakers 312 can be of a waterproof type compatible with the cleaning and disinfection protocols used in production facilities.

Referring to FIG. 21, to generate the sounds for these speakers on station 100 using the resources disposed on station 100, processor 321 disposed on main PCB 111 can run executable machine code that can read in the digitally recorded audio file from computer readable flash memory 320. Processor 321 can then decode this audio file and then stream this file over to audio codec chip 322 through a plurality of different protocols including, but not limited to, time division multiplexing ("TDM") or Inter-IC Sound ("$I^2S$"). In some embodiments, audio codec chip 322 can then convert this stream to an audible sound via digital to analog converter 323 coupled to amplifier 324, which is then coupled to speaker 312 where the sound can be produced therefrom. The volume and start and stopping of the sound can be controlled through human-machine interface ("HMI") control panel 325, which can be coupled to processor 321. In some embodiments, this volume control as well as the start and stop of sound, can also be controlled by main server 3614 or through a wired or wireless connection to processor 321 of main controller 101 through a connection to handheld device 3602 such as a phone or tablet computer running either a web browser or a custom control application.

Feed Door

To increase the acceptance of improved feeder station 100 by young birds, some embodiments of improved feeder station 100 can be constructed for a low station height during the rearing stage of the bird's life cycle. In some embodiments, a low station height can result in low feed pan 307, and in embodiments that require a feed door, require this door to be stowed in such a way as to allow for the low height. In order to provide a safe environment for the birds, it has been found that embodiments with a feed door that rises from below the bird is the safest way to close off access to feed in feed pan 307. A gap at the maximum height of the feed door can eliminate the risk of pinching the neck or head of a bird between two rigid barriers. In embodiments with the door closing from above, in order to restrict feed access there is no alternative but to fully close off the gap, resulting in a possible pinch point or choking hazard for the birds particularly when the ejection cycle begins.

Figure 22:
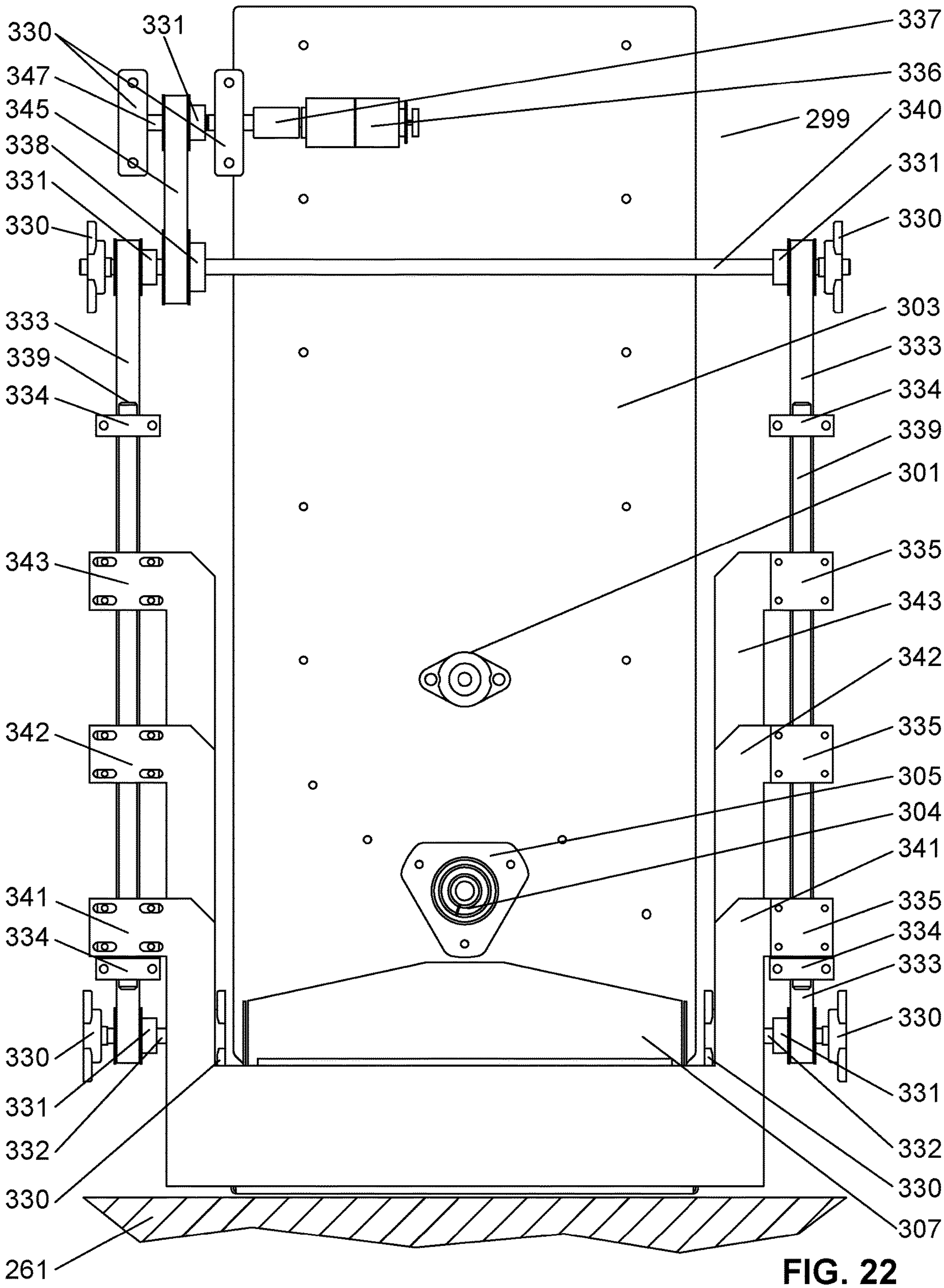
FIG. 22 is a front elevation view depicting one embodiment of a feeding module feed door mechanism in a down position.
Figure 23:
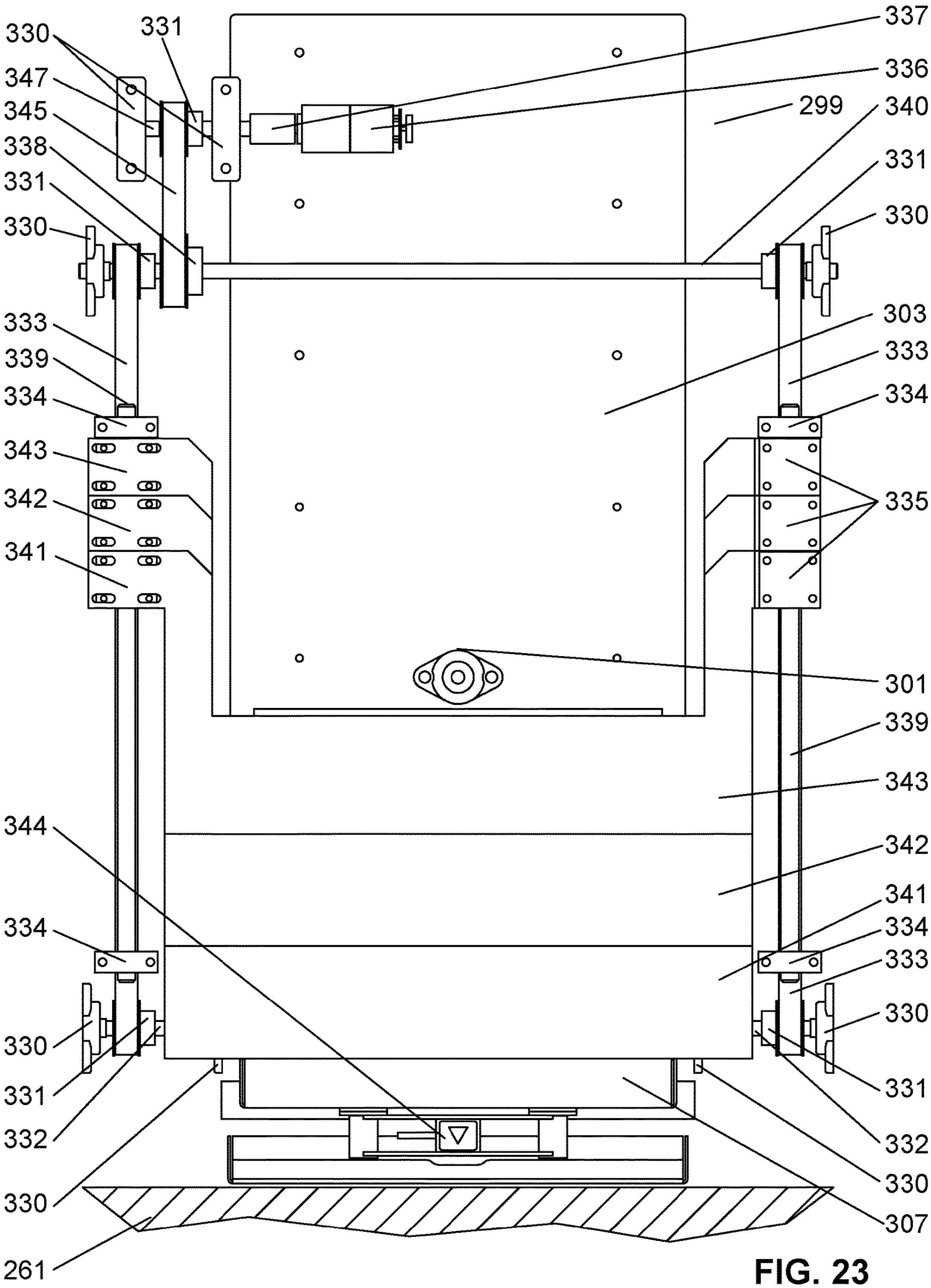
FIG. 23 is a front elevation view depicting the feeding module feed door mechanism of FIG. 22 in an up position.
Figure 30:
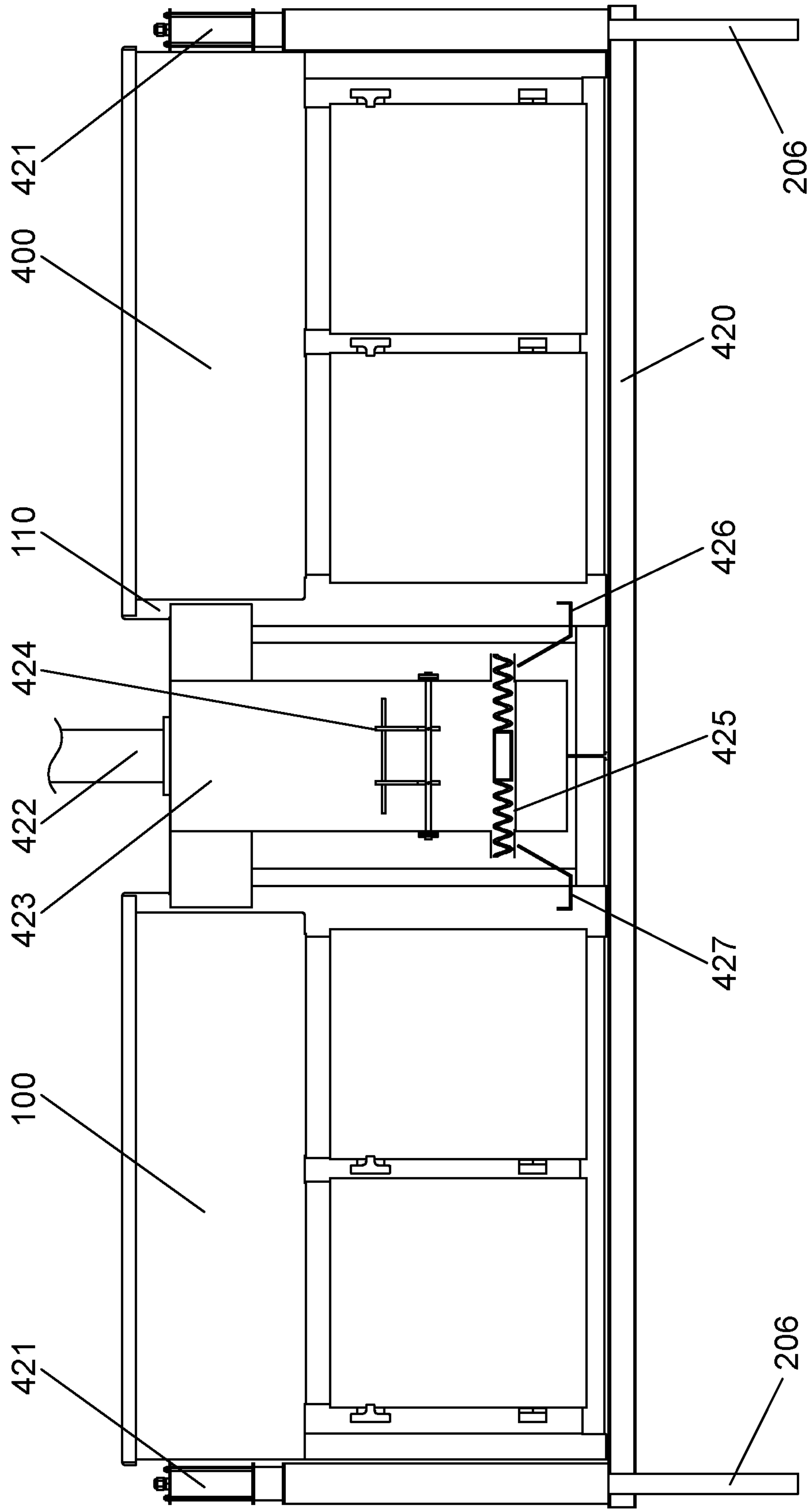
FIG. 30 is a side elevation view depicting main and dependent feeding stations permanently connected together with common lift and shared hopper mechanisms.

In the embodiment shown in FIGS. 22 and 23, a low sitting feed mechanism can be configured in such a way to restrict access to feed pan 307, provide an upwards closing door, and a small change in height from ground level 261 to feed. In some embodiments, the feed mechanism can comprise of feed pan 307, mounted to strain gauge 344 rigidly connected to the feed mechanism, as shown in FIGS. 22 and 23. In other embodiments, alternatives to a strain gauge 344 can be used as well known to those skilled in the art, or leave the weight sensing mechanism out completely. In some embodiments, behind feed pan 307, can sit feed hopper assembly 303 that can dispense food into feed pan 307, through hopper outlet 305 via screw auger 304, in addition hopper 303 can include feed agitator 301. In some embodiments, hopper 303 can be disposed above the feed mechanism or share a single hopper between multiple units of station 100 in various possible orientations, sizes, etc., as shown in FIG. 30. In some embodiments, feed door panels 341,342,343 can be coupled to linear rails 339 via support blocks 334. The feed door can comprise a multi-stage mechanism. In a representative embodiment, the feed door can comprise 3 stages. In some embodiments, first door panel 341 can be connected to motor 336 through coupler 337 to a series of drive pulleys 331,338 and belts 345,333 mounted on drive shaft 347 and idler shafts 332 and 340, wherein all of which can be supported by bearing blocks 330. In some embodiments, the feed door can comprise one or more of chains and sprockets, linear actuators, and other equivalent mechanisms as known to those skilled in the art. In some embodiments, the mechanism can raise first stage door panel 341 and upon reaching the full height of that panel 341, first stage door panel 341 can contact second stage door panel 342. In some embodiments, second and third stage door panels 342,343 can be coupled to linear rail 339, attached via bearing blocks 335. In some embodiments, the door panels can be held up by the base of the feed mechanism frame or by adjustable stops or other mechanical means. In some embodiments, upwards traveling first stage door panel 341 can engage second stage door panel 342 after clearing the designed height by the first stage door panel's 341 bearing blocks 335 can contact bearing blocks 335 secured to second stage door panel 342. This mechanism and process can be similarly repeated for third stage door 343 when first and second stages 341,342, now traveling together, contact third door panel's 343 bearing blocks 335. When access to the feed is required, motor 336 can rotate in the reverse direction and stages 341,342,343 can slide below feed pan 307 in descending order. In some embodiments, an accordion style door can be provided as an alternate embodiment to door panels 341,342,343 to provide an upwards acting door while remaining low profile. In some embodiments, a door built of rollers or bars, or special wide conveyor belt can be designed to close off access to feed.

Feed Distribution

Figure 24:
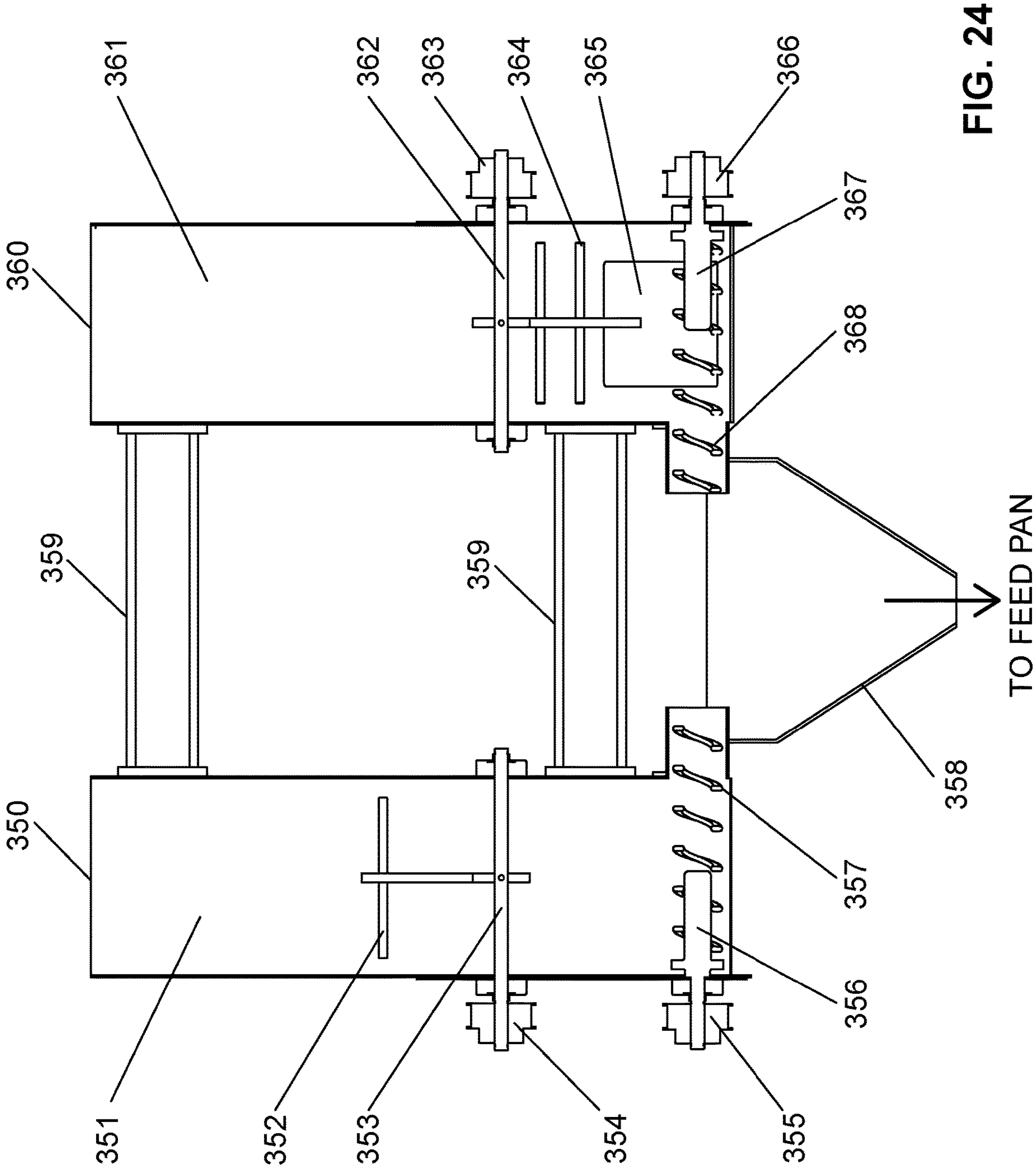
FIG. 24 is a side cutaway elevation view depicting a two feed type feed mixing mechanism for use with the improved feeding station of FIG. 1.

In some embodiments, station 100 can comprise means for the storage and dispensing of feed for the birds. In some embodiments, the storage of feed can require hopper 303 and a conveyance mechanism to move feed from hopper 303 to feed pan 307. In some embodiments, there can be multiple food sources that can be dispensed in single or combined doses. Although a combination of hoppers and augers can allow for a wide range of different sources of feed to mix together, one embodiment for doing so with two feed sources is depicted in FIG. 24. Referring to FIG. 24, first hopper 351 with feed opening 350 at the top thereof can be coupled to second hopper 361 with feed opening 360 at the top thereof through support frame bracket 359. In some embodiments, the first hopper can comprise auger 357 coupled to pulley 355 through drive lug 356, and agitator 352 coupled to pulley 354 through drive shaft 353. In some embodiments, second hopper 361 can comprise auger 368 coupled to pulley 366 through drive lug 367, and agitator or mixer 364 coupled to pulley 363 through drive shaft 362. In some embodiments, each pulley 354,355,363,366 can be coupled to an individual motor or coupled together, for example, agitator shafts 353,362 can benefit from running off a single drive motor for both hoppers 351,361. In the illustrated embodiment of FIG. 24, two hoppers 351,361 can be disposed on opposite sides to feed mixing funnel 358, which can run down to feed pan 307, which can be further coupled to scale 344. Hoppers 351,361 can comprise access panel 365 to allow for easy cleanout of feed at the end of a flock cycle.

In some embodiments, after it has been determined that a bird shall be fed, a feed mix ratio for that bird must be determined. This feed mix ratio can be set by the user or, in some embodiments, by a model-based estimation of nutrient requirements. For the purposes of this description and the claims that follow, the term "feed" or "feeds", as placed or stored in hoppers 351,361, is defined as comprising one or more of individual feedstuffs or mixtures of feedstuffs such as whole grains or protein supplements, feed additives such as enzymes, prebiotics, or probiotics, vitamin and mineral supplements, calcium sources such as limestone or oyster shell, medications, vaccines, or any other nutrient or mixture or anything that can be consumed orally by an animal, as well known to those skilled in the art, and depending on the desire of the user. This ratio can be converted into an on-time or number of pulses for each of the two auger motors that drive pulleys 355,366 and, in turn, drive augers 357,368 for the two hoppers 351,361. At this point, the auger motor for first hopper 351 can be turned on or pulsed and, either simultaneously or sequentially, the other auger motor for second hopper 361 can be turned on or pulsed for the number of required times to ensure the feed mix ratio in feed pan 307 is the correct balance of ingredients from the two hoppers 351,361. In some embodiments, feed scale 344 can be used as a verification of feed weights being dispensed, and to detect if hopper(s) 351,361 are empty. In some embodiments, just enough feed can be presented to the bird for a single meal to be completed to ensure that all, or nearly all, of the food will be eaten and that feed pan 307 is emptied.

Figure 25:
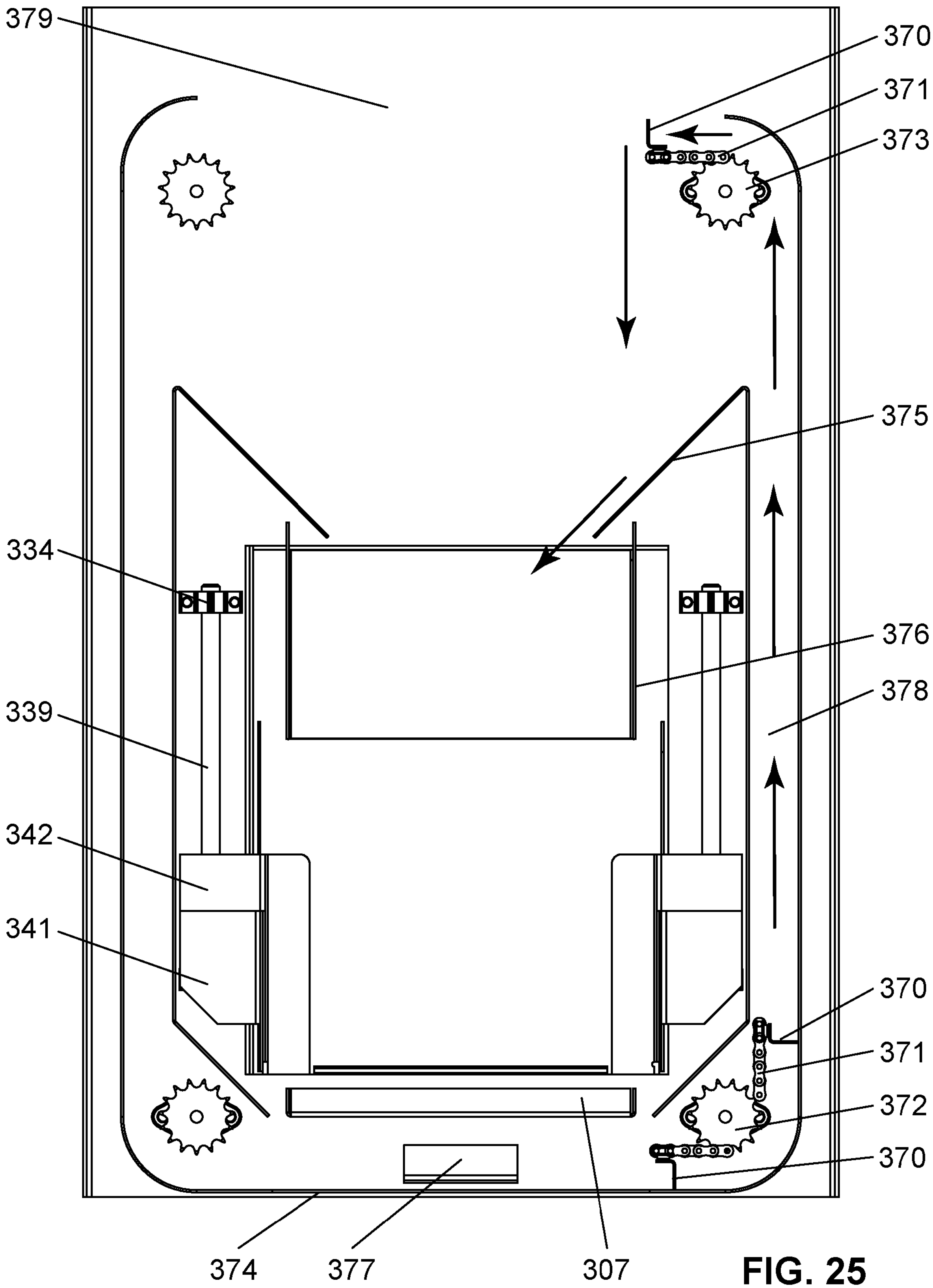
FIG. 25 is a front elevation view depicting a feed return mechanism for use with the improved feeding station of FIG. 1.

In some embodiments, it can be advantageous for the feed in feed pan 307 to be removed from feed pan 307 at the end of a feeding bout. This can be useful for those applications where each bird gets a different feed mix, or other applications where birds are only supplied a fixed amount of feed. In some embodiments, the feed module can incorporate a feed loss recovery system. Feed loss can be of prime concern as feed loss can result in significant cost to the producer. In some embodiments, referring to FIG. 25, a feed loss recovery system and feed dispensing system can be incorporated into the feed mechanism assembly. In some embodiments, the feed recovery mechanism can be comprised of feed trough 374 that can span the length of feed mechanism front panel 379. Any feed that escapes feed pan 307 can fall into feed trough 374. From feed trough 374, overflow feed can be pushed around and up through a feed channel 378. In some embodiments, the feed channel can be comprised of feed trough 374, deflector plate 375, front panel 379, and a backing plate that, when assembled together, can create a closed channel the feed can travel. Movement of the conveyor can be conducted by means of idler 372 and drive 373 sprockets carrying a conveyor chain 371. In some embodiments, conveyor chain 371 can comprise a barrier in the form of one or more of bucket 370, a scoop, a brush, and any other equivalent mechanism that can move the feed to the top of the feed mechanism. In some embodiments, upon leaving feed channel 378 at drive sprocket 373, feed can fall away and be caught by trough deflector 375 and feed deflector 376, which can funnel the feed back into feed pan 307. In some embodiments, this recovery system can be used to dispense feed as well. In some embodiments, as shown in FIG. 25, the recovery system can be configured to pull feed through small feed inlet 377 into feed trough 374 where the feed can make its way through the system. In other embodiments, the feed recovery system can be configured with various conveyance mechanisms such as auger screws, belts, or other similar or equivalent mechanism as known to those skilled in the art. In some embodiments, the recovery system can reintroduce the feed though a more direct route to the feed pan, or it may return the food to the hopper mechanism to be dispensed again by different means to feed trough 307.

Distributed Control and Dependent Stations

In some embodiments, to provide efficiencies for the assembly, installation and service of feeder station 100, multiple localized or distributed controllers 405 can be provided throughout station 100 instead of a single large control cabinet per each station 100. In some embodiments, each distributed or localized controller 405 can be strategically placed close to the module that it is intended to control and, by doing so, the various cables going to the switches, sensors, and actuators can be minimized in length as they only have to go a short distance to distributed controller 405 instead of all the way back to the main control box or main controller 101 for each station 100. This can also simplify main controller 101 circuitry as it only needs a bus or network interface instead of many analog, digital, motor controller channels, and complex control software all of which are large, complex and expensive to implement.

In some embodiments, for each main controller 101 to communicate with each of the distributed controllers 405, several different connection topologies can be used including mesh, star, bus, ring, or some combination of these. In some embodiments, a star topology can be used, as shown in FIG. 28. In this embodiment, main controller 101 can be connected to each individual distributed controller 405 using multi conductor cable 406. In this illustrated embodiment, each distributed controller 405 will require a home run cable back to the main controller 101, which may require additional cable and longer runs over other cable topologies. In this illustrated embodiment, the star topology can have the advantage in that any one of the distributed controllers 405 can fail without affecting the others, and each node can get full communication bandwidth.

Figure 29:
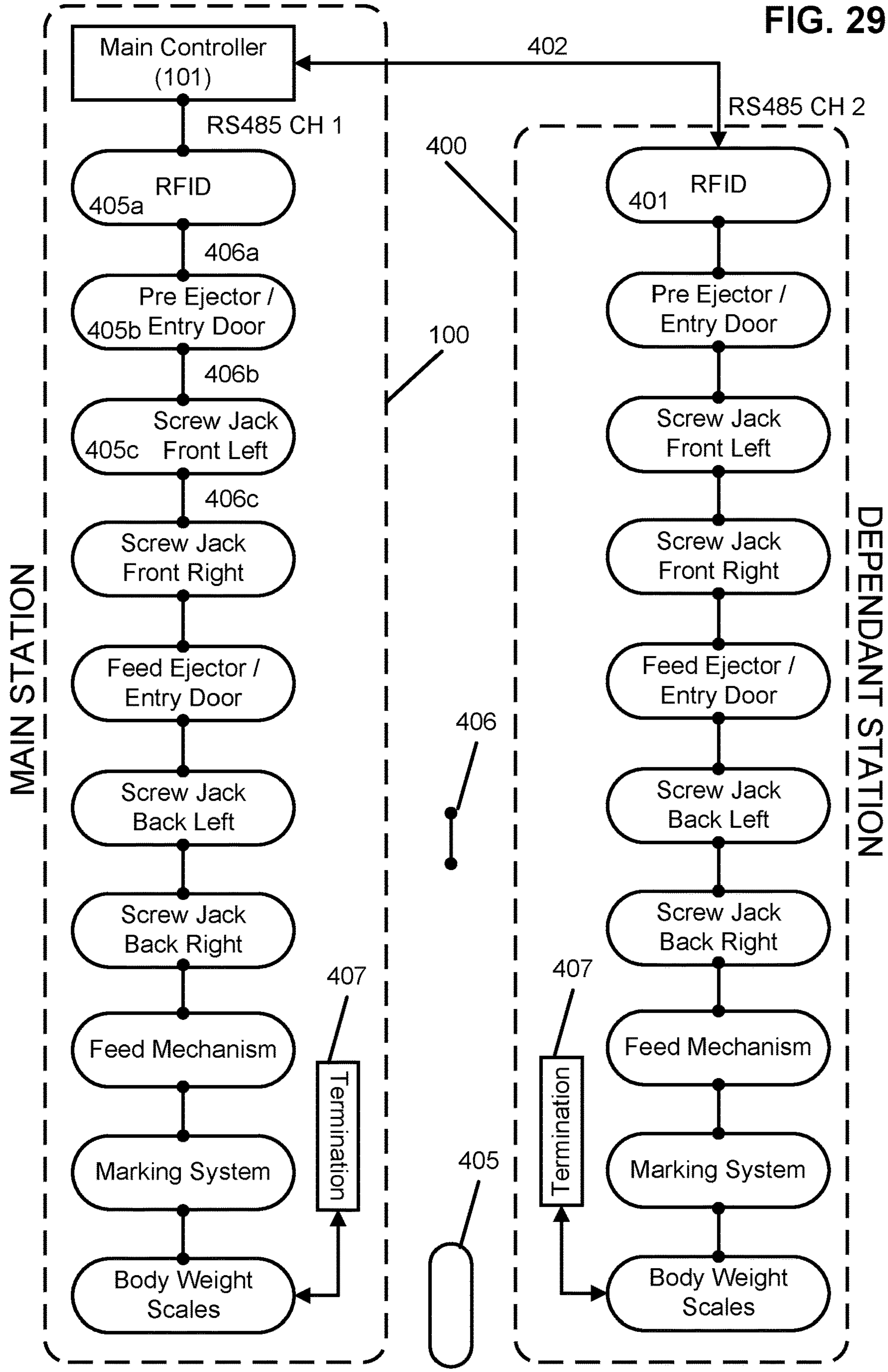
FIG. 29 is a block diagram of distributed controllers for a main feeding station with a dependent feeding station connected thereto using an RS485 daisy chain bus topology.

In some embodiments, a bus or daisy chain connection as shown in FIG. 29 can be implemented. In this embodiment, main controller 101 can be connected to the first distributed controller **405*a* through a cable 406*a*, which can then be connected to the second distributed controller 405*b* through a cable 406*b*, which can then be connected to the third distributed controller 405*c* through a cable 406*c*, and so on in a sequential fashion. In some topologies, the last distributed controller 405 can be connected back to main controller 101 to form a ring topology. Each cable 406 can provide both power and communication to each distributed controller 405 and, depending on the protocol implemented, can do so over different multi-conductor cables such as RS485 cables or CAN bus cables, which are not capable of transmitting power and data on the same conductors. In other embodiments, ethernet cables can be used to enable the transmission of power and data on the same conductors. In regards to protocols, electronics, and standards for the connection between main controller 101 and the distributed controllers 405, there are many options that can be used including, but not limited to, RS458, Ethernet, CAN bus and USB, and can use many different data level protocols such as, but not limited to, MODBUS®, PROF IBUS®, Ethernet/IP®, Profinet® and EtherCAT® depending on whether the hardware layer provides only Open Systems Interconnection ("OSI") layer 1 (hardware specification) or both OSI layer 1 and layer 2, which includes both the hardware specification and the low level data protocol. In some embodiments, some technologies can require the incorporation of termination resistor 407** at each end of the bus to prevent waveform reflections from degrading the signal.

In some embodiments, the transmission technology can comprise RS485 using a MODBUS® (ASCII or RTU) Master/Slave configuration where main controller 101 can be the master controller, and distributed controllers 405 can be the slaved controllers or devices, wherein the master controller can poll each slaved device regularly for changes in its state, to activate a command, or to gather the data from its connected sensors. In some embodiments, each slaved device can require a unique device address that the master controller can use to connect to each slaved device, and the master controller and the slaved devices can be daisy chained together, as well known to those skilled in the art. In some embodiments, main controller 101 master can be anywhere in the daisy chain.

Figure 26:
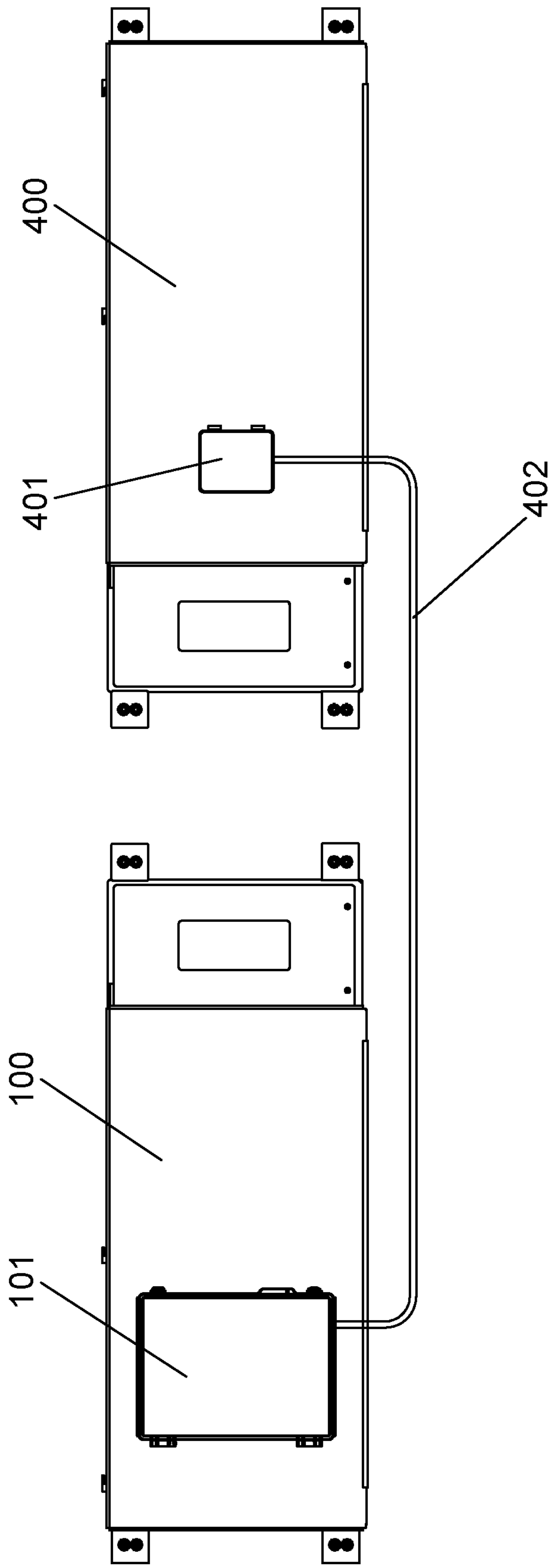
FIG. 26 is a top plan view depicting a main feeding station operatively coupled and attached to a dependent feeding station.

Movement to a distributed network can allow for additional advantages in that additional stations 100 can be controlled from a single main controller 101 and can allow for the creation of dependent stations 400. In some embodiments, these dependent stations 400 can still comprise distributed controllers 405 to control and gather data from localized positions but can be dependent on a main controller 101 for supervision and data collection. The first distributed controller 401 in a dependent station 400 can be any distributed controller 405. In some embodiments, such as those shown in FIGS. 26 and 27, several dependent stations 400 can be controlled by single main controller 101 thereby providing for a substantial savings in station production costs as well as networking and mains power infrastructure costs. In some embodiments comprising many dependent stations 400, additional power and/or processing capacity may be required. In addition, the addressing of distributed controllers 401,405 may become more complicated and tracking which controllers are connected to which dependent station 400 may require further effort to properly configure the system.

Figure 27:
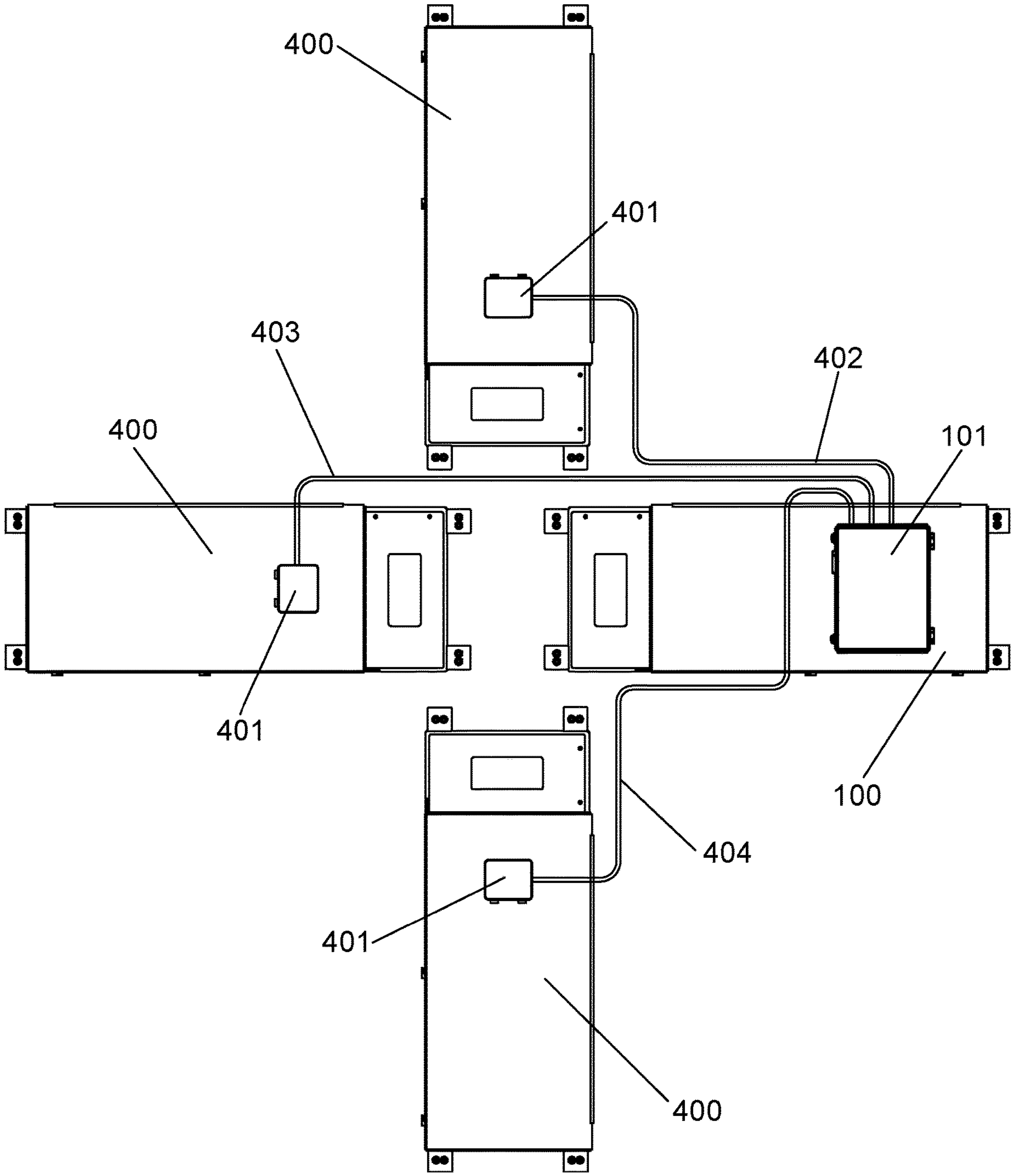
FIG. 27 is a top plan view depicting a main feeding station operatively coupled and attached to three dependent feeding stations.

In some embodiments, multiple dependent stations 400 can be implemented in combination with main station 100, as shown in FIG. 27. The addressing issue for the multiple dependent stations can be simplified by using multiple bus channels and cables 402,403,404, with one for each dependent station 400 running from main controller 101. In some embodiments, main controller 101 can comprise a modern microcontroller unit 321 such as the AM3558 from Texas Instruments®, which can have several bus channels available such as multiple universal asynchronous receiver transmitters (coupled to external RS485 drivers) or multiple CAN bus channels. In some embodiments, each of channels 402,403,404 can supply a dependent station's 400 distributed controllers 401,405, with one channel also feeding main station 100 distributed controllers 405 as well. This can allow for simpler configuration and interchangeable parts as each dependent station 400 can have all of the same distributed controllers 401,405 as main station 100.

In some embodiments, dependent station 400 can be mechanically coupled to main station 100 via frame structure 110 through rigid connection 420 such that two stations 100 can be substantially and physically connected to each other forming a single rigid frame 420 as is shown in FIG. 30. In some embodiments, a single rigid frame 420 can also allow for the requirement of fewer lifting mechanisms, as depicted in FIG. 30, where only 4 screw jack lifting mechanisms 421 (one at each corner) are required instead of the 8 that would have normally been required for two feeder stations, which can save on the weight and cost of station 100 on a per station basis. In some embodiments, in addition to sharing a main controller 101, a single feed hopper 423 and mix agitator 424 can be shared between main station 100 and dependent station 400, as also shown in FIG. 30. In this illustrated embodiment, feed auger 425 mechanism can require another actuator for feed pan 426 of dependent stations 400 as the feed pan of dependent station 400 will be opposite to feed pan 427 for main station 100. This configuration can allow for a single feed drop tube 422 from the central feed distribution system to provide feed to 2 stations at once and can also lower the weight and cost of the two stations as much of the structure and material of hopper 423 is shared.

In addition to main controller 101 and associated distributed controllers 405 providing control and bird weight information through the wired connections 406 as described above, in some embodiments, some or all of the distributed controllers 405 can communicate with main controller 101 through a wireless connection using a plurality of different communication hardware and protocols including, but not limited to, Bluetooth®, WiFi®, LoRa®, ASK, FSK, OOK, PSK, and 5G technologies as well known to those skilled in the art, instead of using the wired bus method described above.

Figure 35:
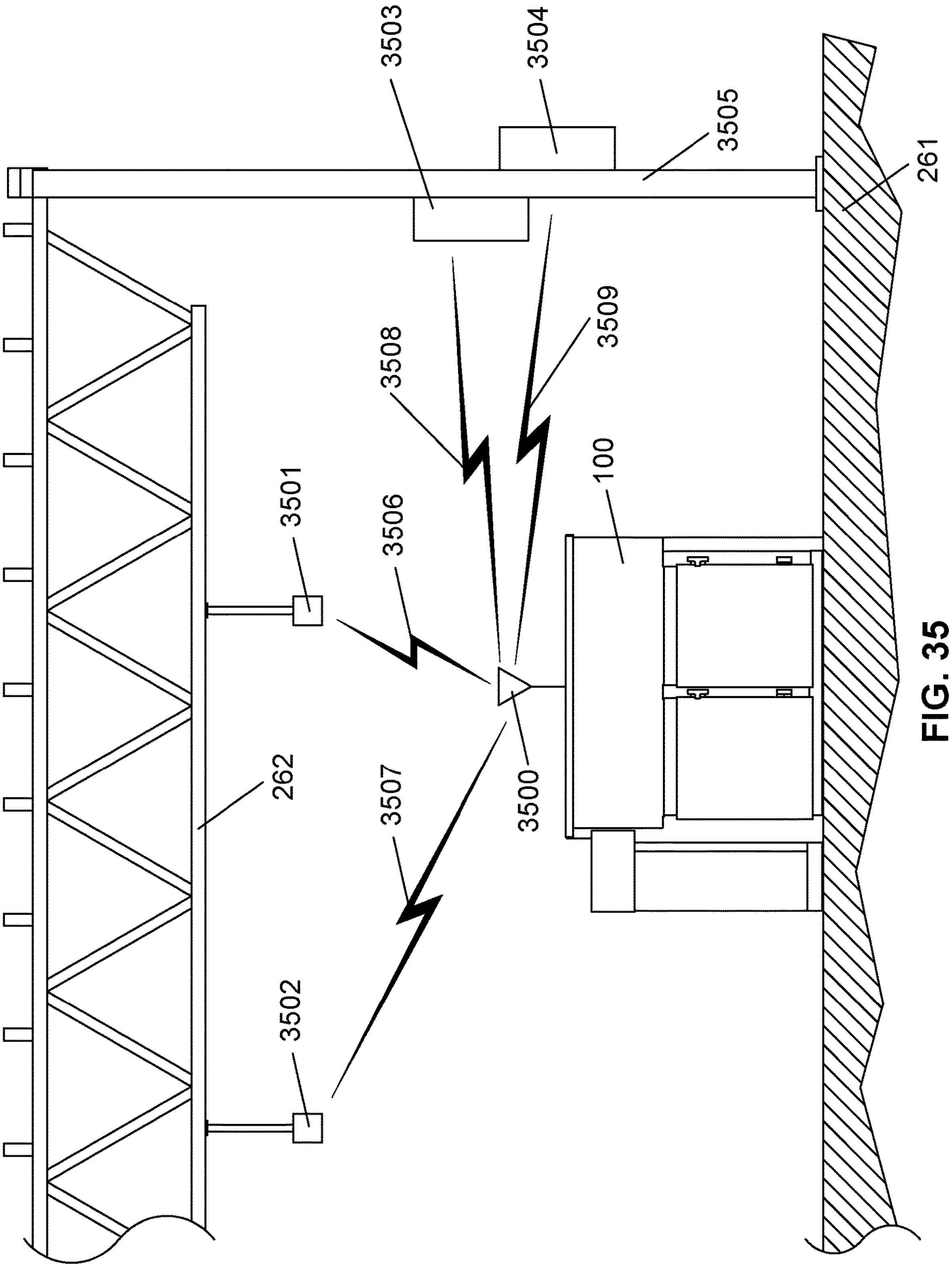
FIG. 35 is a side elevation view depicting one embodiment of a production facility comprising the feeding station of FIG. 1 connected to environmental sensors located near the station.

In some embodiments, as shown in FIG. 35, a main controller 101 of one or more of station 100, and the associated distributed controllers 405 thereof, can communicate with a plurality of environmental sensors 3501, 3502, 3503 and 3504 disposed near, on or in station 100, either through a wired or wireless connection, that can provide additional data to the producers about the environment of the facility where stations 100 are located. FIG. 35 depicts a wireless configuration where environmental sensors 3501, 3502, 3503 and 3504 can communicate with wireless antenna 3500 disposed on station 100 through wireless links 3506, 3507,3508 and 3509. In some embodiments, environmental sensors 3501, 3502, 3503 and 3504 can be mounted anywhere near station 100 including, but not limited to, on ceiling 262, floor 261, or on the interior 3503 or exterior 3504 walls 3505 of the building, or even outside the building altogether. In some embodiments, environmental sensors 3501, 3502, 3503 and 3504 can comprise, but are not limited to, custom and off-the-shelf wired or wireless sensors that can detect ambient temperature, exhaust and/or inlet air temperature, humidity, air pressure, air flow, light intensity, light colour, particulate, smoke, and gas concentration. In some embodiments, main controller 101 or distributed controllers 405 can also be used to communicate with nearby actuators, sensors and building automation components such as, but not limited to, lighting controllers, vents, windows, fan controllers, heating-ventilation-air conditioning ("HVAC"), water and feed distribution systems as well as environmental sensors 3501, 3502, 3503 and 3504 to provide a link between the building automation controller and the various automated building equipment.

In some embodiments, main controller 100 can comprise, directly coupled to it, human machine interface control panel 325 (as shown in FIG. 21) that can use either a series of light elements such as a grouping of light emitting diodes with an associated label or legend and switches or through a vacuum florescent display or liquid crystal display which may be monochrome or colour, and may or may not include a back light or touch screen or any similar type of device or combination of the above. Control panel 325 can be used by the user to easily and quickly view the current status of station 100 and view if there is a condition that needs to be dealt with, do a scale calibration or reset a scale tare, check or modify the configuration such as set the time, choose the target body weight curve, set the hatch date, lower the station, raise the station, change lighting schedule, actuate and debug sensors and actuators, set the communication addresses of various distributed and wirelessly connected devices, and various other functions as may be required from time to time.

In some embodiments, human machine interface control panel 325 can be connected through a distributed controller 405 bus as a device remote to main controller 101 configured to provide the same or additional functionality of one tightly integrated into main controller 101 itself. In some embodiments, control panel 325 can comprise a software application running on a tablet or phone device 3602 such as, but not limited to, an Apple® iPhone®, or iPad® or a Google® Android® device, or a device running Microsoft Windows® or Linux®, which can be wirelessly coupled, as indicated by reference numeral 3603, to main controller 101 or one of distributed controllers 405 and can provide the same or additional functionality of one tightly integrated into main controller 101 itself.

Figure 31:
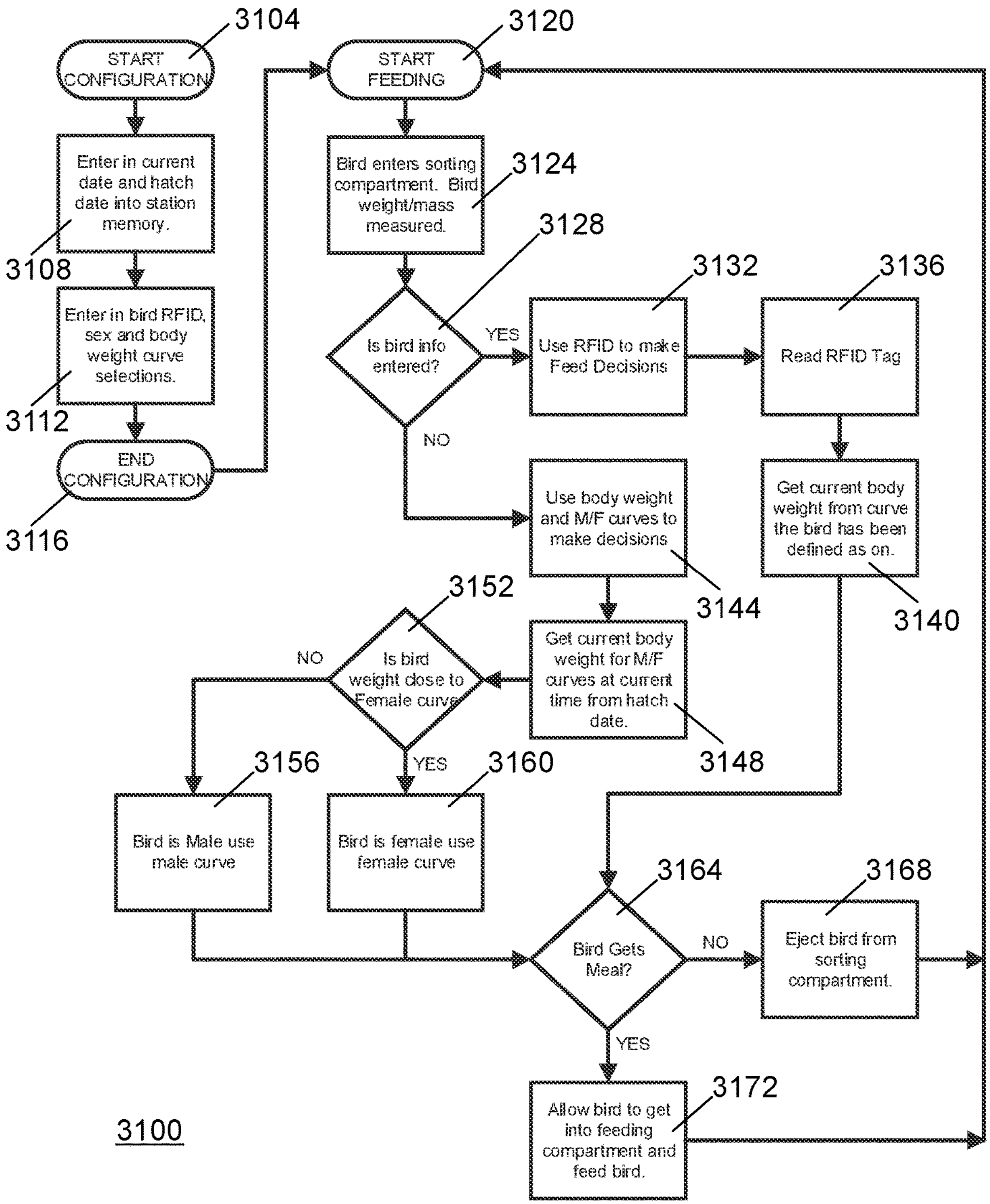
FIG. 31 is a flowchart depicting unsupervised machine operation of the improved feeding station of FIG. 1.

In some embodiments, feeder stations 100 can be run in an unsupervised state, meaning they do not have regular and active connection to central SCADA server 3614. In this case, the decisions usually made on central SCADA server 3614, can be decentralized and managed by each individual station 100. Providing this feature can, generally, require several extra pieces of information being coded into each station 100, and each station 100 can incorporate a real time clock of sufficient accuracy to provide accurate timekeeping for months at a time whilst also including sufficient secondary power through, devices like, but not limited to, coin cell or other batteries, super capacitor energy storage elements, solar arrays, or some other device suitable for providing the small amount of power required to keep the time in case of a disruption in mains power. In order to work independently, main controller 101 will need to have the hatch date of the flock, the target body weight curves for males and/or females to be fed in station 100 depending on the makeup of the flock. If the user wants to use RFID technology and tags for identifying each bird in a flock, main controller 101 can comprise the bird RFID list and the associated sex of each bird, any specific feeding and lighting schedules, and the scales will need to be calibrated (which is common to both supervised and unsupervised stations 100 as well where "supervised" means stations 100 are operatively connected to SCADA server 3614, whereas "unsupervised" means stations 100 are not). In some embodiments, main controller 101 can be configured to carry out an algorithm so that feeder station 100 can feed the birds and make feed decisions based on feed decision algorithm 3100, as shown in FIG. 31.

In some embodiments, feed decision algorithm 3100 can comprise the following steps. Starting a configuration step at step 3104, the current date and the hatch date of the birds can be entered into a computer readable memory at step 3108. Then, at step 3112, data related to the birds, such as individual RFID number, sex and target body weight curve selections can be entered into the computer readable memory, which can be followed by an end configuration step at step 3116. Algorithm 3100 can then proceed to start feeding step at step 3120 followed by measuring a bird's weight or mass after it has entered sorting compartment 103 in the feeder station 101 (as shown in FIG. 1) at step 3124. A decision can then be made at step 3128 whether the bird's RFID information can be read and entered into the computer readable memory. If "yes", the bird's RFID info can be used to make feed decisions for the bird at step 3132, followed by reading the bird's RFID at step 3136 and then weighing the bird at step 3140 and comparing the weight to the target weight curve for the bird. A decision can then be made at step 3164 whether the bird is to receive feed. If "no", then the bird is ejected using ejector 106 from sorting compartment 103 of feeder station 100 at step 3168, whereupon the process of algorithm returns to start feeding step 3120. If the answer to decision step 3164 is "yes", then the bird can enter feeding compartment 102 of feeder station 100 and receive feed at step 3172, after which the process of algorithm 3100 returns to start feeding step 3120 after the feed bought has concluded and the bird ejected from feeding compartment 102 using ejector 107. If the answer to decision step 3128 is "no", then the body weight of the bird and its sex is used to make feed decisions at step 3144, followed by retrieving the current target body weight data curves for male and female birds at step 3148 where the target data curves have been tabulated since the hatch date of the birds. Then, at step 3152, a decision can be made whether the bird's weight is close to the female target weight data curve. If "yes", then the female target weight data curve is selected at step 3160. If "no", then the male target weight data curve is selected at step 3156. The process of algorithm 3100 can then process to the decision step 3164, as described above.

Figure 32A:
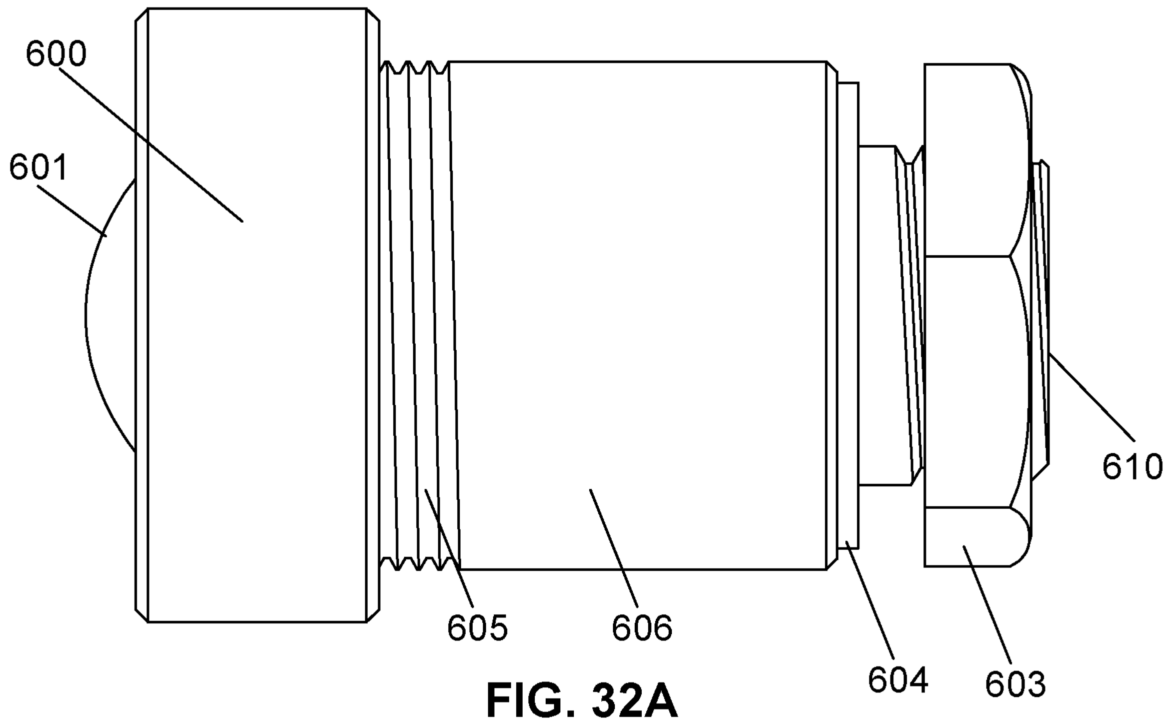
FIG. 32A is a side elevation view depicting a status indicator light for use with the improved feeding station of FIG. 1.
Figure 32B:
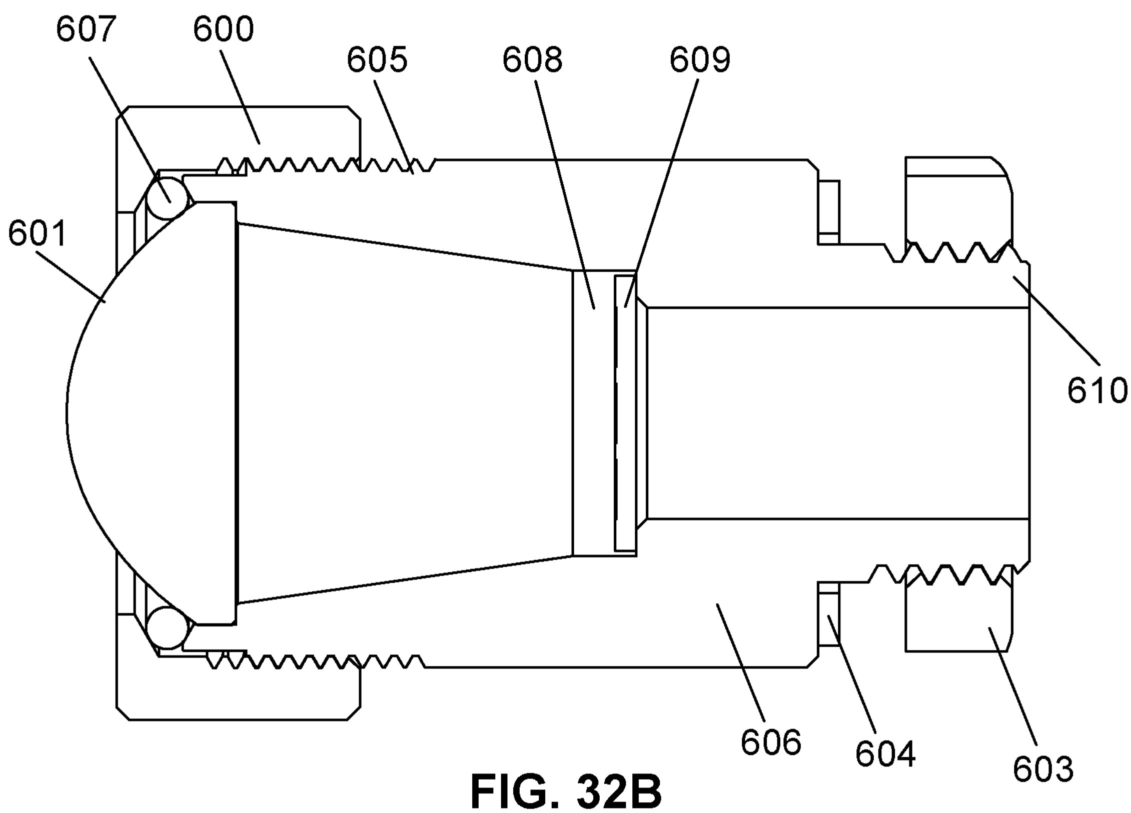
FIG. 32B is a side cut away view depicting the status indicator light of FIG. 32A.

In some embodiments, to provide a user with easy visual access to the current status of the stations in an entire barn or production facility, stations 100 can be configured with specialized status indicator 108 that can be directly coupled to main controller 101. In other embodiments, the status indicator can be disposed exterior to main controller 101 but electrically coupled to main controller 101. In yet further embodiments, status indicator 108 can be connected to distributed controller 405 bus. In some embodiments, status indicator 108 can comprise a visual indicator that can be configured to show a coloured light displaying the current status of the machine thereby allowing a visual scan of a poultry raising facility to determine if any feeder stations 100 require intervention. The intensity, colour and duration (pulse or blink) of light can all be manipulated to provide feedback of different station 100 operational status conditions while also ensuring that these status lights will not be sources of photo stimulation for the birds. In some embodiments, status indicator 108 can comprise several individual light emitting diodes of different colours whereas, in other embodiments, the status indication can comprise light emitting diodes each capable of displaying many colours. In some embodiments, status indicator 108 can comprise a semiconductor laser diode. In yet other embodiments, status indicator 108 can emit a colour of light outside of the visible spectrum that requires a special visual filter to be able to observe. One embodiment of status indicator 108 is shown in FIGS. 32A and 32B, and can be configured such that different lenses 601 can be added to project the light in many different ways. In some embodiments, lenses 601 can be frosted to provide a point source light visible from 360 degrees, or they can comprise a collimation lens that can project the light onto ceiling 262 of the barn or production facility. In addition, the entire indicator 108 can be kept close to the top of the machine to be easily visible by humans but have most of the light blocked by station 100 at the level of the birds. In some embodiments, status indicator 108 can be comprised of light source 608 that can, in some embodiments, comprise a light emitting diode ("LED") mounted on printed circuit board 609 in housing 606. With light source 608 installed, lens or diffuser 601 can be placed near the emitting end of light source 608, and locked in place with cap 600 threaded onto 605. In some embodiments, status indicator 108 can comprise o-ring seal 607, as shown in FIG. 32B, to prevent the ingress of foreign material into housing 606. In some embodiments, status indicator 108 can comprise threaded mounting flange 610 to attach status indicator 108 to part of station 100 and can further comprise gasket 604 to seal against ingress from foreign material entering housing 606 or main controller 101, and wherein status indicator 108 can be held in place with nut 603 threaded onto mounting flange 610.

RFID Antenna Design

In some embodiments, RFID tags can be used on birds using feeder station 100 described herein as a means for main controller 101 to identify each bird and to control the amount of feed provided to the bird. Because of the situation of using standard RFID tags (shown as 703, 704 in FIGS. 33 and 34) and RFID technology to identify individual birds but still requiring shielding around sorting compartment 103 (as shown in FIG. 1) and also feeding compartment 102 in other embodiments to prevent the reading of RFID tags of birds situated outside of feeder station 100, a novel antenna design 700,705,706 had to be created in order to properly read the bird tag 703,704 in feeder station 100, which is essentially a shielded metal cage. In some embodiments, RFID tags 703,704 can comprise passive RFID tags as well known to those skilled in the art whereas in other embodiments, RFID tags 703,704 can comprise active RFID tags as well known to those skilled in the art.

Commercial RFID tags/transponders 703,704 designed for livestock and poultry identification can use the 124 kHz to 134 kHz frequency range as well known to those skilled in the art. Due to the long wavelengths in this frequency range, the RFID transmit ("Tx") and receive ("Rx") antenna 700 used in the RFID readers are typically low inductance coils forming a coil antenna resulting in a system whereby the RFID Tx/Rx antenna 700 can interact with RFID transponder tags 703,704 through electromagnetic ("EM") fields 701 similar in operation to a loosely coupled transformer. Individually RFID tagged birds may need to be identified in both sorting compartment 103 and feeding compartment 102 of feeder station 100, which is, in essence, a shielded enclosure (as shown in FIG. 1) to prevent RFID tag/transponder 703,704 interference from other RFID tagged birds in close proximity to feeder station 100. Locating the RFID Tx/Rx antenna 700 near shielding metal can introduce energy loss and can decrease the efficiency of the RFID Tx/Rx antenna 700 in reading RFID tag/transponder 703, 704 thereby reducing the range over which the RFID tag/transponder 703,704 can reliably communicate with RFID Tx/Rx antenna 700.

Figure 33:
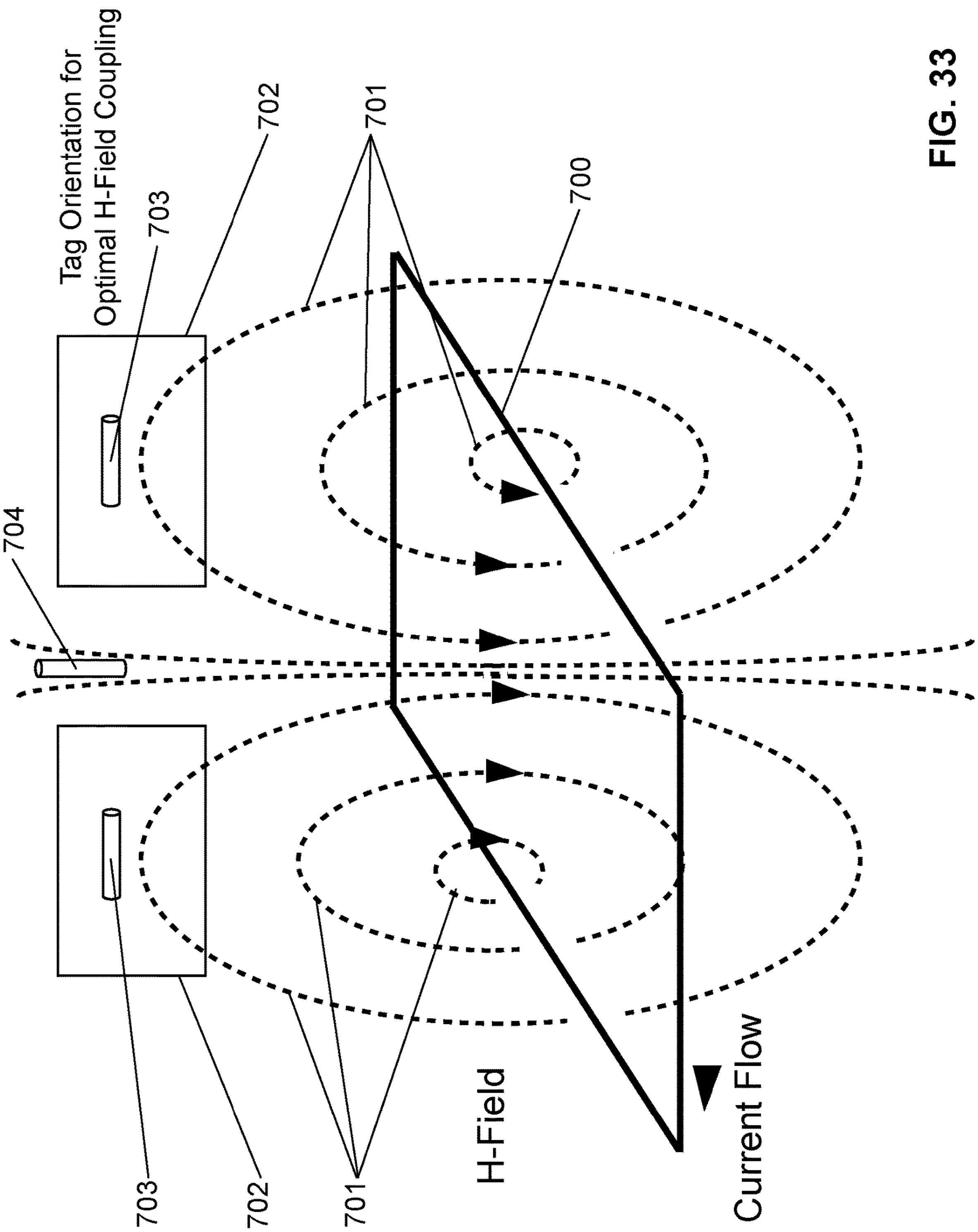
FIG. 33 is a perspective view depicting an unshielded H-Field tag orientation of an RFID reader system for use with the improved feeding station of FIG. 1.

In some embodiments, the design of the RFID tag/transponder 703,704 incorporates a coil with multiple turns. The physical orientation of the RFID tag/transponder 703, 704 within the EM fields 701 of RFID Tx/Rx antenna 700 is critical to the capture of energy and the transmission of data from RFID tag/transponder 703,704 to RFID Tx/Rx antenna 700, as shown in FIG. 33. In a closed volume, such as shielded feeder station 100, the locations for optimal coupling between RFID tag/transponder 703,704 and RFID Tx/Rx antenna 700 are generally restricted, shown as EM detection regions 702 in FIG. 33. The naturally random movement of a bird within feeder station 100 can result in inconsistent RFID identifications over time. It is observed that changing the EM field orientation over short intervals of time can and does improve RFID identification of the birds. In some embodiments, this can be achieved through time multiplexing the Tx/Rx EM fields through one or more antennas in different orientations, which can be in a variety of connected configurations such as but not limited to single, parallel or quadrature configurations.

Figure 34:
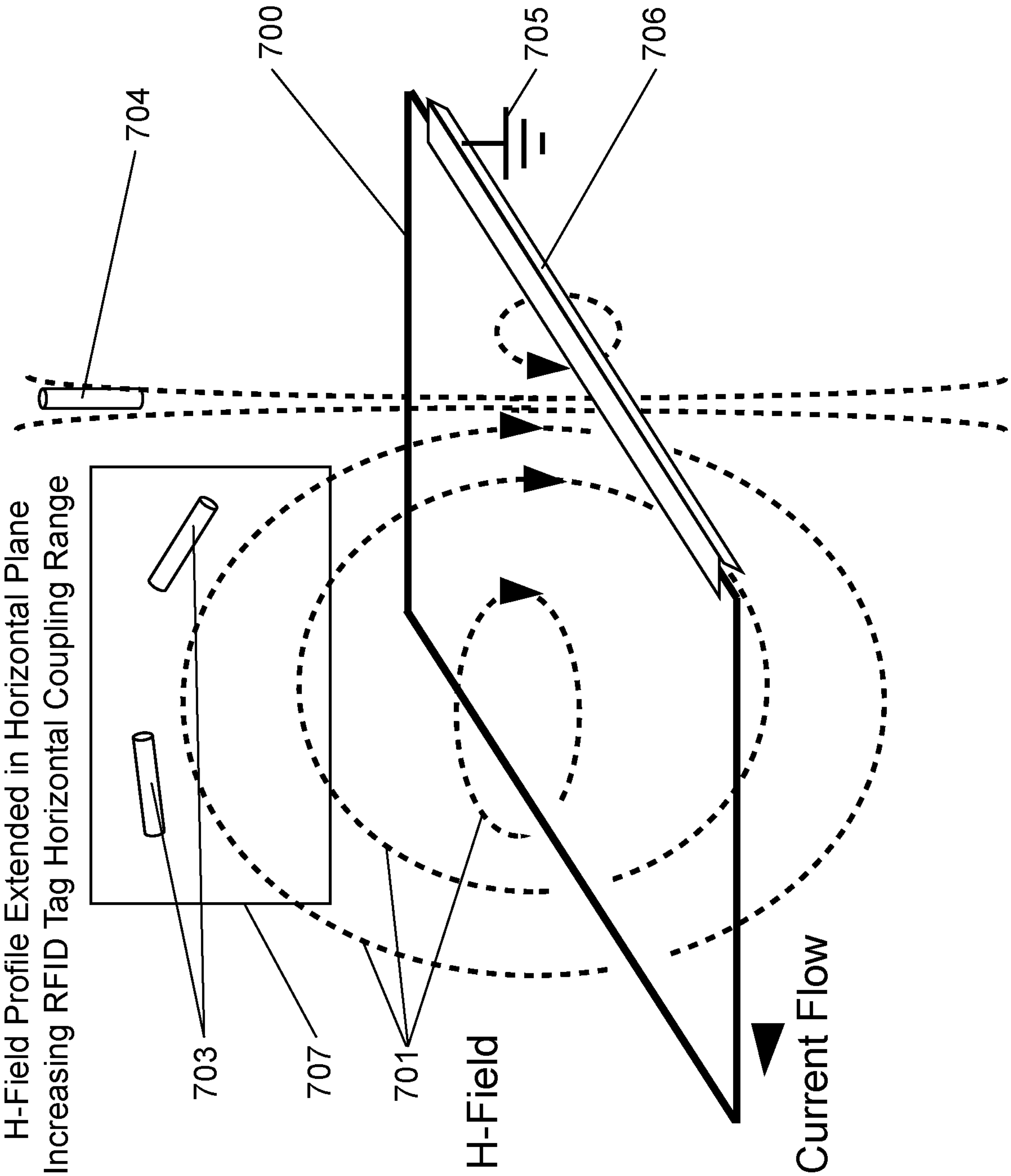
FIG. 34 is a perspective view depicting an H-Field tag orientation of an RFID reader system for use with the improved feeding station with a portion thereof shielded.

Particularly challenging is the identification of small birds whereby the location and orientation of RFID tag/transponder 703,704 disposed on the birds is suboptimal with respect to EM field 701 orientation of RFID Tx/Rx antenna 700. In some embodiments, coil antenna segment shielding 706 can be used to alter EM field 701 orientation, which can improve RFID tag/transponder 703,704 communication with RFID Tx/Rx antenna 700, as shown in FIG. 34. By placing shield 706 that is grounded (shown as 705 in FIG. 34) over one section of one or more coil antennas 700, EM field 701 can be altered in a manner that yields a flatter EM field detection region 707 with respect to horizontal orientation. Flatter EM field detection region 707 can improve coupling over a larger floor area to RFID tags/transponders 703,704 located on small birds and can improve identification consistency. In some embodiments, the RFID reader electronics can be incorporated into the antenna housing itself.

Figure 38B:
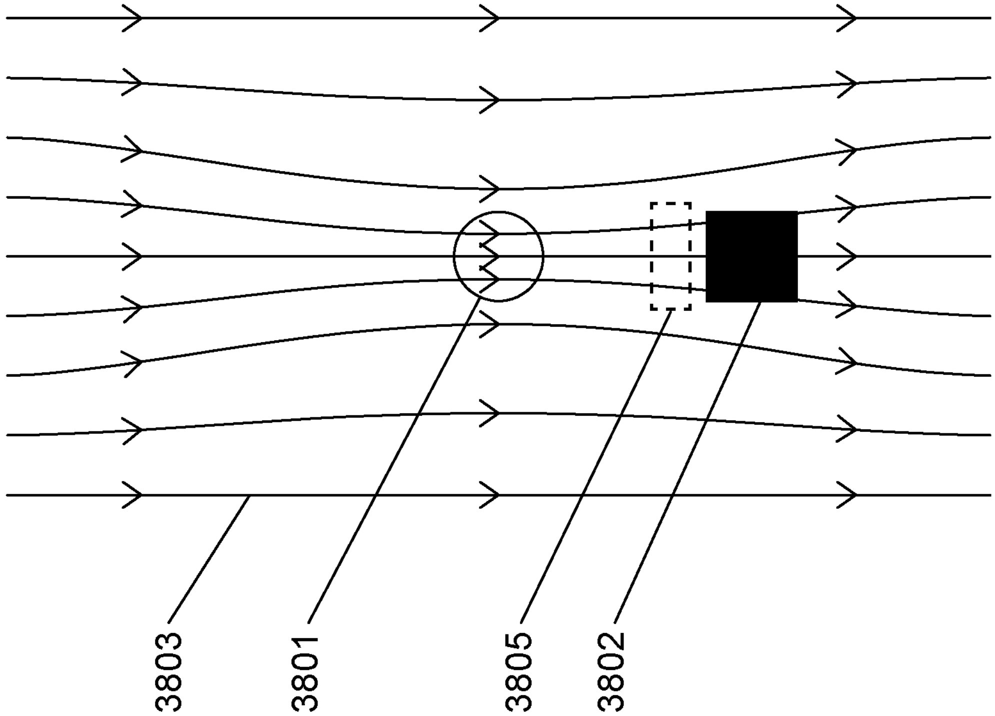
FIG. 38B is a block diagram depicting the magnetic field of FIG. 38A with a tag present in the proximity of the magnetic field.
Figure 38A:
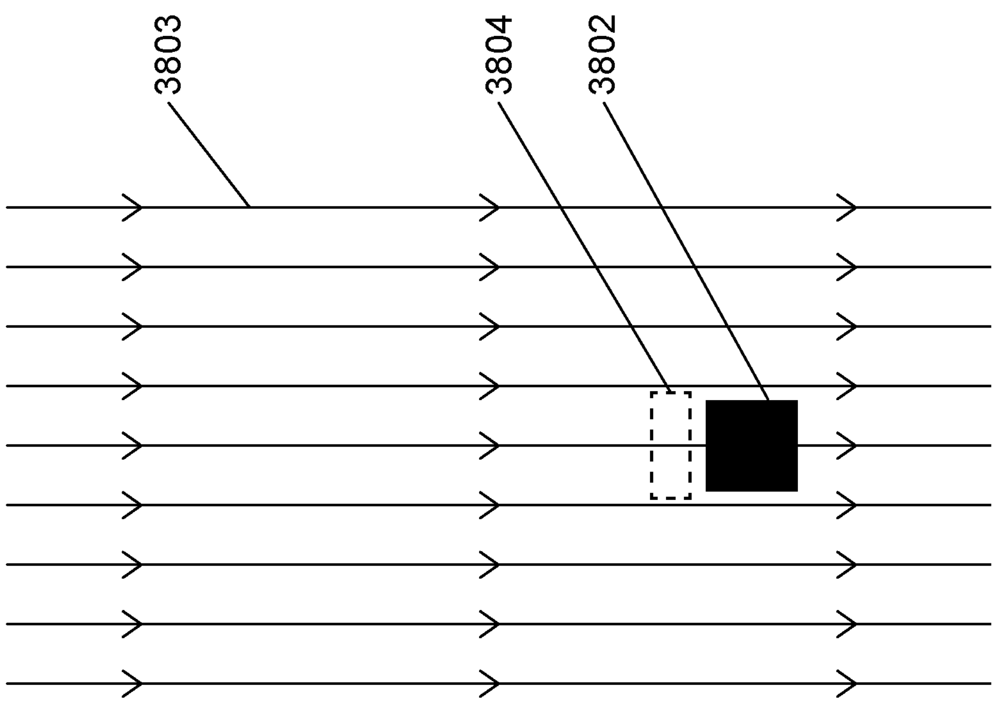
FIG. 38A is a block diagram depicting a magnetic field with a detector or magnetometer with no tag present in the proximity of the magnetic field.

In some applications of precision feeding, it can be useful to identify only the sex of one bird from another. As mentioned above, this can be done through determining the weight after the rearing period, or through RFID by either individual bird identification or the absence or presence of an RFID tag. For applications that only need male and female identification before the laying period, or for applications that do not incorporate full RFID technology, other technologies can be incorporated such as vision systems that identify a bird using visual queues. In some embodiments, referring to FIGS. 38A and 38B, the birds can be outfitted with tag 3801 that can comprise or, can be composed of, a magnetic or ferrous material such as, but not limited to, iron, stainless steel, magnetic material, or a plastic with magnetic or ferrous material impregnated into it (similar to cable ties that are metal detectable) wherein the presence of tag 3801 can be detected using existing coil-based metal detector/magnetometer 3802 or other technologies that are well known to those skilled in the art. In some embodiments, an ultrasensitive semiconductor or semiconductor hybrid magnetic field sensor or detector 3802, such as the Honeywell® HMC1001 and HMC1002 which have a micro gauss sensing range, can be used along with a high resolution 24 bit analog to digital converter to sense the change in the earth's magnetic field 3803 created by tag 3801 disposed on the bird, or detect the bird's tag 3801 directly if magnetic or, if the noise is low enough, the bird directly. FIG. 38A depicts field 3803 detected with no tag 3801 present and a lower intensity of magnetic flux is detected by detector 3802 (shown as lines in box 3804), which can be located in or on station 100 and, in some embodiments, under the body weight scale 105 in the sorting compartment 103, as shown in FIG. 1. FIG. 38B depicts the change in field 3803 with tag 3801 present and a higher intensity of magnetic flux is detected by detector 3802 (shown as more lines in box 3805). Disposable or reusable low-cost tags 3801 can be located on one sex of bird only and can be detected with a relatively simple and low cost detection circuit as well known to those skilled in the art allowing for easy selecting of a sex based target body weight curve. An additional benefit is that the tags can be safe for processing and recovery at the end of a bird growth and production cycle as they will set off the associated metal detectors in the poultry processing facilities and would have minimal chance of food supply contamination compared to a standard glass RFID tag.

Figure 36:
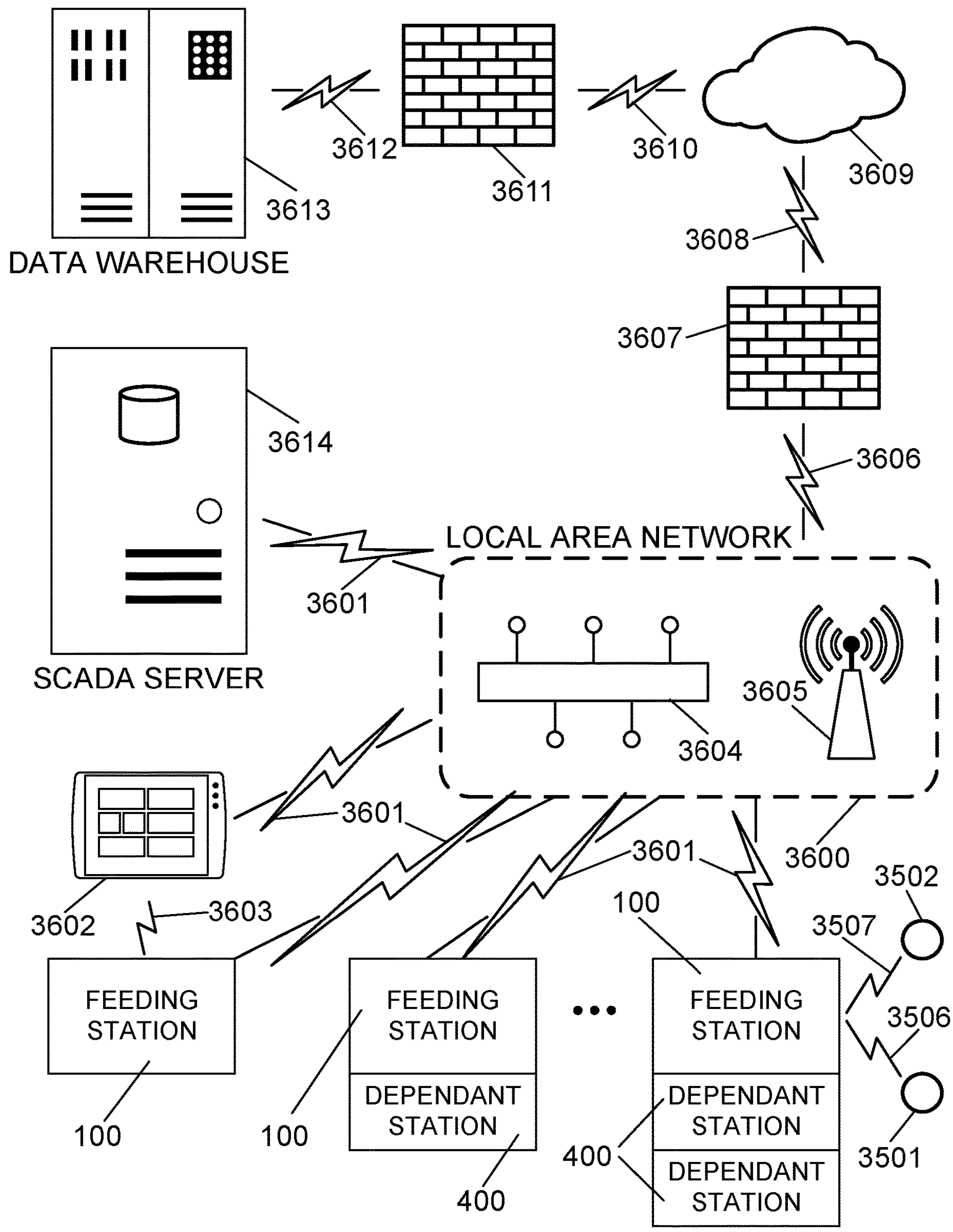
FIG. 36 is a block diagram depicting the communication and data flow between the feeding station of FIG. 1 and SCADA and data warehouse servers in addition to the environmental sensors and building automation components shown in FIG. 35.

In some applications of precision feeding, the communication flow of data shown in FIG. 36 can be implemented. In some embodiments, local area network 3600 can be comprised of wired network equipment such as, but not limited to, ethernet switches 3604 or wireless LAN access points 3605 that can provide gateway 3601 between feeding stations 100 and central SCADA server 3614. In some embodiments, local area network 3600 can also provide gateway 3606 to data warehouse 3613 through a router incorporating firewall 3607 that can be connected via a plurality of wide area network technologies 3608 to a worldwide telecommunication network, such as the Internet (labelled as reference numeral 3609), which can use the same or different wide area network connectivity technology 3610 that can connect through gateway router with firewall 3611 and then through local connection 3612 to data warehouse 3613. In some embodiments, data warehouse 3613 can comprise a plurality of servers hosted at a large datacenter that can be shared with other users or, alternatively, a central server or servers located at a corporate office of the producer or any variation in between. Moving data from a local SCADA server 3614 or environmental and building automation sensors 3501,3502 to data warehouse 3613 can allow for complex flock level data and corporate level production data to be mined for trends, studies, and a plurality of different outcomes to help the producer with making better production decisions. In some embodiments, local SCADA server 3614 can be disposed at data warehouse 3613, and all of feeding stations 100 and their respective dependent stations 400 can feed data directly to, and receive all feed decisions and operational data from, said local SCADA server 3614.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the embodiments described herein.

Embodiments implemented in computer software can be implemented in software, firmware, middleware, microcode, hardware description languages, or any combination thereof. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, etc.

The actual software code or specialized control hardware used to implement these systems and methods is not limiting of the embodiments described herein. Thus, the operation and behavior of the systems and methods were described without reference to the specific software code being understood that software and control hardware can be designed to implement the systems and methods based on the description herein.

When implemented in software, the functions can be stored as one or more instructions or code on a non-transitory computer-readable or processor-readable storage medium. The steps of a method or algorithm disclosed herein can be embodied in a processor-executable software module, which can reside on a computer-readable or processor-readable storage medium. A non-transitory computer-readable or processor-readable media includes both computer storage media and tangible storage media that facilitate transfer of a computer program from one place to another. A non-transitory processor-readable storage media can be any available media that can be accessed by a computer. By way of example, and not limitation, such non-transitory processor-readable media can comprise RAM, ROM, EEPROM, CD-ROM or other optical disk storage, magnetic disk storage or other magnetic storage devices, or any other tangible storage medium that can be used to store desired program code in the form of instructions or data structures and that can be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and/or instructions on a non-transitory processor-readable medium and/or computer-readable medium, which can be incorporated into a computer program product.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

REFERENCES CITED

Robinson, F. E., R. A. Renema, L. Bouvier, J. J. R. Feddes, M. J. Zuidhof, J. L. Wilson, M. Newcombe, and R. I. McKay. 1998. Effects of photostimulatory lighting and feed allocation in female broiler breeders 2. Egg and chick production characteristics. Can. J. Anim. Sci. 78:615-623.

van der Klein, S. A. S., G. Y. Bédécarrats, F. E. Robinson, and M. J. Zuidhof. 2018a. Early photostimulation at the recommended body weight reduced broiler breeder performance. Poult. Sci. 97:3736-3745. doi 10.3382/ps/pey215 van der Klein, S. A. S., G. Y. Bédécarrats, and M. J. Zuidhof. 2018b. The effect of rearing photoperiod on broiler breeder reproductive performance depended on body weight. Poult. Sci. 97:3286-3294. doi 10.3382/ps/pey199
Zuidhof, M. J., M. V. Fedorak, C. A. Ouellette, and I. I. Wenger. 2017. Precision feeding: Innovative management of broiler breeder feed intake and flock uniformity. Poult. Sci. 96:2254-2263. doi https://doi.org/10.3382/ps/pex013
Zuidhof, M. J. 2018. Lifetime productivity of conventionally and precision-fed broiler breeders. Poultry Sci. 97:3921-3937. doi 10.3382/ps/pey252
Zuidhof, M. J., M. V. Fedorak, C. C. Kirchen, E. H. M. Lou, C. A. Ouellette, and I. I. Wenger. 2019. System and method for feeding animals. U.S. Pat. No. 10,506,793 B2. United States Patent and Trademark Office. Alexandria VA USA.

We claim:

1. An improved system for feeding an animal, comprising:
a) at least one feeder station configured for providing feed to the animal, each of the at least one feeder station comprising:
i) a sorting compartment,
ii) a feeding compartment, and
iii) at least one scale disposed in one or both of the sorting and feeding compartments;
b) a lifting mechanism operatively coupled to the at least one feeder station, the lifting mechanism configured to move the at least one feeder station between a lowered position and a raised position during a growth cycle of the animal;
c) a feed module, wherein the feed module is configured to dispense one or more types of feed to the animal in the feeding compartment, the feed module comprising a feed pan into which the feed is dispensed; and
d) a main controller operatively coupled to the at least one scale, to the lifting mechanism and to the feed module, wherein the main controller is configured to operatively control the lifting mechanism to move the at least one feeder station between the lowered and raised positions, wherein the main controller comprises:
i) a microprocessor, and
ii) a computer readable memory operatively coupled to the microprocessor, wherein the computer readable memory comprises first executable machine code stored thereon that when executed by the microprocessor, the main controller performs or carries out steps of a feed decision algorithm to dispense the one or more types of feed into the feed pan.

2. The improved system as set forth in claim 1, wherein the feeder station further comprises at least one radio frequency identification ("RFID") antenna disposed in one or both of the sorting and feeding compartments, wherein the at least one RFID antenna is configured to read an RFID tag disposed on at least one of the animal, and wherein the main controller is operatively coupled to the at least one RFID antenna.

3. The improved system as set forth in claim 2, wherein the RFID antenna comprises a coil antenna.

4. The improved system as set forth in claim 3, wherein the coil antenna comprises a shielded coil antenna segment.

5. The improved system as set forth in claim 1, wherein the feed module comprises at least one feed hopper configured to dispense the feed into the feed pan.

6. The improved system as set forth in claim 5, wherein the feed module is configured to dispense at least two types of the feed.

7. The improved system as set forth in claim 5, wherein the feed module is configured to provide the feed to at least two of the at least one feeder station.

8. The improved system as set forth in claim 5, wherein the feed module is configured to do one or both of clearing the feed pan of the feed and returning the feed to the at least one feed hopper.

9. The improved system as set forth in claim 1, wherein the lifting mechanism comprises: a plurality of lifting legs disposed around a perimeter of the at least one feeder station.

10. The improved system as set forth in claim 9, wherein the plurality of lifting legs comprises one or more of screw jacks, hydraulic cylinders, pneumatic cylinders and ratcheting jacks.

11. The improved system as set forth in claim 1, wherein the feed module comprises a feed door configured to impede access to the feed pan by the animal.

12. The improved system as set forth in claim 11, wherein the feed door comprises a plurality of door panels configured to open and close in a stacked arrangement.

13. The improved system as set forth in claim 1, wherein the main controller is operatively coupled to environmental sensors.

14. The improved system as set forth in claim 13, wherein the environmental sensors detect one or more of ambient temperature, exhaust and/or inlet air temperature, humidity, air pressure, air flow, light intensity, light colour, particulate, smoke, and gas concentration.

15. The improved system as set forth in claim 1, wherein the main controller is operatively coupled to one or more of actuators, sensors and building automation components.

16. The improved system as set forth in claim 15, wherein the actuators, sensors and building automation components comprise one or more of lighting controllers, vents, windows, fan controllers, heating, ventilation, air conditioning, water and feed distribution systems.

17. The improved system as set forth in claim 1, wherein the computer readable memory comprises second executable machine code stored thereon that when executed by the microprocessor, the main controller performs or carries out steps of a station height setting algorithm to raise or lower the at least one feeder station.

18. The improved system as set forth in claim 17, wherein the computer readable memory comprises fourth executable machine code stored thereon that when executed by the microprocessor, the main controller performs or carries out steps of a station leveling algorithm to level the at least one feeder station.

19. The improved system as set forth in claim 1, wherein the main controller further comprises:
a) an audio codec operatively coupled to the microprocessor;
b) a digital to analog converter operatively coupled to the audio codec;
c) an audio amplifier operatively coupled to the digital to analog converter; and
d) an audio speaker operatively coupled to the audio amplifier.

20. The improved system as set forth in claim 19, wherein the computer readable memory comprises fifth executable machine code stored thereon that when executed by the microprocessor, the main controller plays digitally recorded audio files stored on the computer readable memory over the audio speaker.

21. The improved system as set forth in claim 1, further comprising a barrier disposed at least partially around the at least one feeder station, the barrier configured to prevent ingress of the animal underneath the at least one feeder station.

22. The improved system as set forth in claim 1, further comprising a ramp configured to provide access for the animal to enter the sorting compartment when the at least one feeder station is in the raised position.

23. The improved system as set forth in claim 1, wherein at least one of the at least one feeder station is configured as a dependent feeder station wherein the dependent feeder station is operatively coupled to the main controller of the at least one feeder station.

24. The improved system as set forth in claim 1, wherein the at least one feeder station is operatively coupled to one or more of a SCADA server and a data warehouse via one or more of a local area network and a worldwide telecommunications network.

25. The improved system as set forth in claim 1, further configured to determine a sex of the animal based on the weight of the animal or on a change of a magnetic field by the animal.

26. The improved system as set forth in claim 1, wherein the animal comprises poultry.

27. The improved system as set forth in claim 1, wherein the animal comprises one or both of an individual animal and a group of animals.

28. The improved systems as set forth in claim 1, wherein the main controller further comprises a human-machine interface control panel operatively coupled to the microprocessor.

29. The improved system as set forth in claim 1, wherein the computer readable memory comprises third executable machine code stored thereon that when executed by the microprocessor, the main controller performs or carries out steps of a level checking algorithm to check if the at least one feeder station is level to the surface of the earth.

30. The improved system as set forth in claim 1, further comprising a feed scale, the feed scale configured for weighing the feed pan.

* * * * *